(12) United States Patent
Pare et al.

(10) Patent No.: US 9,505,432 B2
(45) Date of Patent: *Nov. 29, 2016

(54) STEERING KNUCKLE FOR A VEHICLE

(71) Applicant: Soucy International Inc., Drummondville, Quebec (CA)

(72) Inventors: Steeve Pare, St-Majorique (CA); Steve Frechette, St-Liboire (CA); Serge Latulippe, St-Hyacinthe (CA); William Gasse, Drummondville (CA); Andre Leger, Drummondville (CA); Andre Todd, Mont-St-Hilaire (CA); Nicolas Dubuc, Mercier (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/922,610

(22) Filed: Oct. 26, 2015

(65) Prior Publication Data

US 2016/0107685 A1 Apr. 21, 2016

Related U.S. Application Data

(63) Continuation-in-part of application No. 14/668,801, filed on Mar. 25, 2015, now Pat. No. 9,193,383, which is a continuation-in-part of application No. 13/724,111, filed on Dec. 21, 2012, now Pat. No. 9,010,781.

(60) Provisional application No. 61/579,701, filed on Dec. 23, 2011.

(51) Int. Cl.
*B62D 7/18* (2006.01)
*B62D 11/20* (2006.01)
*B62D 55/04* (2006.01)
*B62D 55/065* (2006.01)

(52) U.S. Cl.
CPC .............. *B62D 7/18* (2013.01); *B62D 11/20* (2013.01); *B62D 55/04* (2013.01); *B62D 55/065* (2013.01)

(58) Field of Classification Search
CPC .................................. B62D 7/18; B62D 11/20
USPC ............. 280/93.512, 86.751, 86.754, 86.758
See application file for complete search history.

(56) References Cited

U.S. PATENT DOCUMENTS 7,850,179 B2 * 12/2010 Ursu ..................... B62D 7/18
280/86.751
8,430,188 B2 * 4/2013 Hansen ................. B62D 55/04
180/9.26

* cited by examiner

*Primary Examiner* — Faye M Fleming
(74) *Attorney, Agent, or Firm* — Brouillette & Partners; Robert Brouillette

(57) ABSTRACT

A steering knuckle to be used with the steering assembly of a vehicle such as a farming tractor is disclosed. The steering knuckle comprises preconfigured attachment areas where attachment element(s) or bracket(s) can be releasably yet rigidly secured. The attachment areas may be further reinforced with additional knuckle material (e.g. metal, metallic alloy). The steering knuckle therefore provides predetermined and preconfigured attachment location(s) where a wheel-replacing track system can be secured, thereby allowing the track system to be mounted to the vehicle while avoiding attachment at inconvenient or weak locations.

22 Claims, 95 Drawing Sheets

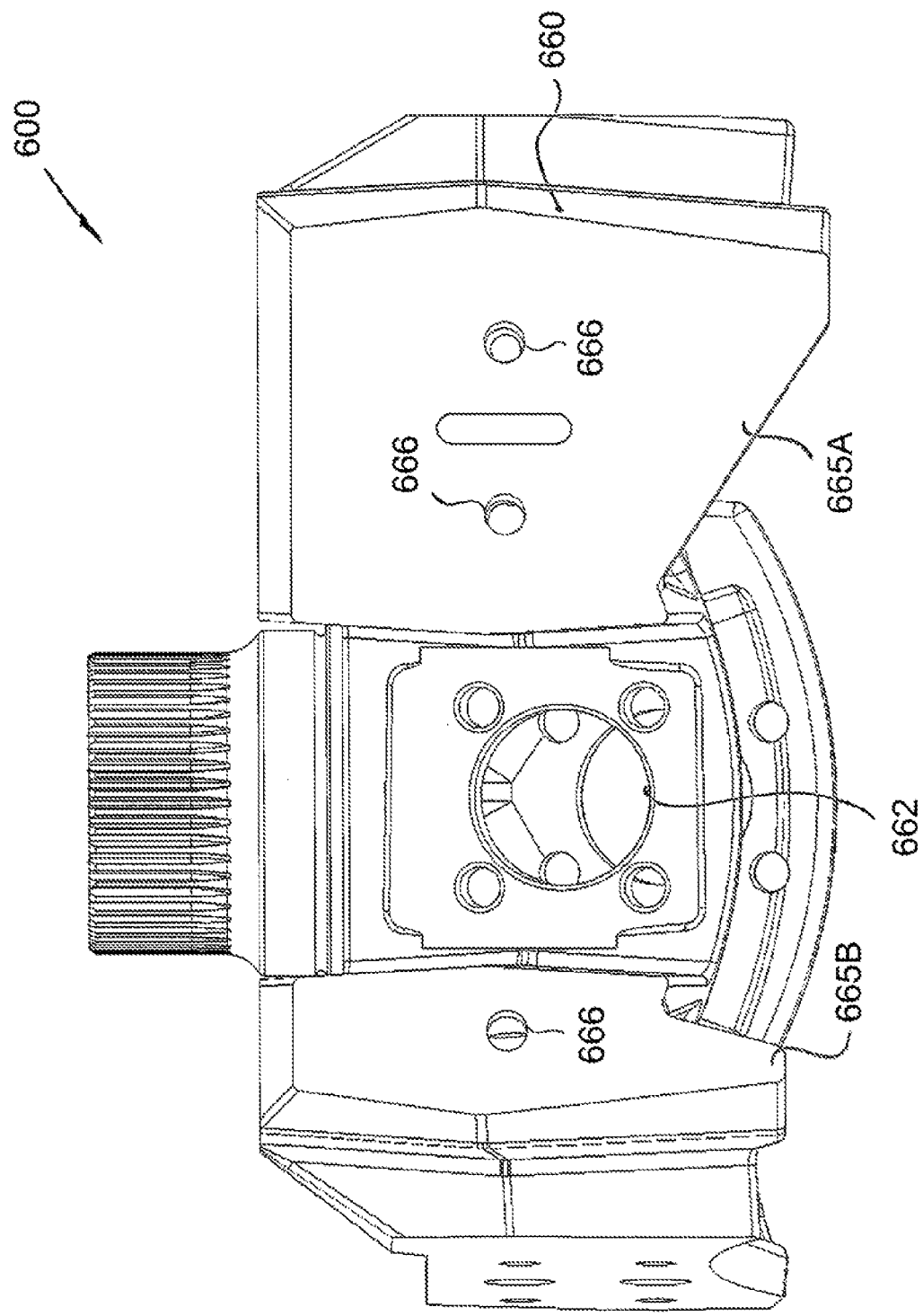

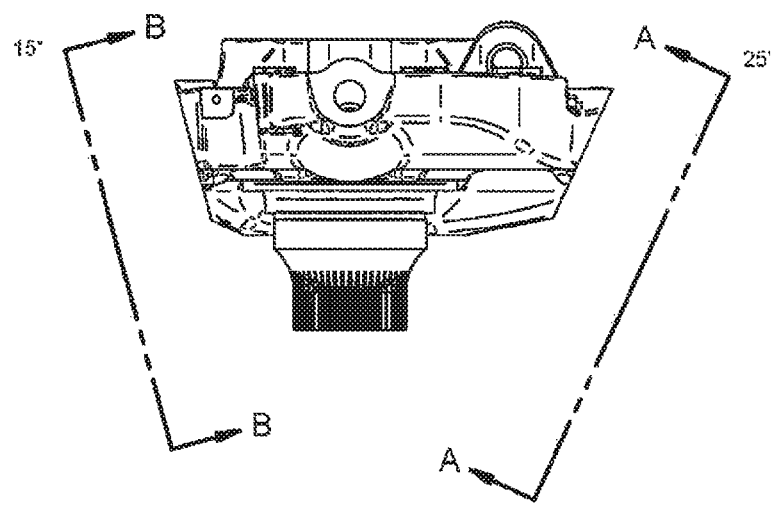
Fig. 18A
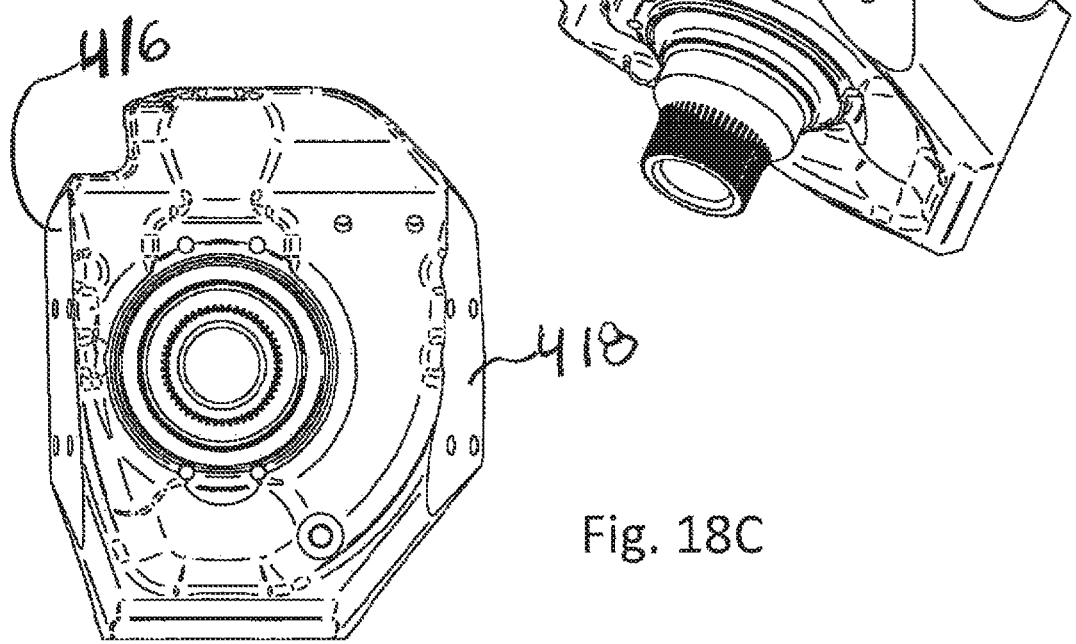
Fig. 18B
Fig. 18C

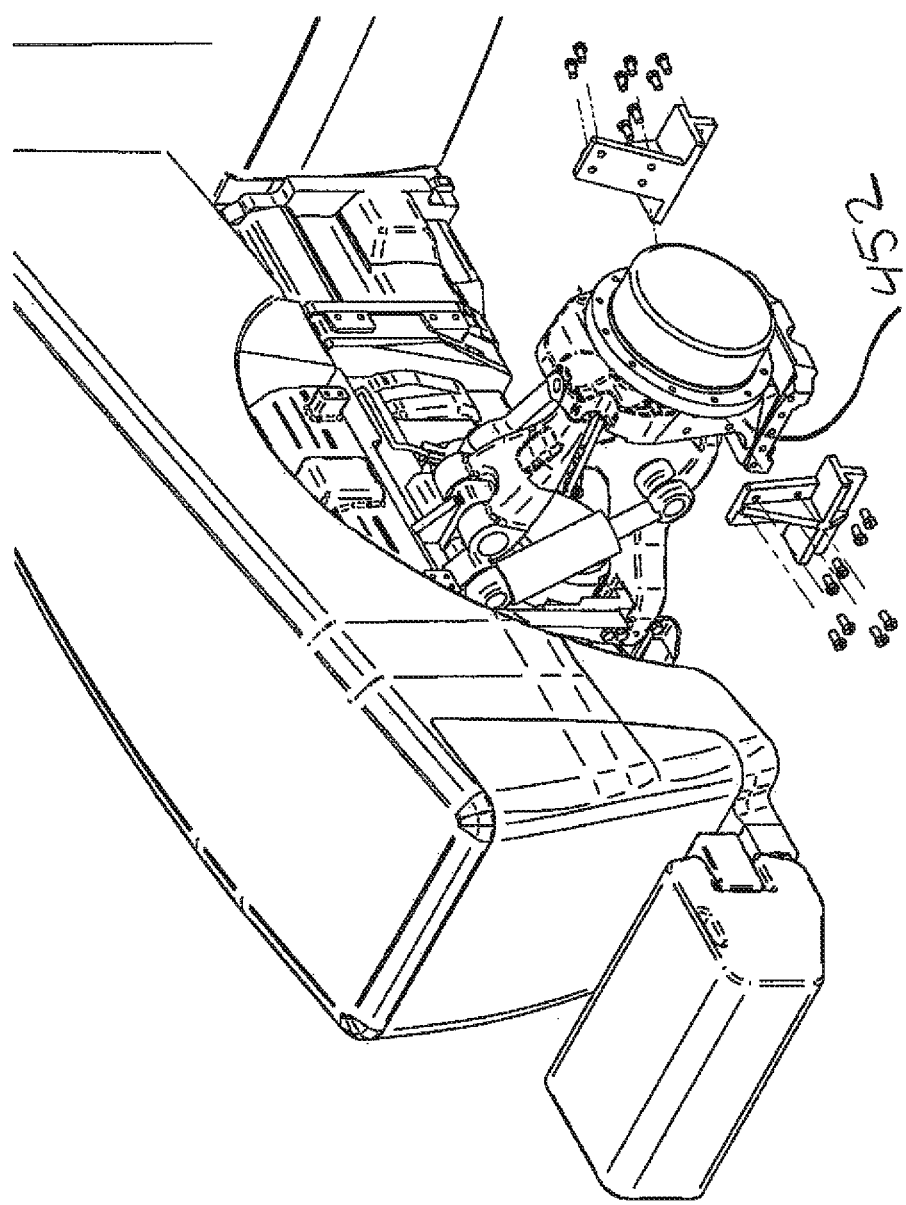

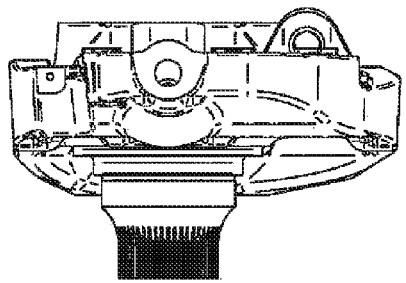
Fig. 20A
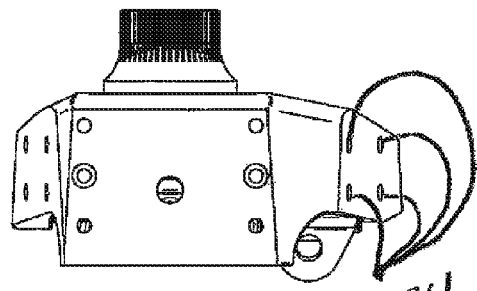
Fig. 20B
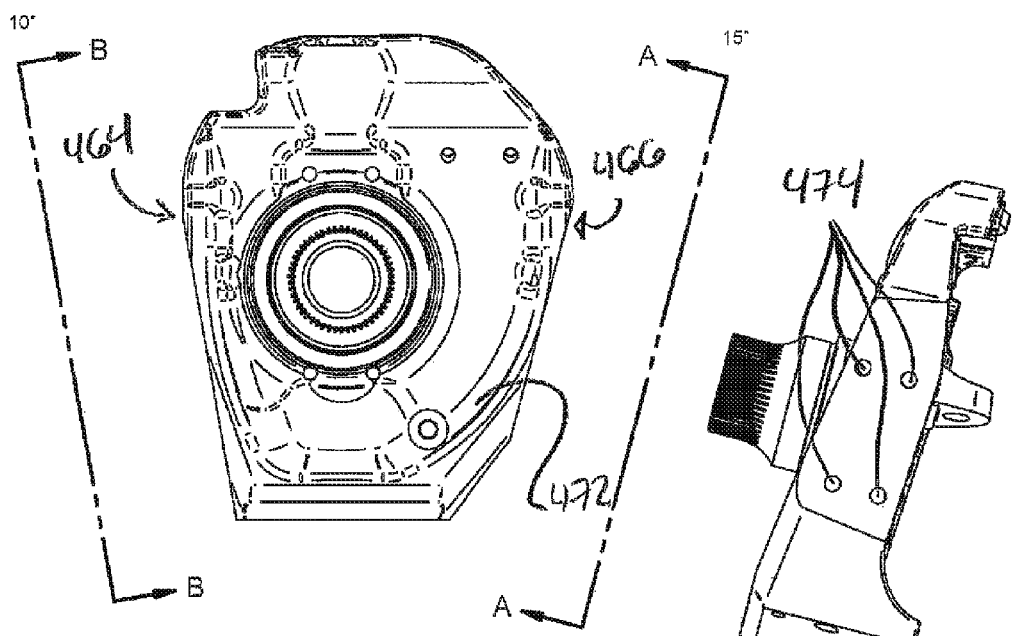
Fig. 20C
Fig. 20D

VUE B-B

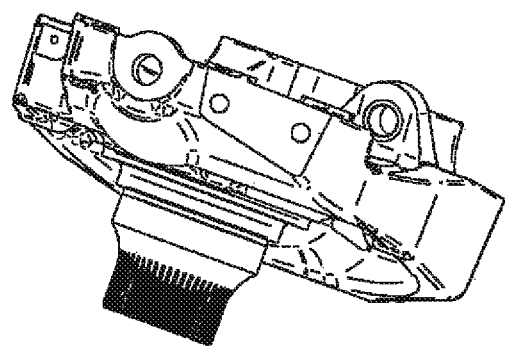
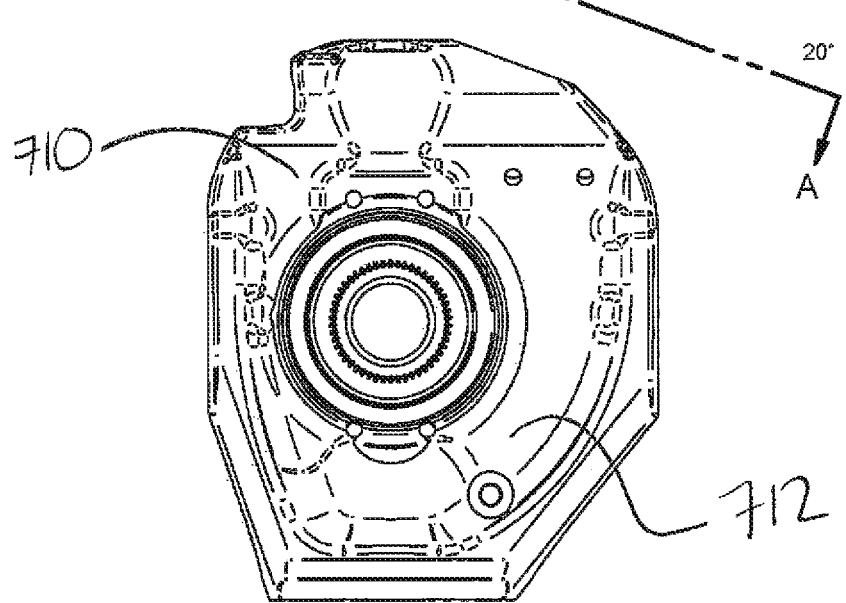
Fig. 24F
Fig. 24E

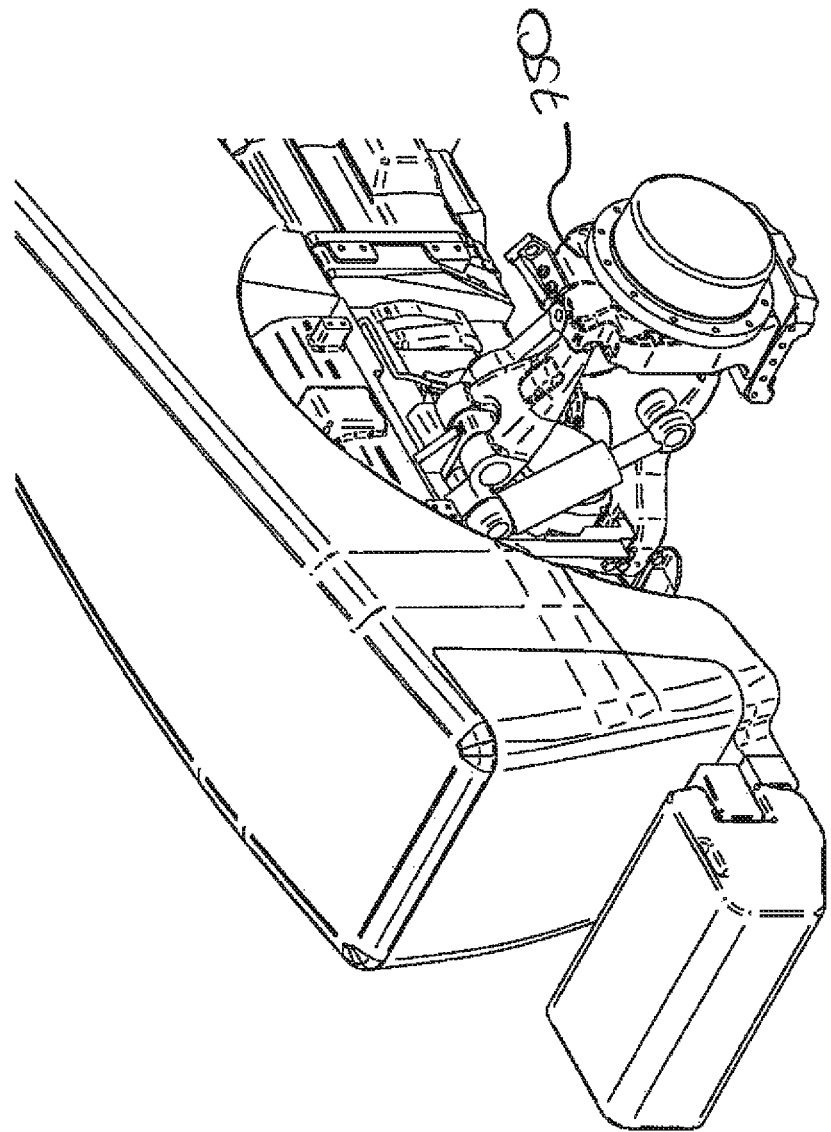

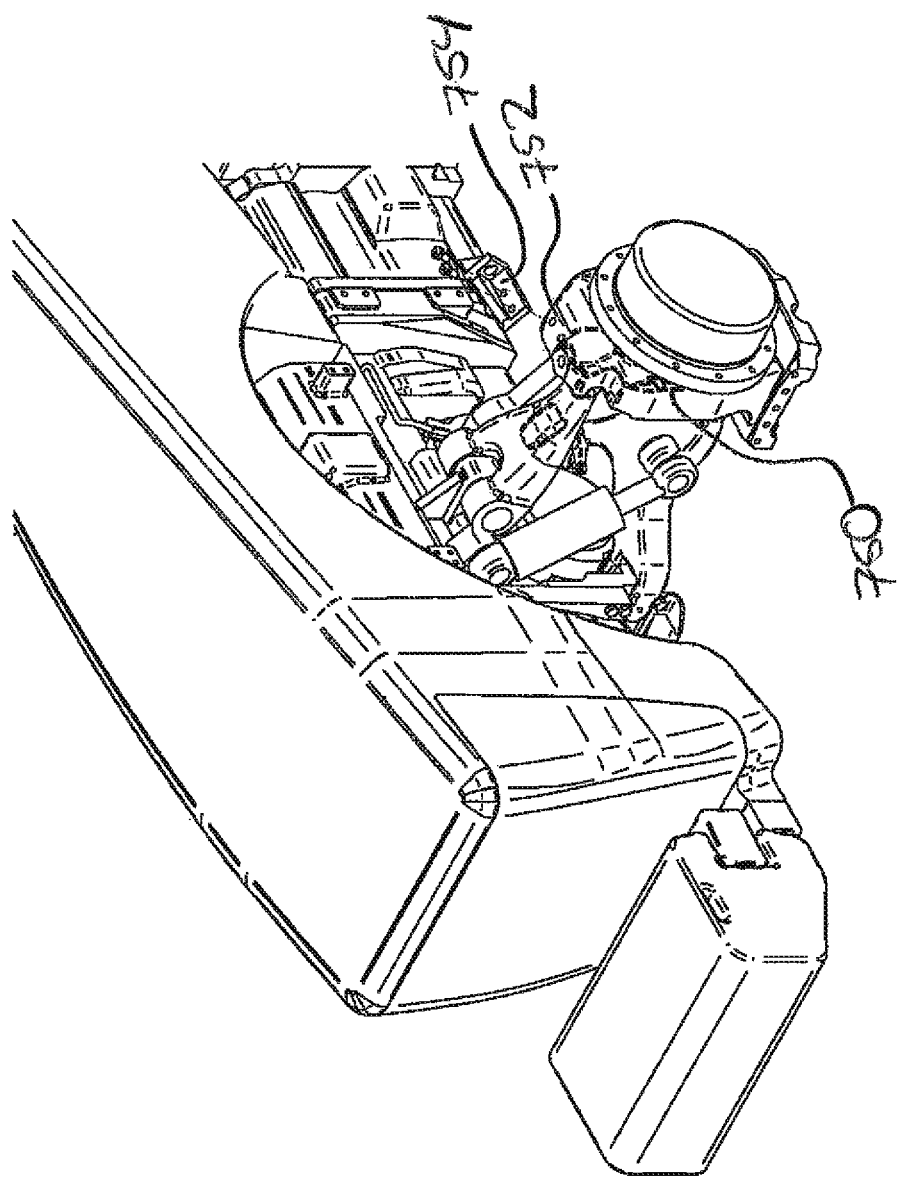

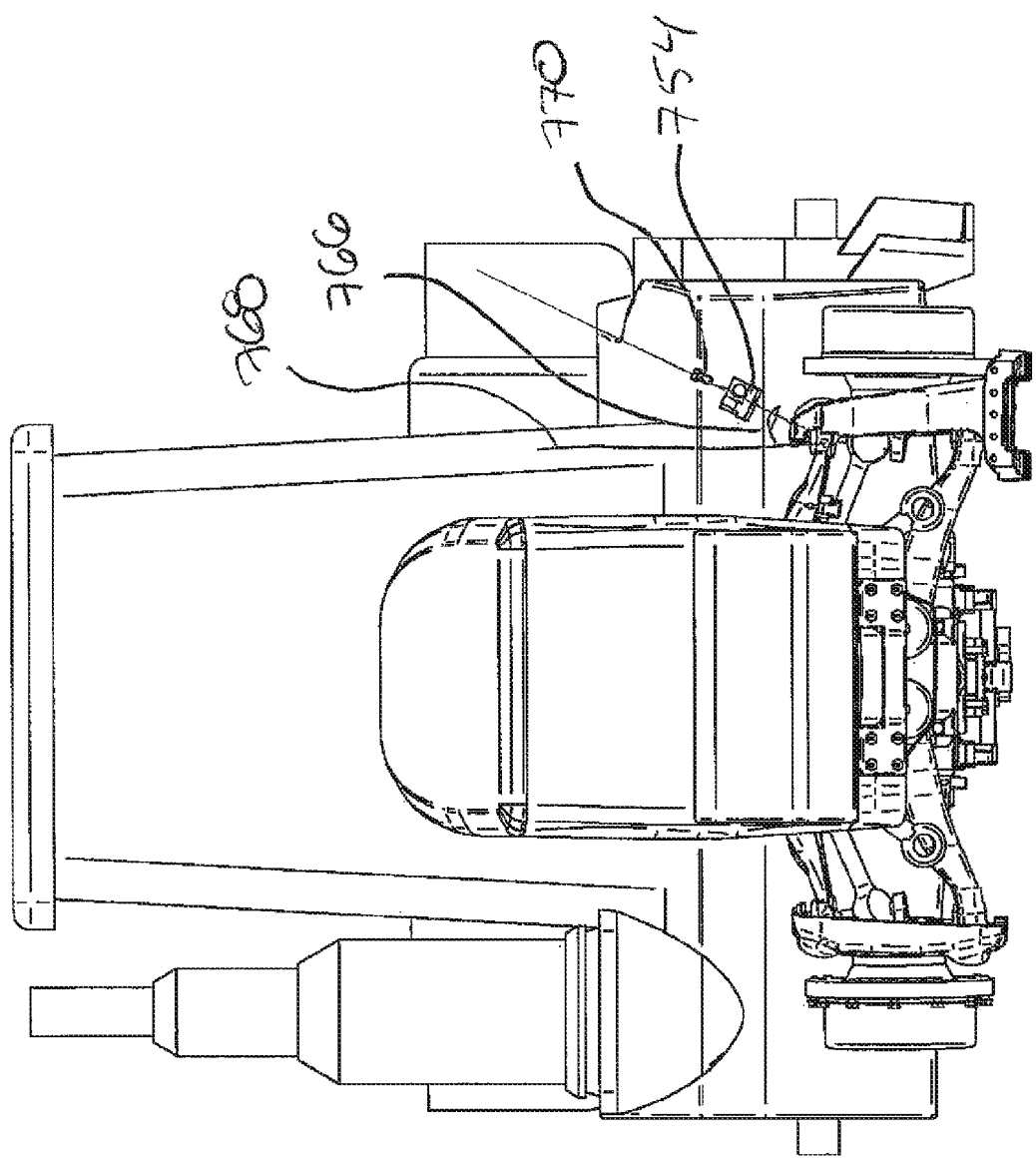

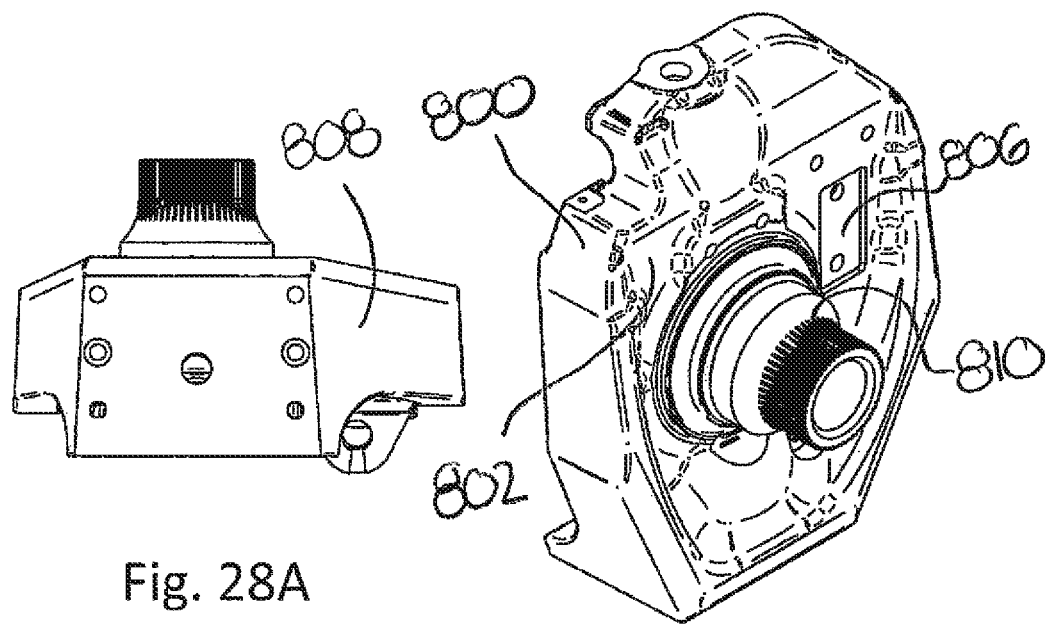
Fig. 28A
Fig. 28B
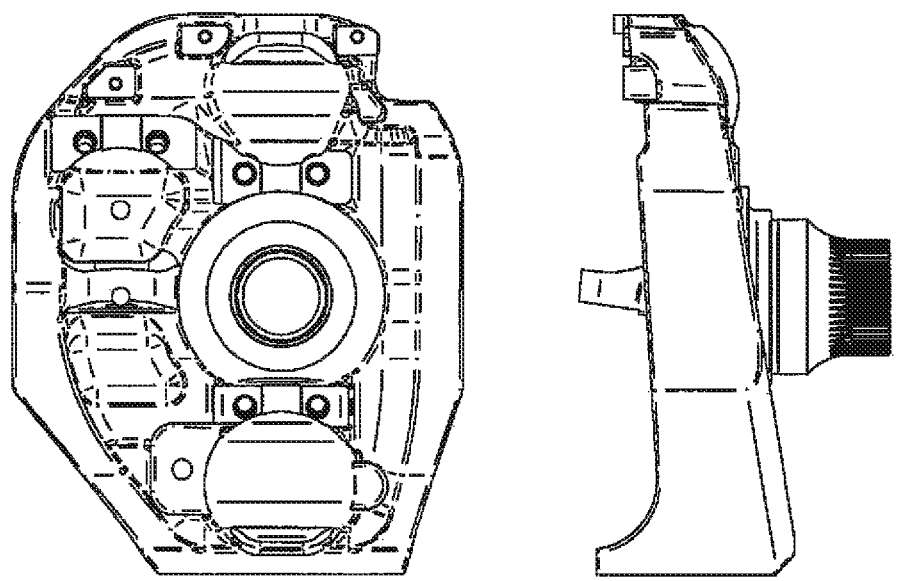
Fig. 28C
Fig. 28D

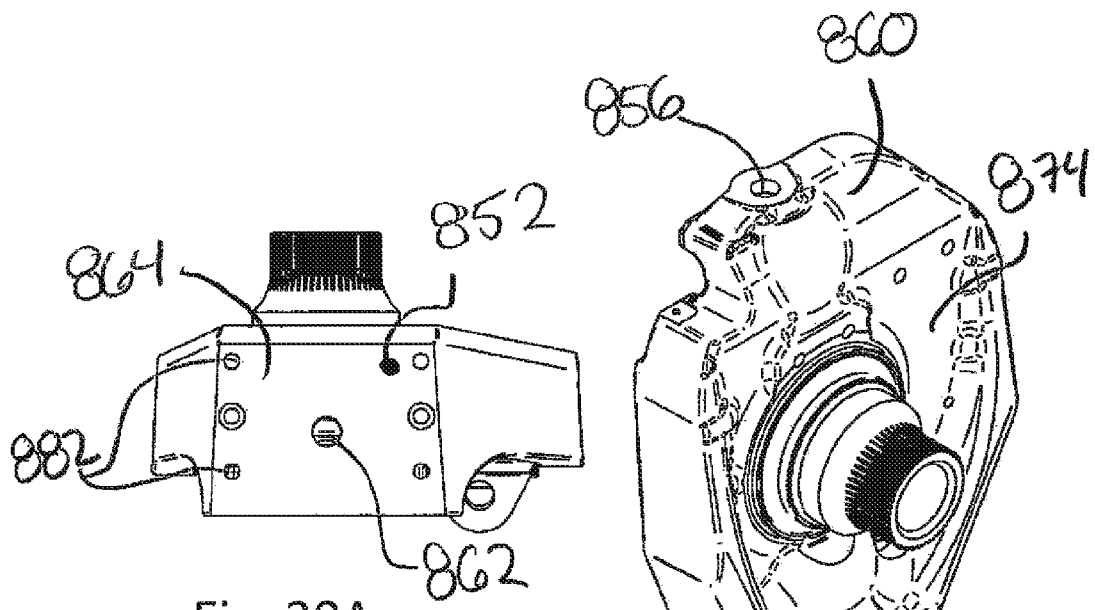
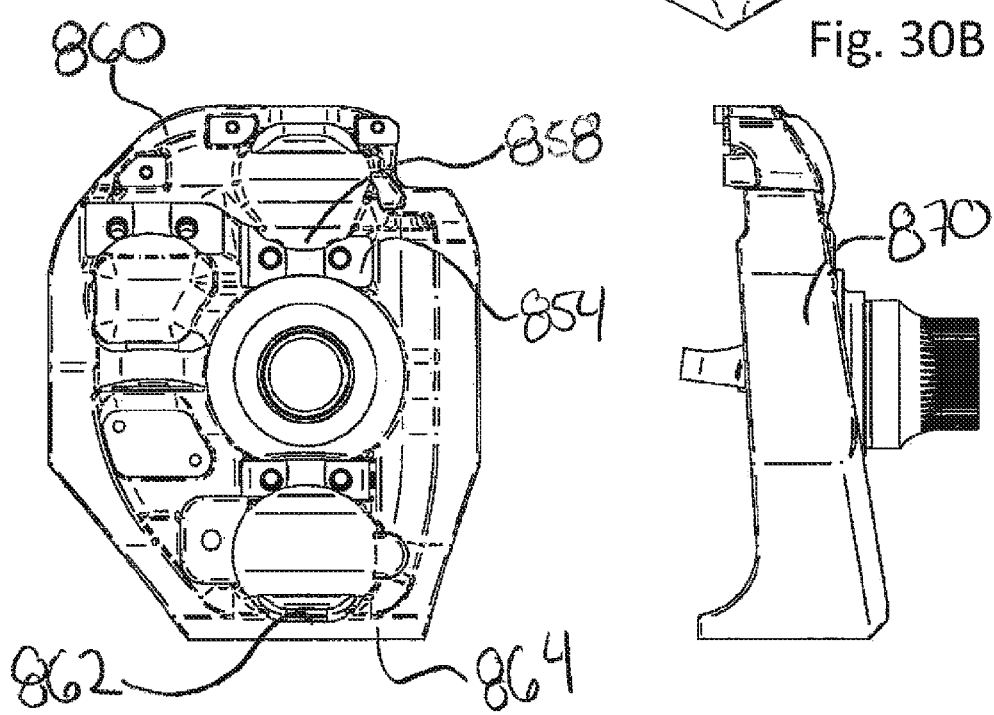
Fig. 30A
Fig. 30B
Fig. 30C
Fig. 30D

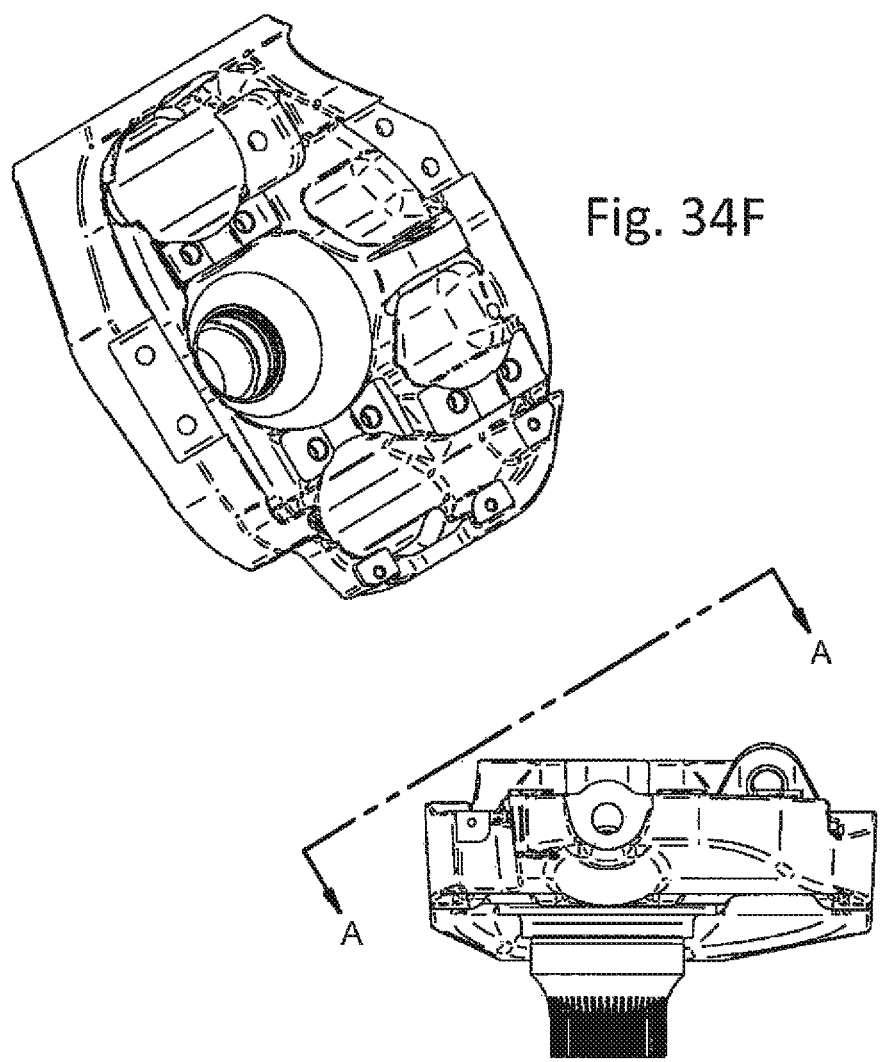

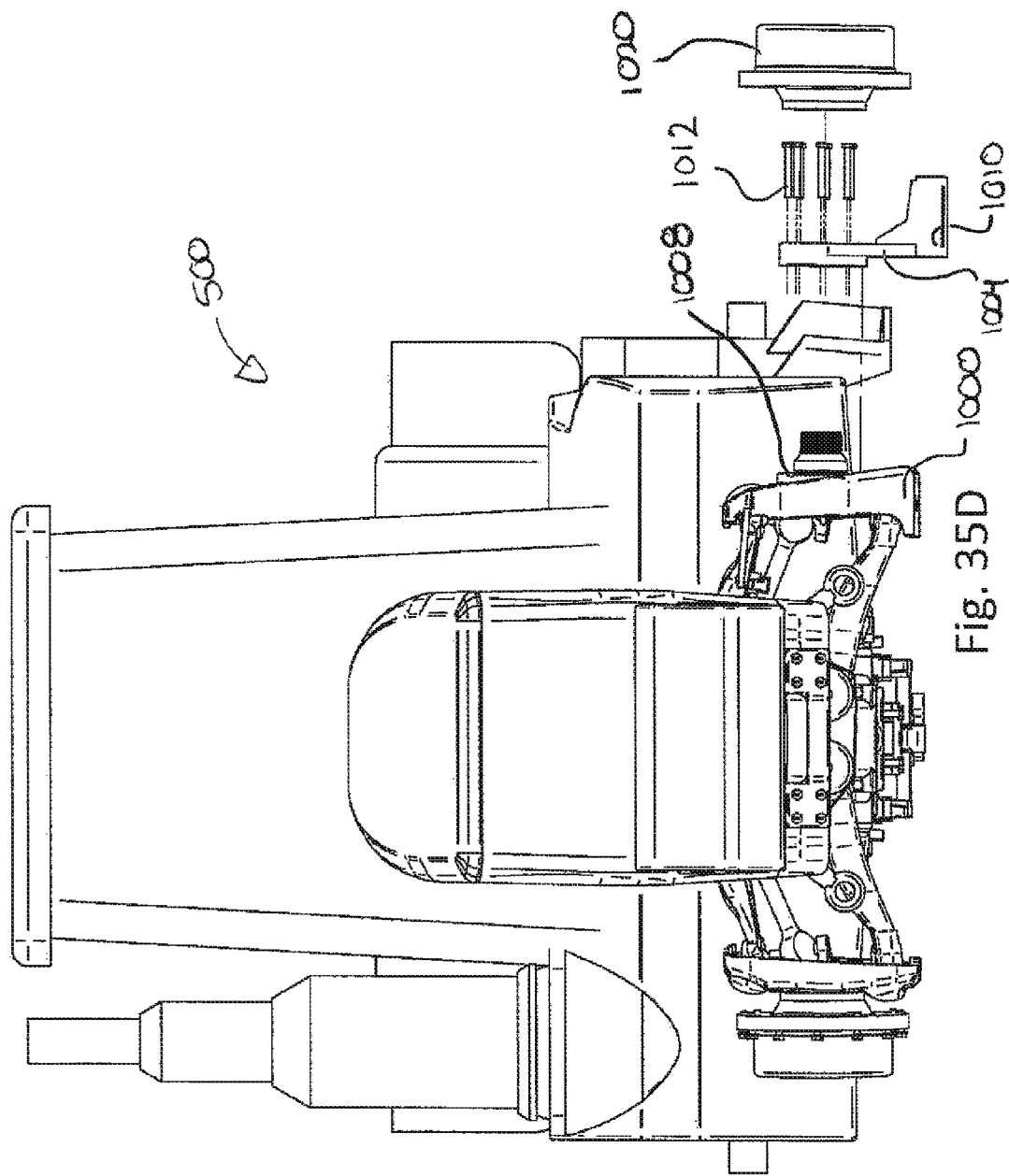

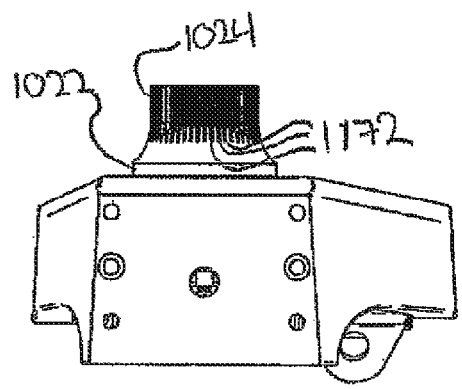
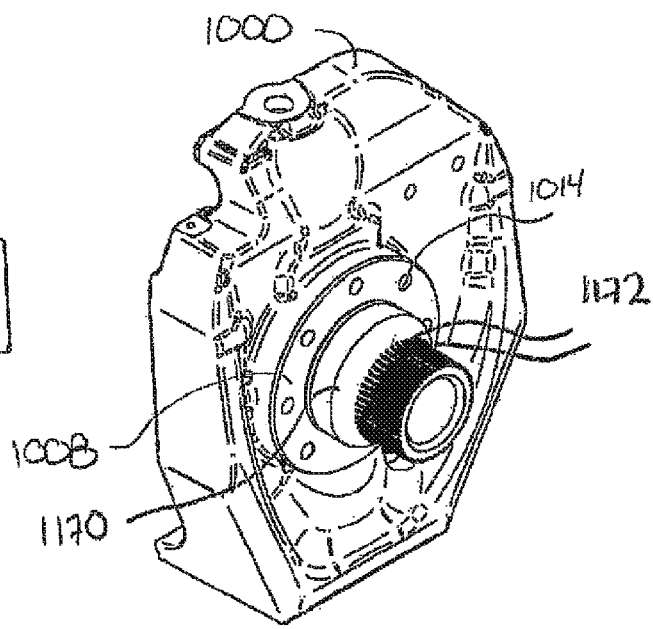
Fig. 36A
Fig. 36B
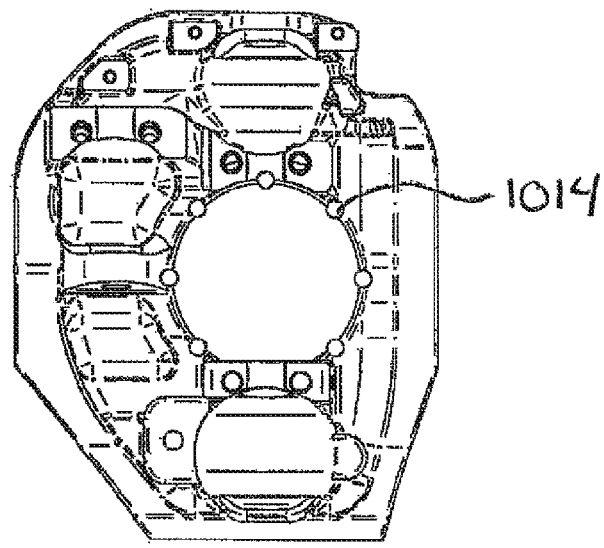
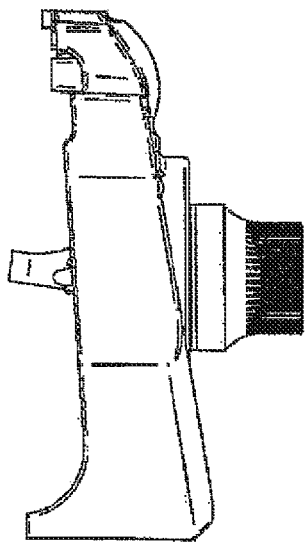
Fig. 36C
Fig. 36D

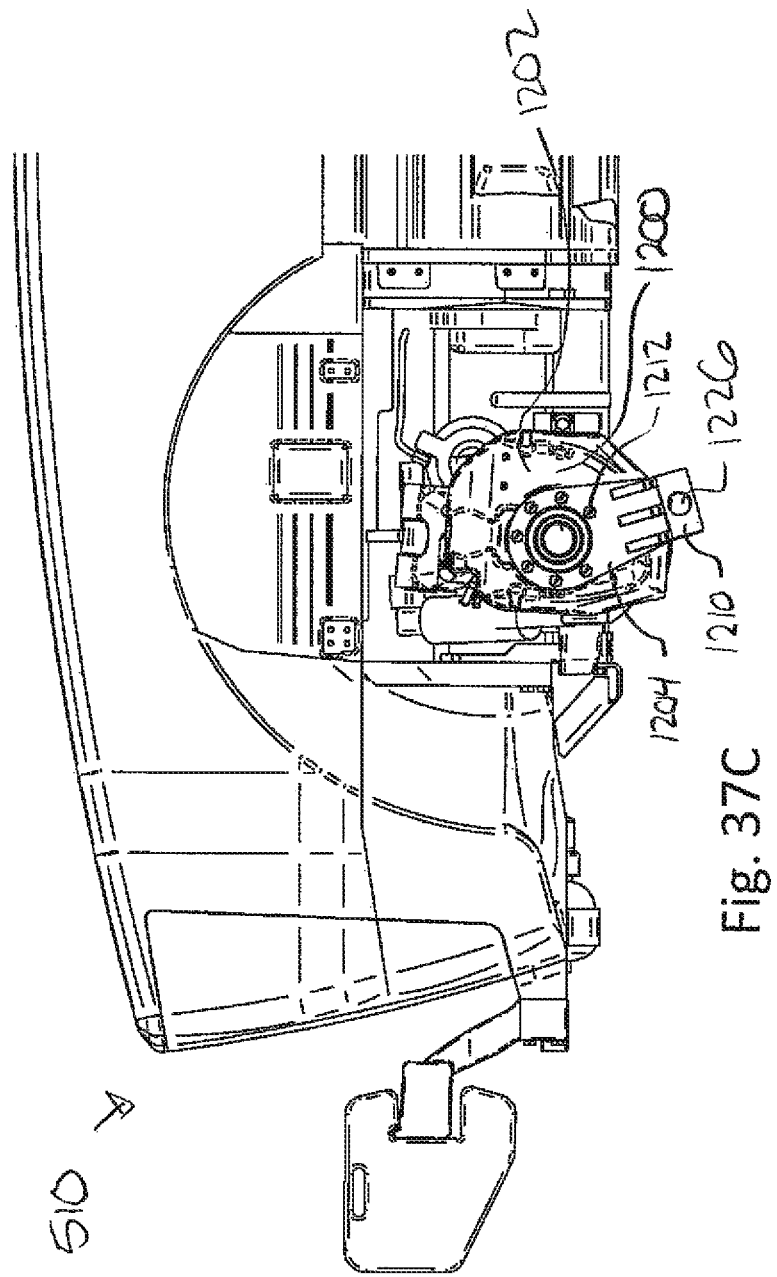

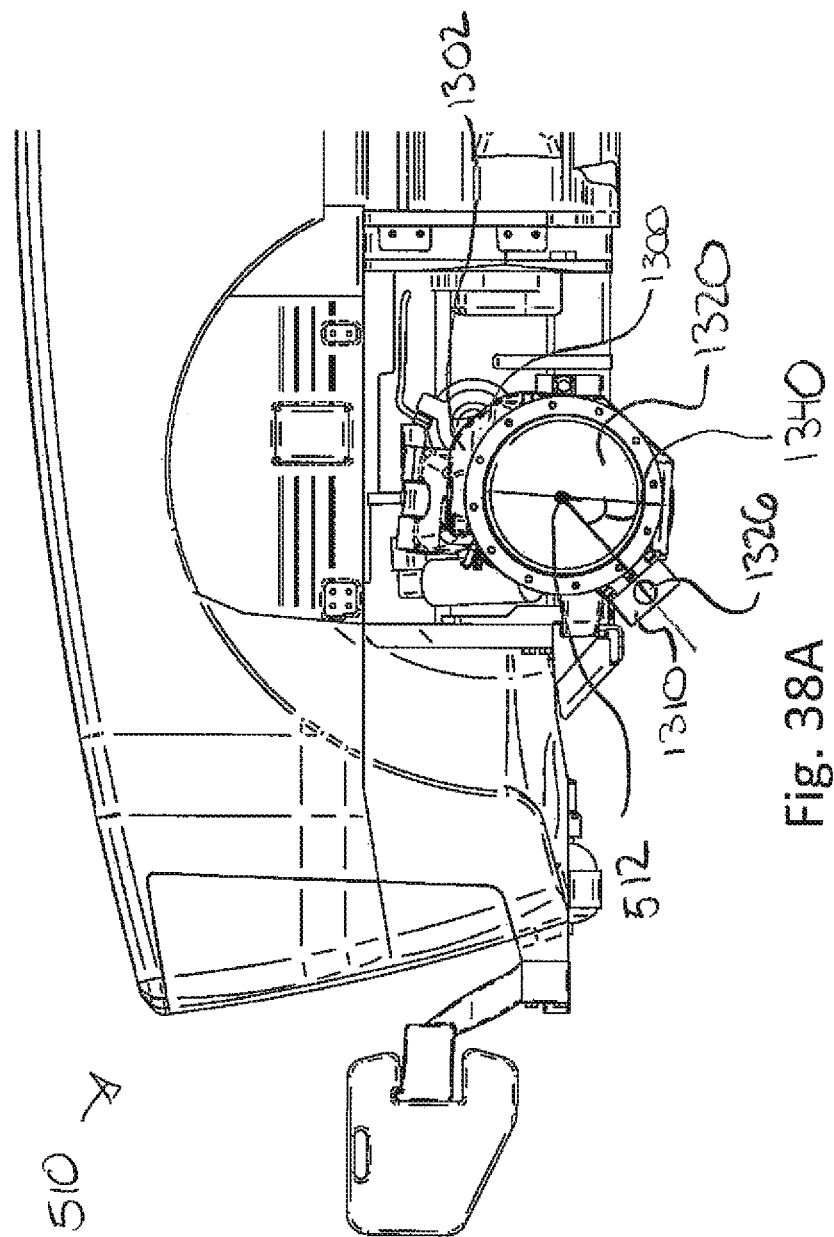

STEERING KNUCKLE FOR A VEHICLE

CROSS-REFERENCE TO RELATED APPLICATIONS

The present patent application is a divisional application of U.S. patent application Ser. No. 14/668,801, entitled "Steering Knuckle for a Vehicle" and filed at the United States Patent and Trademark Office on Mar. 25, 2015; the content of which is incorporated herein by reference, which is a continuation-in-part application of U.S. patent application Ser. No. 13/724,111, entitled "Steering Knuckle for a Vehicle" and filed at the United States Patent and Trademark Office on Dec. 21, 2012; the content of which is incorporated herein by reference, which claims the benefits of priority of U.S. Provisional Patent Application No. 61/579,701, entitled "Steering Knuckle for a Vehicle" and filed at the United States Patent and Trademark Office on Dec. 23, 2011, the content of which is incorporated herein by reference.

FIELD OF THE INVENTION

The present invention generally relates to steering knuckles (also referred to as steering housings) and more particularly to steering knuckles usually used with the front axles of heavy vehicles such as, but not limited to, agricultural vehicles, construction vehicles, industrial vehicles, and forestry vehicles.

BACKGROUND OF THE INVENTION

Soil compaction and floatation have always been important issues for farmers operating tractors and other farming vehicles in their fields. It has thus been found advantageous to replace two or even all four wheels of a farming tractor with track systems which use endless traction bands instead of wheels for propulsion.

Using track systems instead of wheels brings several advantages when operated on soft terrains. The larger surface area of the traction bands improves the floatation and reduces soil compaction. The configuration of the track systems also generally improves the overall traction of the tractor.

However, tractors are still typically sold with wheels and are typically configured to be operated with wheels. Hence, when an operator wants to replace the wheels of its tractor with track systems, the track systems must be properly fitted to the model of tractor of the operator. However, as track systems are typically aftermarket products, track system manufacturers must generally manufacture attachment brackets made specifically for each model of tractors, or more generally, for each model of vehicles, to which the track systems can be installed. However, having to manufacture specific attachment brackets for each model of tractors can be quite expensive.

Furthermore, tractors are typically not configured to be equipped with track systems. Hence, mounting track systems to a tractor generally necessitates the attachment of the track systems to the tractor at locations which, in some case, were not initially designed to support and sustain the additional load and strain imparted by the track systems during use.

This is true of track systems installed as replacement of steerable wheels, typically the front wheels, since the track systems need to remain steerable. Hence, the installation generally involves the attachment of the track systems to or near the steering knuckles (e.g. to the wheel hubs, to the bolts holding the kingpin, etc.).

However, as the steering knuckles of a tractor are generally not made nor configured to support track systems, these installations may, in some cases, cause premature wearing of steering components of the tractor or even premature failure of those components. These installations can also cause premature wearing of components of the track systems (i.e. the traction band, road wheels, idler wheels, etc.) due, for instance, to misalignment between the track systems and the vehicle.

Hence, despite the advantages of using track systems on farming tractors and other vehicles, there are still some shortcomings that need to be addressed.

SUMMARY OF THE INVENTION

At least some of the shortcomings of the prior art steering knuckles and steering assemblies regarding the installation of track systems are generally mitigated by a steering knuckle comprising at least one predetermined and preconfigured attachment area configured to releasably yet rigidly received one or more attachment elements which support a track system.

A steering knuckle in accordance with the principles of the present invention generally comprises an inner or interior region which normally faces the vehicle, an outer or exterior region which normally faces away from the vehicle, and a periphery or perimeter which generally comprises a front region, a rear region, an upper or top region and a lower or bottom region.

Understandably, the exact configuration of the steering knuckle is typically dictated by the configuration of the steering assembly, and also possibly by the configuration of the suspension assembly, of the particular vehicle or vehicles to which the steering knuckle is to be installed. In that sense, the inner region may be particularly configured to be properly connected to the steering assembly, and also possibly to the suspension assembly, of the vehicle.

In accordance with the principles of the present invention, the steering knuckle comprises at least one though typically several attachment areas. These attachment areas are typically, though not necessarily, flat, and are typically, though not necessarily, provided with fastener-receiving openings (e.g. threaded bolt bores).

These attachment areas are generally configured to releasably yet rigidly receive one or more attachment elements or brackets used to secure the track system to the steering knuckle. In that sense, the regions of the steering knuckle where the attachment areas are located, or even the whole steering knuckle, may be made bigger and/or thicker, in other words, reinforced, to support the different and/or additional loads transmitted to the attachment areas during use. Other regions of the steering knuckle could also be reinforced if necessary.

A steering knuckle in accordance with the principles of the present invention therefore generally allows a more robust and possibly more convenient installation of a track system to a vehicle since the steering knuckle is physically configured to properly receive the attachment element(s) use to install the track system to the steering knuckle and is physically configured to properly support the load imparted by the track system installed thereto.

Furthermore, by providing predetermined and preconfigured attachment areas, the steering knuckle in accordance with the principles of the present invention avoids the installation of the track system at inconvenient or weak locations on the vehicle, thereby generally preventing premature wearing or even failure at these locations.

According to a principle of the present invention, the knuckle may comprise an inner side configured to be coupled to a steering assembly to communicate a steering constraint around a vertical axis to a track system attached thereto, an opening configured to receive a power driving mechanism and a periphery comprising several attachment areas, each of the attachment areas being configured to mate with an attachment element. Accordingly, at least one of the attachment areas is configured to secure the track system to the attachment area with fasteners, and the orientation of an axis normal to at least one of the fasteners is between about 30 and 150 degrees from the vertical axis.

According to a principle of the present invention, the steering knuckle for use with a steering assembly of a vehicle equipped with a track system, may comprise, a main portion having an inner side configured to be coupled to a steering assembly to communicate a steering constraint around a vertical axis to a track system attached thereto and an opening configured to receive a power driving mechanism and an attachment portion, located underneath and integrated to the main portion, the attachment portion having at least one attachment area configured to mate with an attachment element, the attachment element is configured to pivotally secure the track system to the attachment areas with fasteners.

According to an aspect of the present invention, the track system is pivotally mounted to the knuckle attachment portion using an elongated member for allowing the track system to pivot longitudinally about the elongated member. Furthermore, the steering knuckle may have an attachment portion comprising a groove for at least partially receiving the elongated member therein. According to yet another aspect of the present invention, the attachment portion comprise an inwardly protruding portion having at least one attachment area located thereto. The attachment portion may comprise an outwardly protruding portion having at least one attachment area located thereto.

According to yet another aspect of the present invention, the steering knuckle comprises an inwardly and an outwardly protruding portion and where one or both of the inwardly and outwardly protruding portions have a downwardly protruding portion defining a longitudinal channel for receiving the track system. The attachment areas generally have at least one opening defining a vertical axis being laterally offset from an axis along a kingpin securing the steering knuckle to the vehicle. The attachment portion may further comprise an inwardly and an outwardly protruding portion and wherein at least one of the inwardly and outwardly protruding portion projects laterally outside of the main portion.

According to an aspect of the present invention, the steering knuckle attachment area may be located on either side of the groove on both a laterally inwardly protruding portion and a laterally outwardly protruding portion. The attachment area may also be configured so that the attachment element can be upwardly fastened thereto.

According to an embodiment, the steering knuckle has a main portion and an attachment portion that are unitary.

According to an aspect of the present invention, the steering knuckle for use with a steering assembly of a vehicle equipped with a track system, comprises, an inner side configured to be coupled to a steering assembly to communicate a steering constraint around a vertical axis to a track system attached thereto, an opening configured to receive a power driving mechanism; and a periphery comprising an inner region inwardly facing the vehicle and an outer region facing outwardly from the vehicle. The steering knuckle generally has at least one attachment area located on said outer periphery and configured to mate with at least one attachment element, the at least one attachment element itself configured to secure the track system to the attachment area. Accordingly, at least one of the inner and outer regions of the steering knuckle comprises at least one attachment area.

According to an aspect of the present invention, the attachment areas of the steering knuckle's inner region of are located about the periphery. The steering knuckle may also further have a stub and attachment areas of the outer region located about the stub and parallel thereto. The attachment areas of the outer region may also be disposed to surround the stub. According to yet another aspect of the present invention, the stub is preferably outwardly spaced to prevent hindrance between the attachment element and a wheel hub mounted to the stub. The outer region of the steering knuckle may also have an outwardly protruding portion surrounding the stub. Furthermore, the attachment area generally has fastener receiving slots, and wherein the fasteners receiving slots have a lengths equal to the thickness of the knuckle. The inner regions may also comprise attachment areas surrounding the opening. Such attachment areas are generally designed for receiving fasteners inserted from the inside out.

According to an aspect of the present invention, it is disclosed a vehicle comprising left and right steering assemblies. The vehicle generally comprising a pair of steering knuckles respectively mounted to the left and right steering assemblies. It is to be understood that, though applicable to agricultural vehicle, the steering knuckle described herein may also be applied to smaller wheeled vehicle susceptible to have track assemblies mounted there to, such as but not limited to ATV, UTV, OHV, etc.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which:

FIG. 16 is a bottom view of the steering knuckle of FIG. 10.

FIG. 18A is a top plan view of the steering knuckle of FIG. 17A.

FIG. 18B is a perspective view along the A-A axis of the steering knuckle of FIG. 18A.

FIG. 18C is an exterior view of the steering knuckle of FIG. 18A.

FIG. 19C is an exploded view of the farming tractor equipped with an embodiment of a steering knuckle of FIG. 19A.

FIG. 20A is a top view of the steering knuckle of FIG. 19A.

FIG. 20B is a bottom view of the steering knuckle of FIG. 20A.

FIG. 20C is an exterior view of the steering knuckle of FIG. 20A.

FIG. 20D is a perspective view along the A-A axis of the steering knuckle of FIG. 20A.

FIG. 24E is an exterior view of the steering knuckle of FIG. 24A.

FIG. 24F is a perspective view along the A-A axis of the steering knuckle of FIG. 24E.

FIG. 25A is a fragmentary left side perspective view of a farming tractor equipped with an embodiment of a steering knuckle having angled top attachment area in accordance with the principles of the present invention.

FIG. 25C is an exploded view of the farming tractor equipped with an embodiment of a steering knuckle of FIG. 25A.

FIG. 25D is a fragmentary front exploded view of the farming tractor equipped with an embodiment of a steering knuckle of FIG. 25A.

FIG. 28A is a bottom view of the farming tractor equipped with an embodiment of a steering knuckle of FIG. 27A.

FIG. 28B is a perspective view of the steering knuckle of FIG. 28A.

FIG. 28C is an interior view of the steering knuckle of FIG. 28A.

FIG. 28D is a front view of the steering knuckle of FIG. 28A.

FIG. 30A is a bottom view of the steering knuckle of FIG. 29A.

FIG. 30B is a perspective view of the steering knuckle of FIG. 30A.

FIG. 30C is an interior view of the steering knuckle of FIG. 30A.

FIG. 30D is a front view of the steering knuckle of FIG. 30A.

FIG. 33E is a top exploded view of the farming tractor equipped with an embodiment of a steering knuckle of FIG. 33A.

FIG. 34A is a perspective view of the steering knuckle of FIG. 33A.

FIG. 34B is a bottom view of the steering knuckle of FIG. 34A.

FIG. 34C is an interior view of the steering knuckle of FIG. 34A.

FIG. 34D is a front view of the steering knuckle of FIG. 34A.

FIG. 34E is a top view of the steering knuckle of FIG. 34A.

FIG. 34F is a perspective view along the A-A axis of the steering knuckle of FIG. 34E.

FIG. 34G is an exterior view of the steering knuckle of FIG. 34A.

FIG. 34H is a perspective view of the steering knuckle of FIG. 34A.

FIG. 34I is a rear view of the steering knuckle of FIG. 34A.

FIG. 35A is a fragmentary right side perspective view of a farming tractor equipped with an embodiment of a steering knuckle in accordance with the principles of the present invention.

FIG. 35B is an exterior view of the farming tractor equipped with an embodiment of a steering knuckle of FIG. 35A.

Figure 35A:
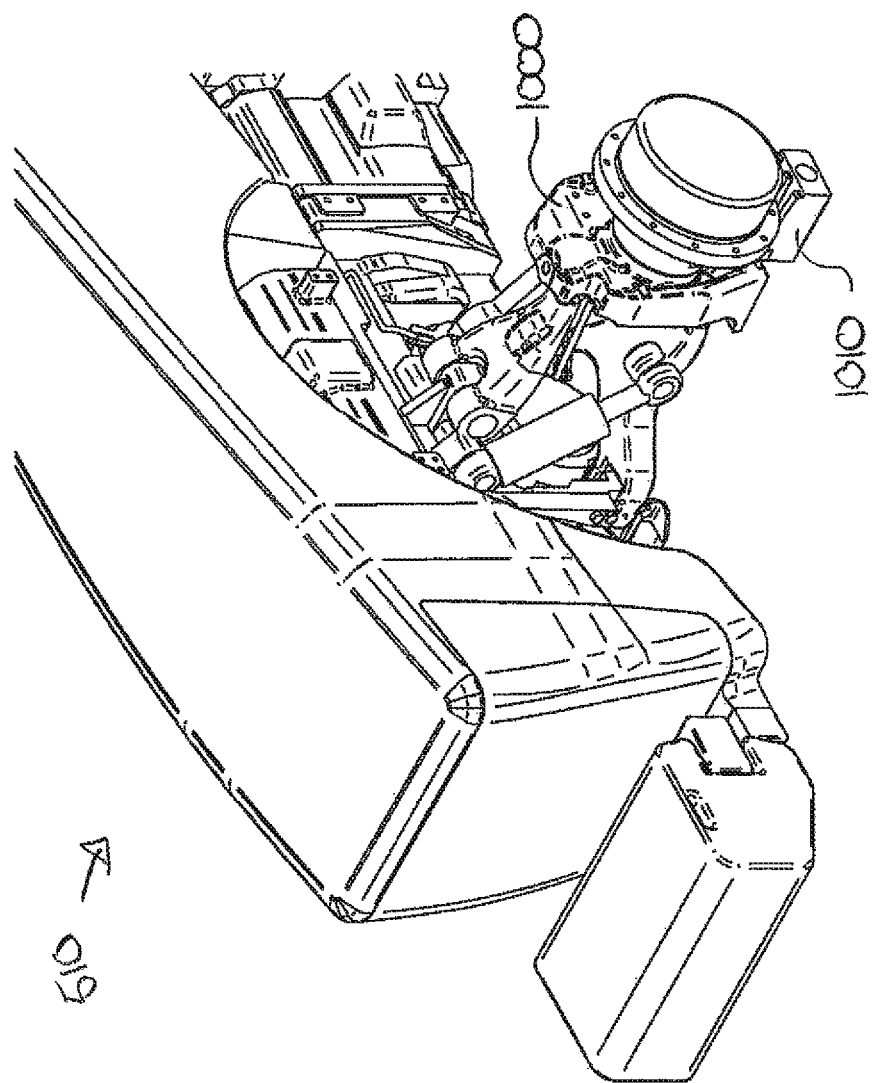
Figure 35B:
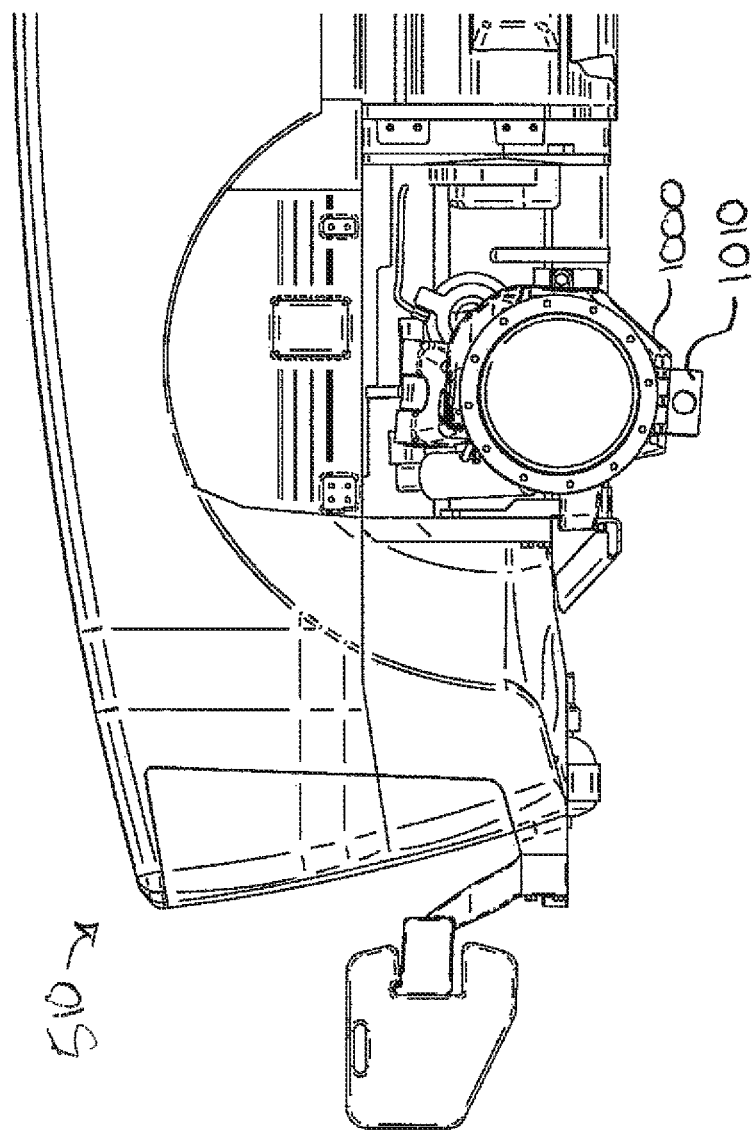
Figure 35C:
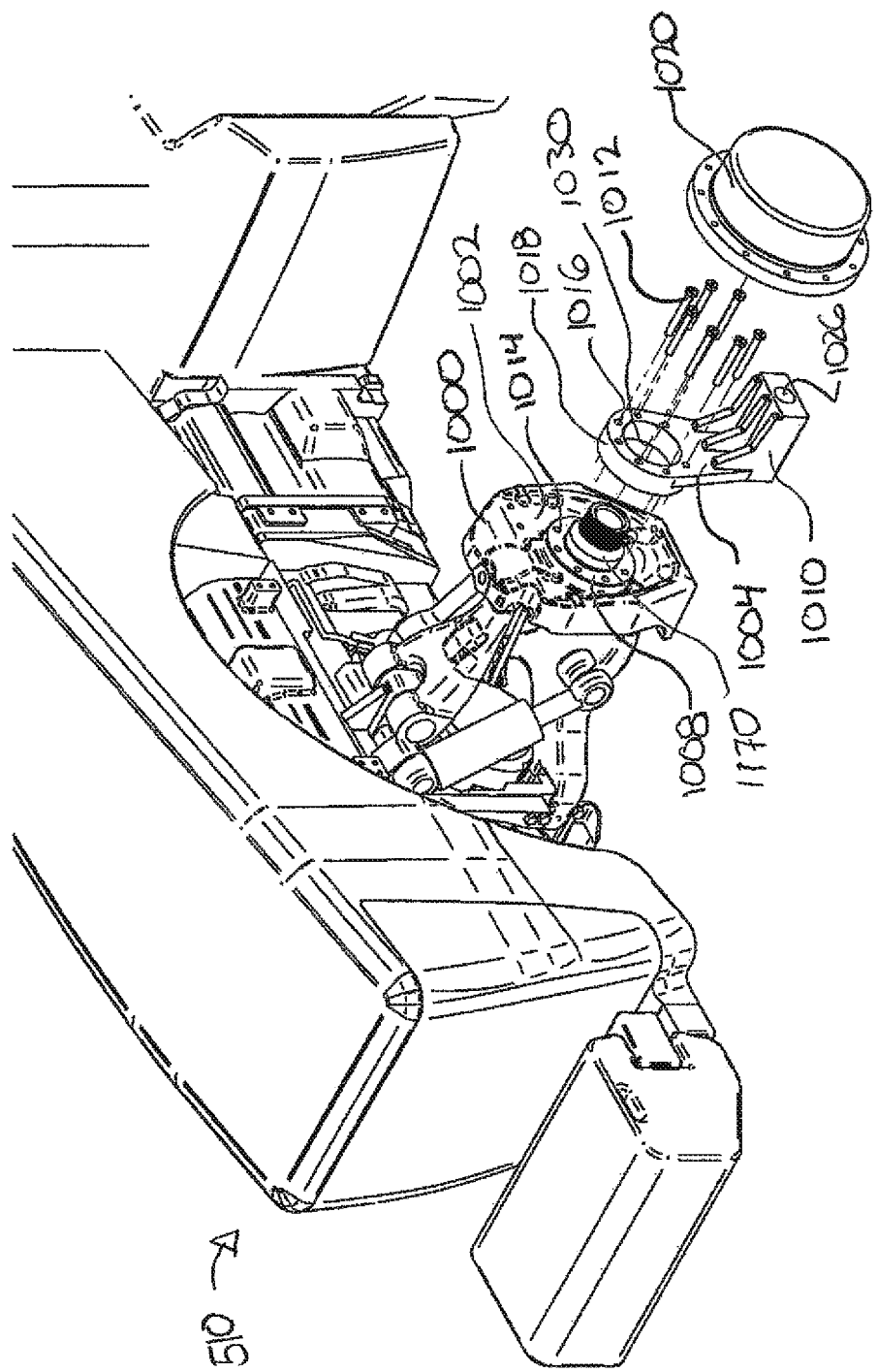

FIG. 35C is a perspective exploded view of the farming tractor equipped with an embodiment of a steering knuckle of FIG. 35A.

FIG. 35D is a front exploded view of the farming tractor equipped with an embodiment of a steering knuckle of FIG. 35A.

FIG. 36A is a bottom view of the steering knuckle of FIG. 35A.

FIG. 36B is a perspective view of the steering knuckle of FIG. 36A.

FIG. 36C is an interior view of the steering knuckle of FIG. 36A.

FIG. 36D is a front view of the steering knuckle of FIG. 36A.

Figure 36E:
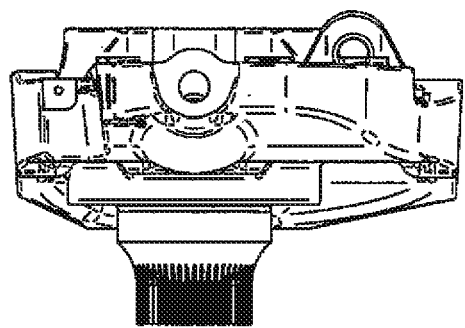

FIG. 36E is a top view of the steering knuckle of FIG. 36A.

Figure 36F:
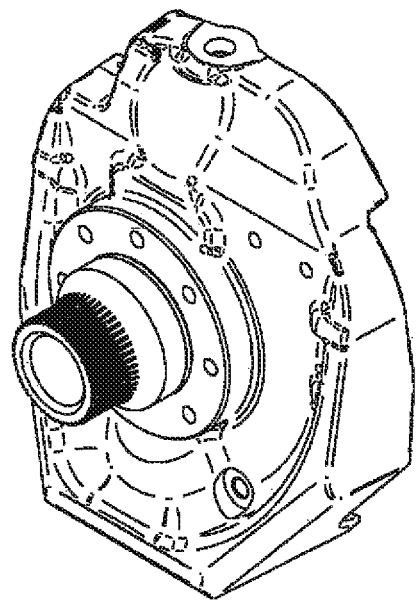

FIG. 36F is a perspective view of the steering knuckle of FIG. 36E.

Figure 36G:
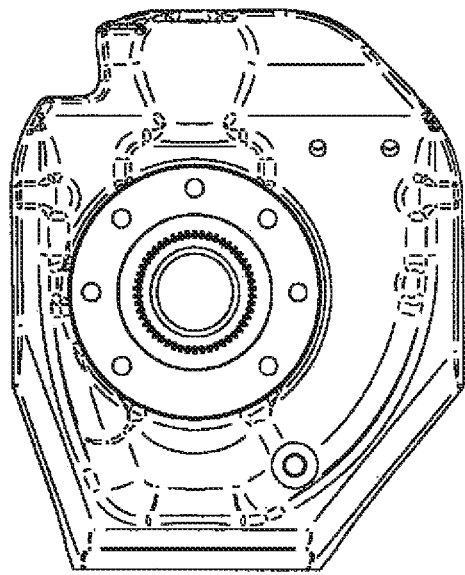

FIG. 36G is an exterior view of the steering knuckle of FIG. 36A.

Figure 36H:
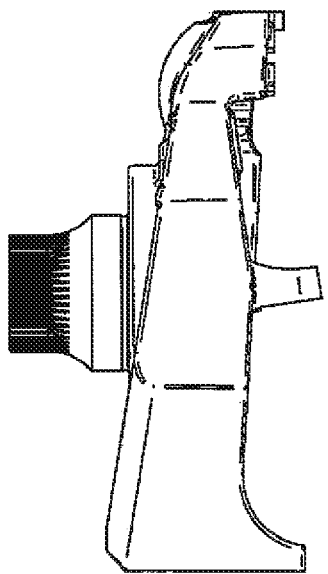

FIG. 36H is a rear view of the steering knuckle of FIG. 36A.

Figure 37A:
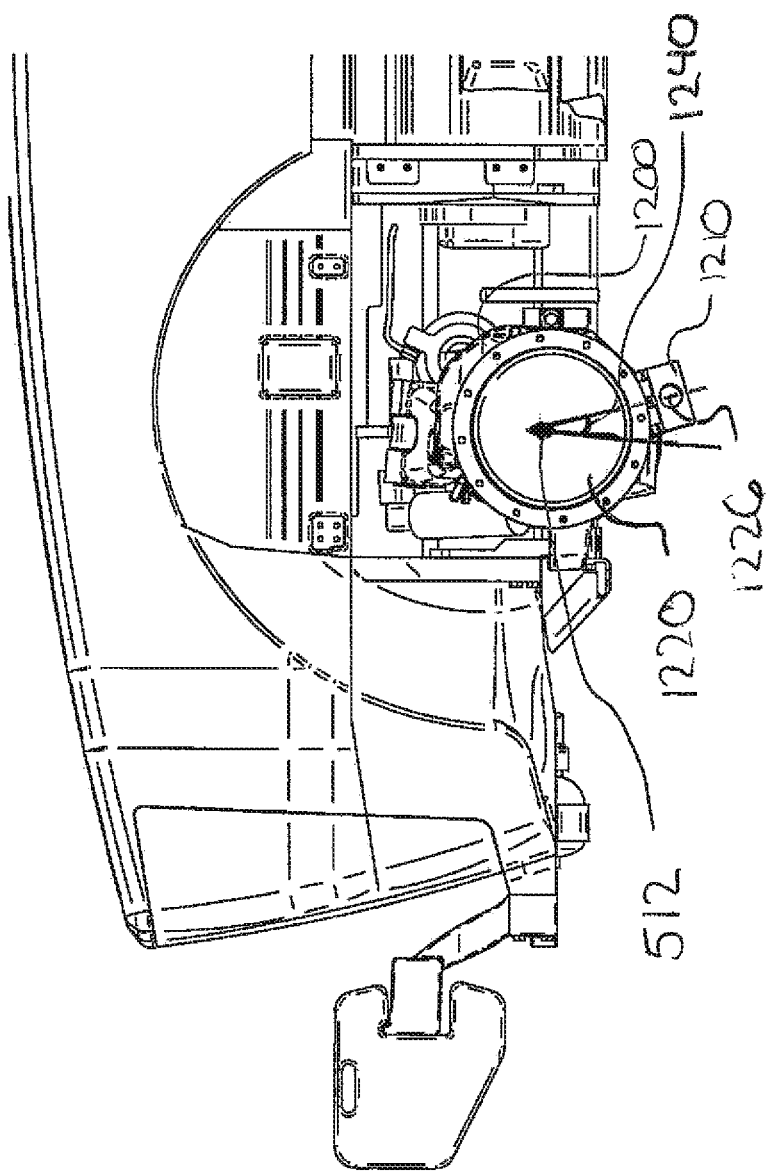

FIG. 37A is a fragmentary right exterior view of a farming tractor equipped with an embodiment of a steering knuckle in accordance with the principles of the present invention.

Figure 37B:
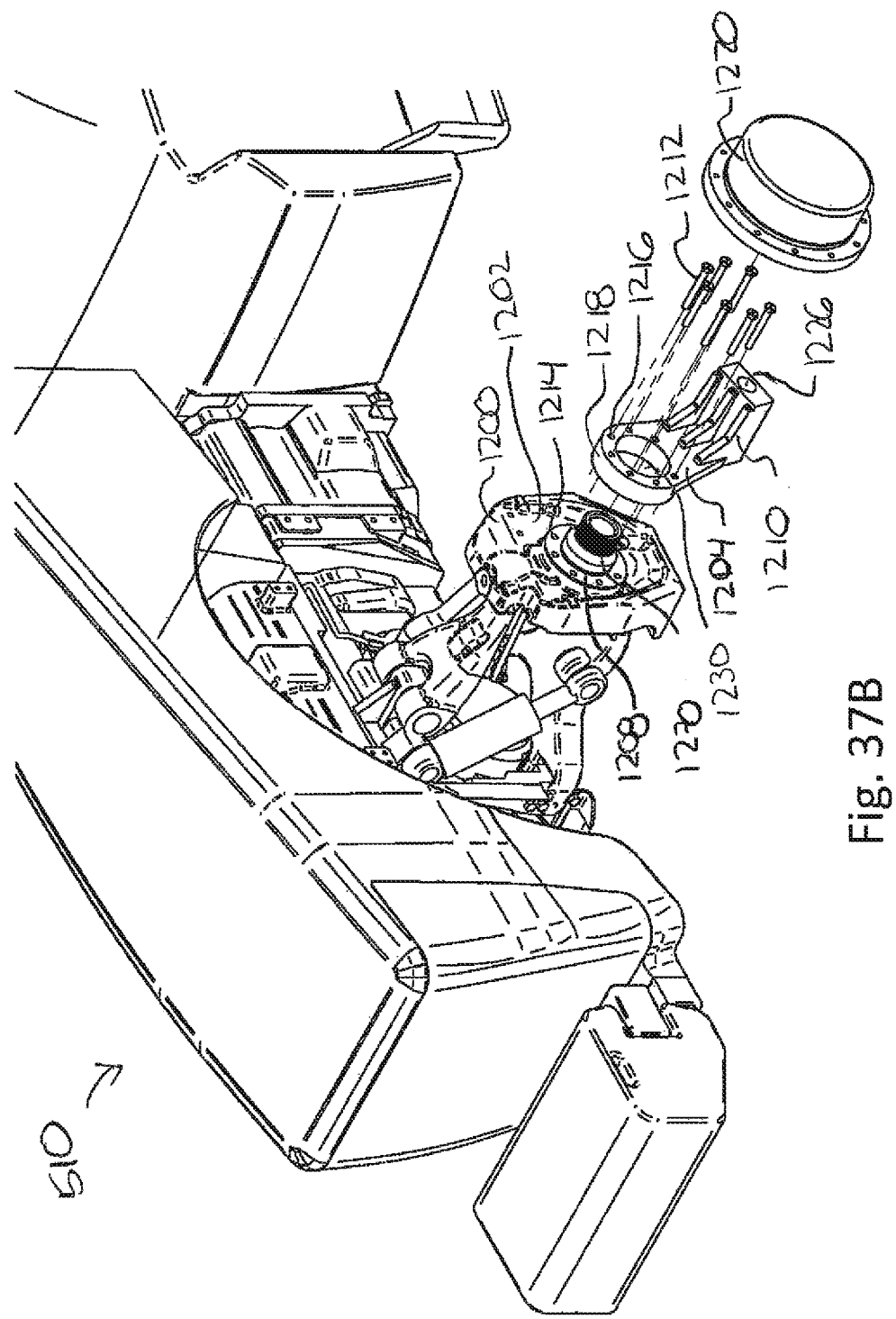

FIG. 37B is an exploded view of the farming tractor equipped with an embodiment of a steering knuckle of FIG. 37A.

FIG. 37C is a right exterior view of the farming tractor equipped with an embodiment of a steering knuckle of FIG. 37A without the wheel hub.

FIG. 38A is a fragmentary right exterior view of a farming tractor equipped with an embodiment of a steering knuckle in accordance with the principles of the present invention.

Figure 38B:
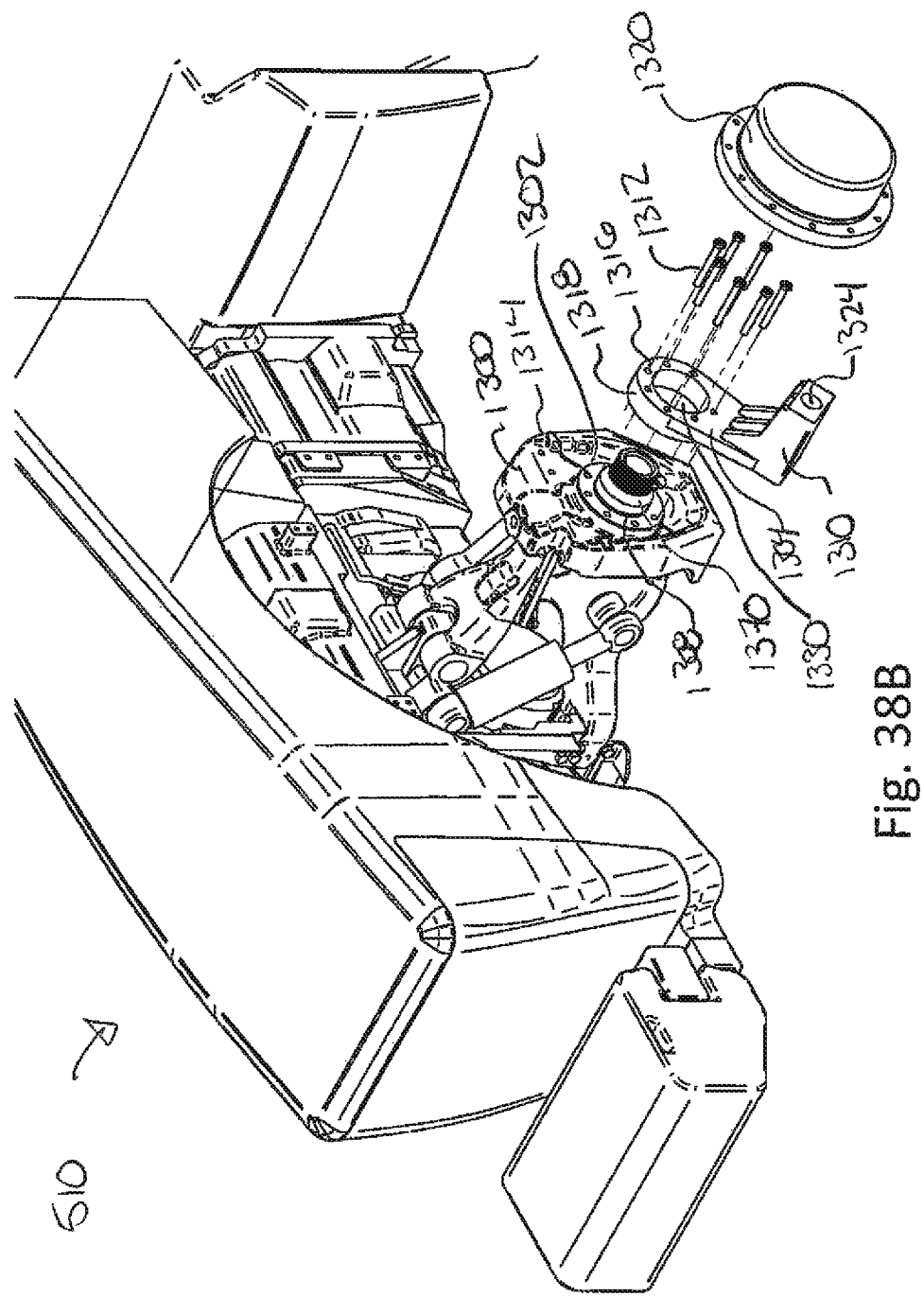

FIG. 38B is an exploded view of the farming tractor equipped with an embodiment of a steering knuckle of FIG. 38A.

Figure 39A:
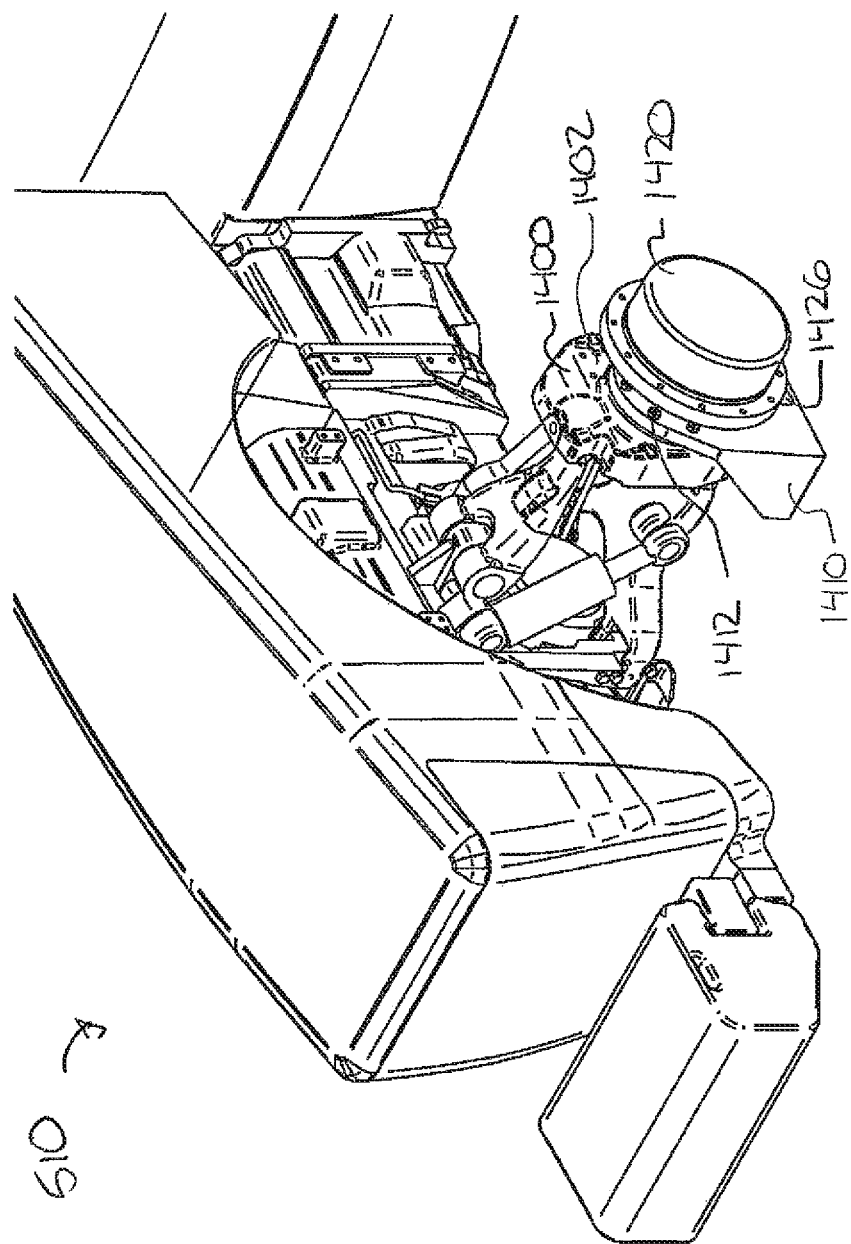

FIG. 39A is a fragmentary right perspective view of a farming tractor equipped with an embodiment of a steering knuckle in accordance with the principles of the present invention.

Figure 39B:
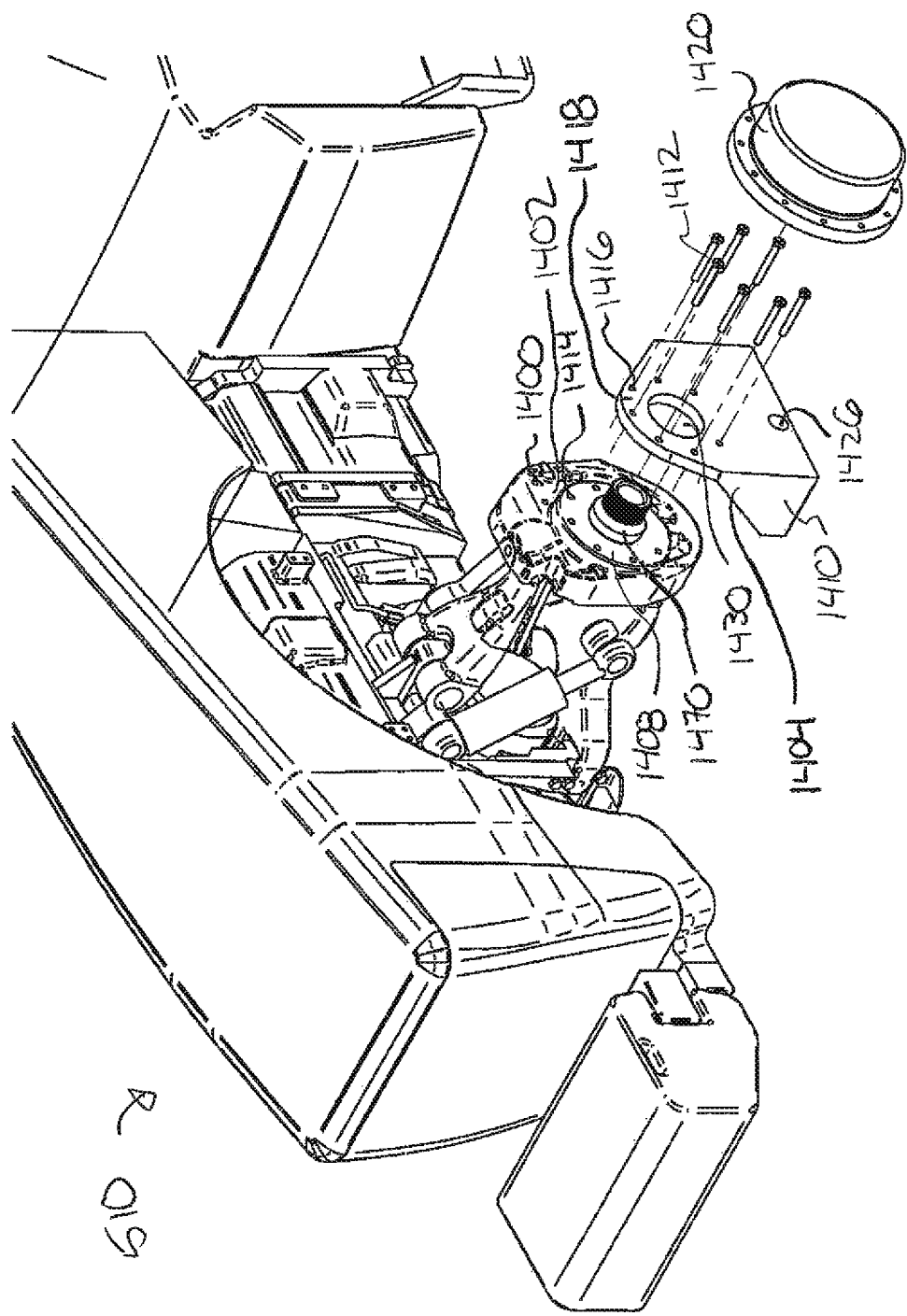

FIG. 39B is an exploded view of the farming tractor equipped with an embodiment of a steering knuckle of FIG. 39A.

Figure 39C:
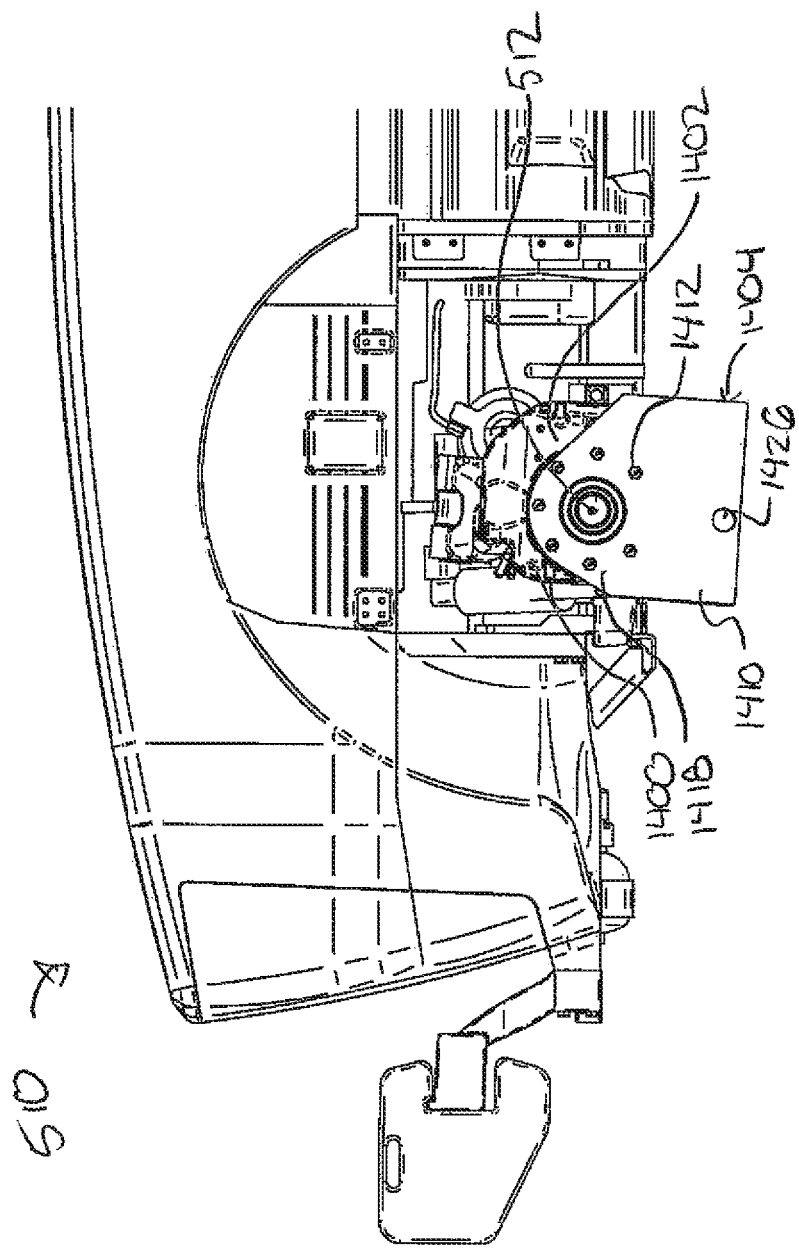

FIG. 39C is a right exterior view of the farming tractor equipped with an embodiment of a steering knuckle of FIG. 39A without the wheel hub.

Figure 39D:
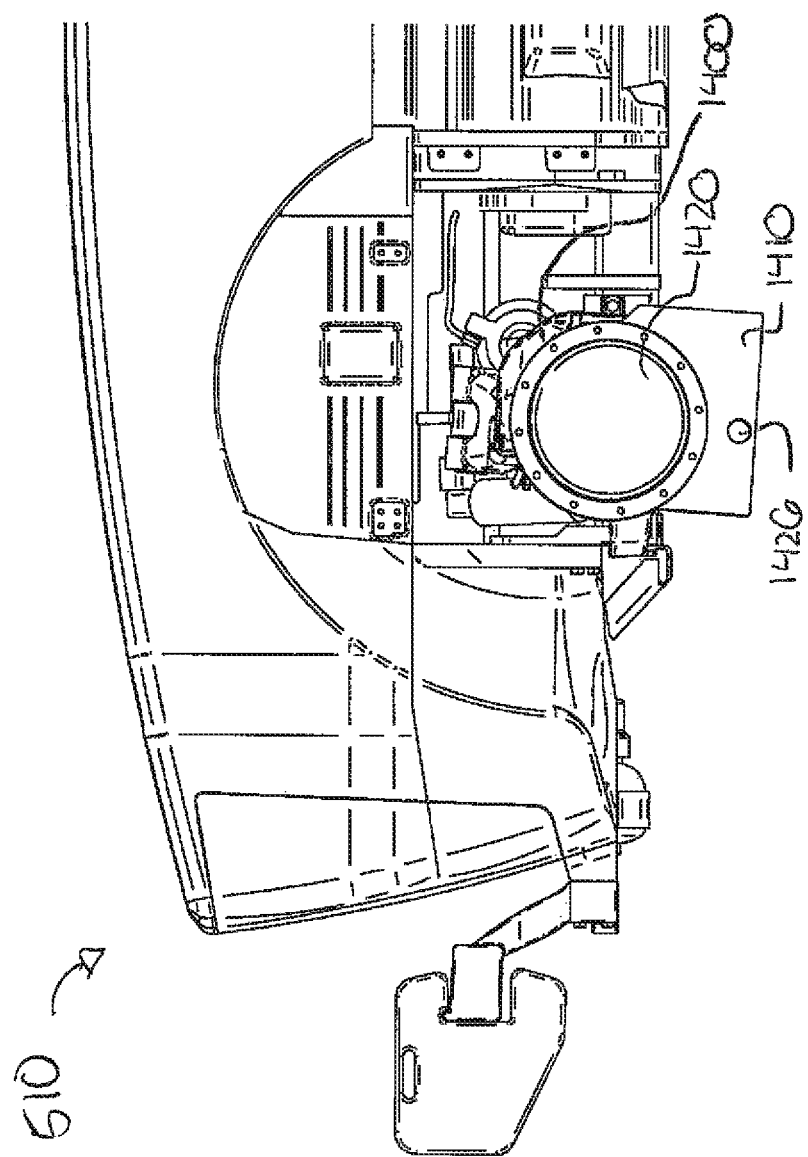

FIG. 39D is a right exterior view of the farming tractor equipped with an embodiment of a steering knuckle of FIG. 39A.

Figure 40A:
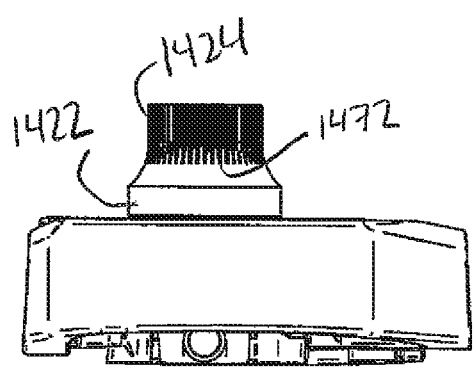

FIG. 40A is a bottom view of the steering knuckle of FIG. 39A.

Figure 40B:
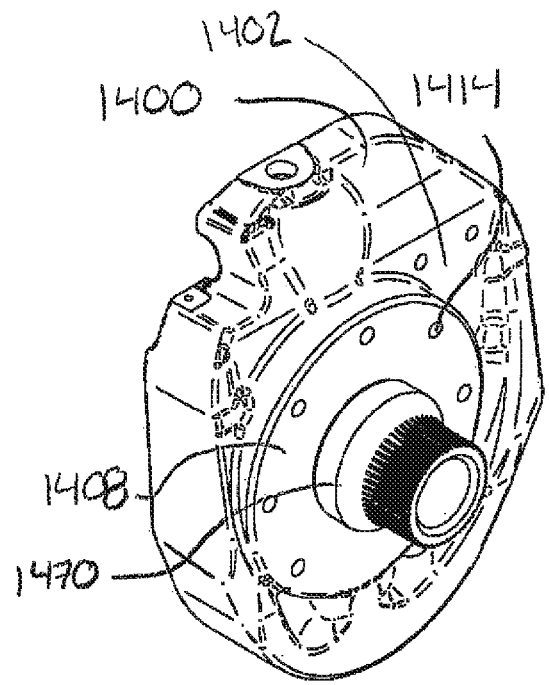

FIG. 40B is a perspective view of the steering knuckle of FIG. 40A.

Figure 40C:
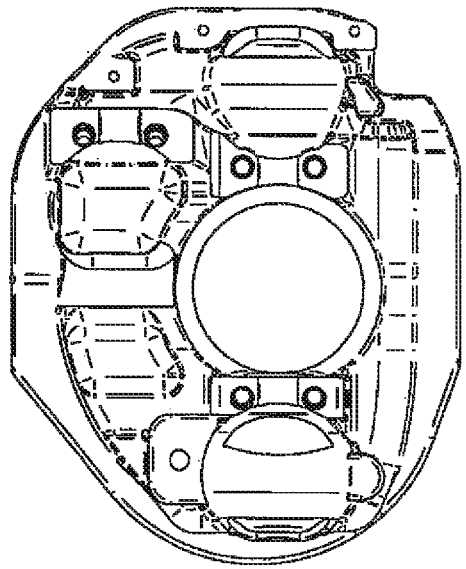

FIG. 40C is an interior view of the steering knuckle of FIG. 40A.

Figure 40D:
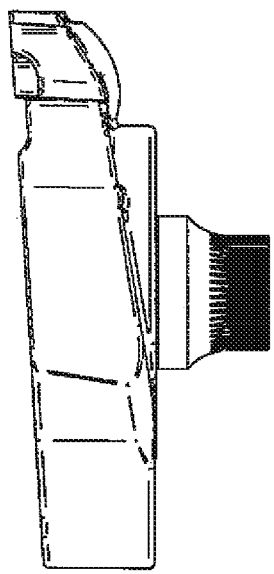

FIG. 40D is a front view of the steering knuckle of FIG. 40A.

Figure 40E:
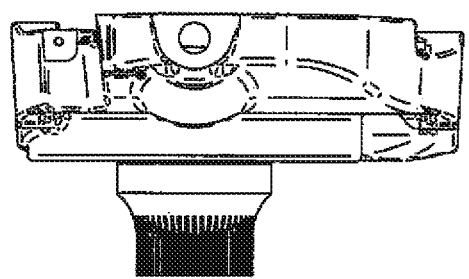

FIG. 40E is a top view of the steering knuckle of FIG. 40A.

Figure 40F:
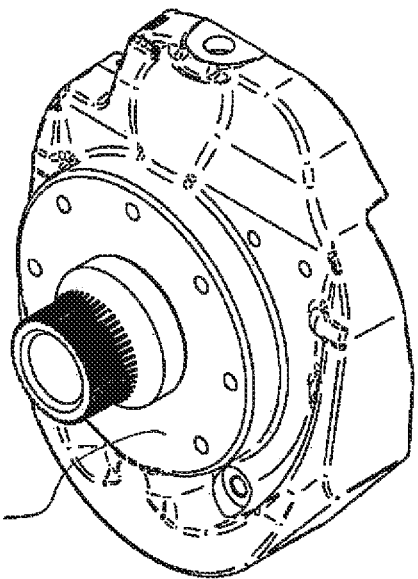

FIG. 40F is a perspective view of the steering knuckle of FIG. 40A.

Figure 40G:
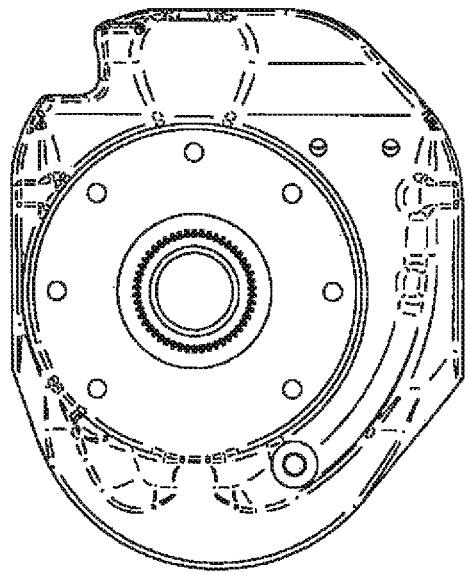

FIG. 40G is an exterior view of the steering knuckle of FIG. 40A.

Figure 40H:
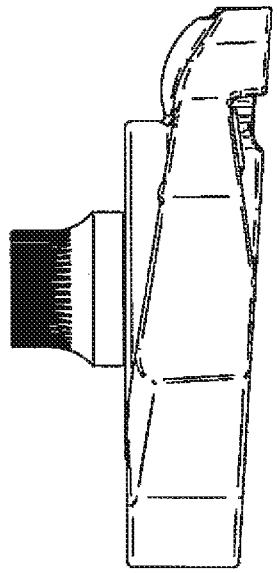

FIG. 40H is a rear view of the steering knuckle of FIG. 40A.

Figure 41A:
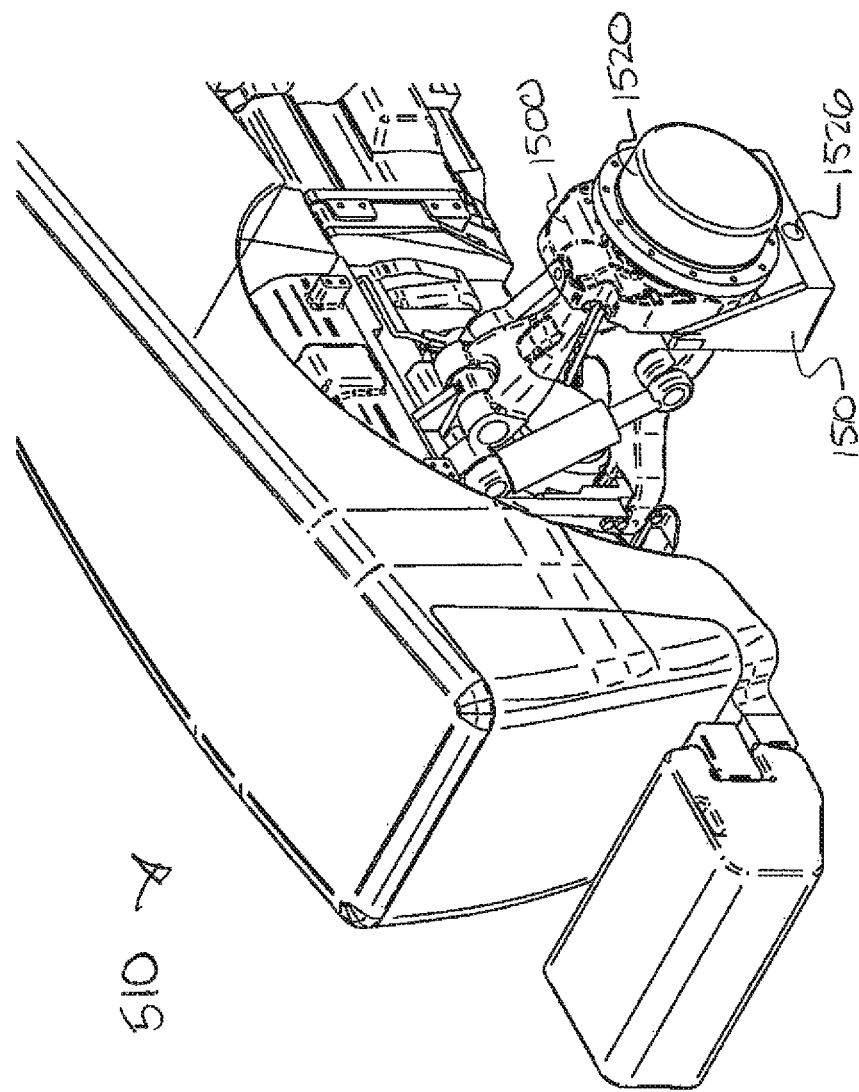

FIG. 41A is a fragmentary right perspective view of a farming tractor equipped with an embodiment of a steering knuckle in accordance with the principles of the present invention.

Figure 41B:
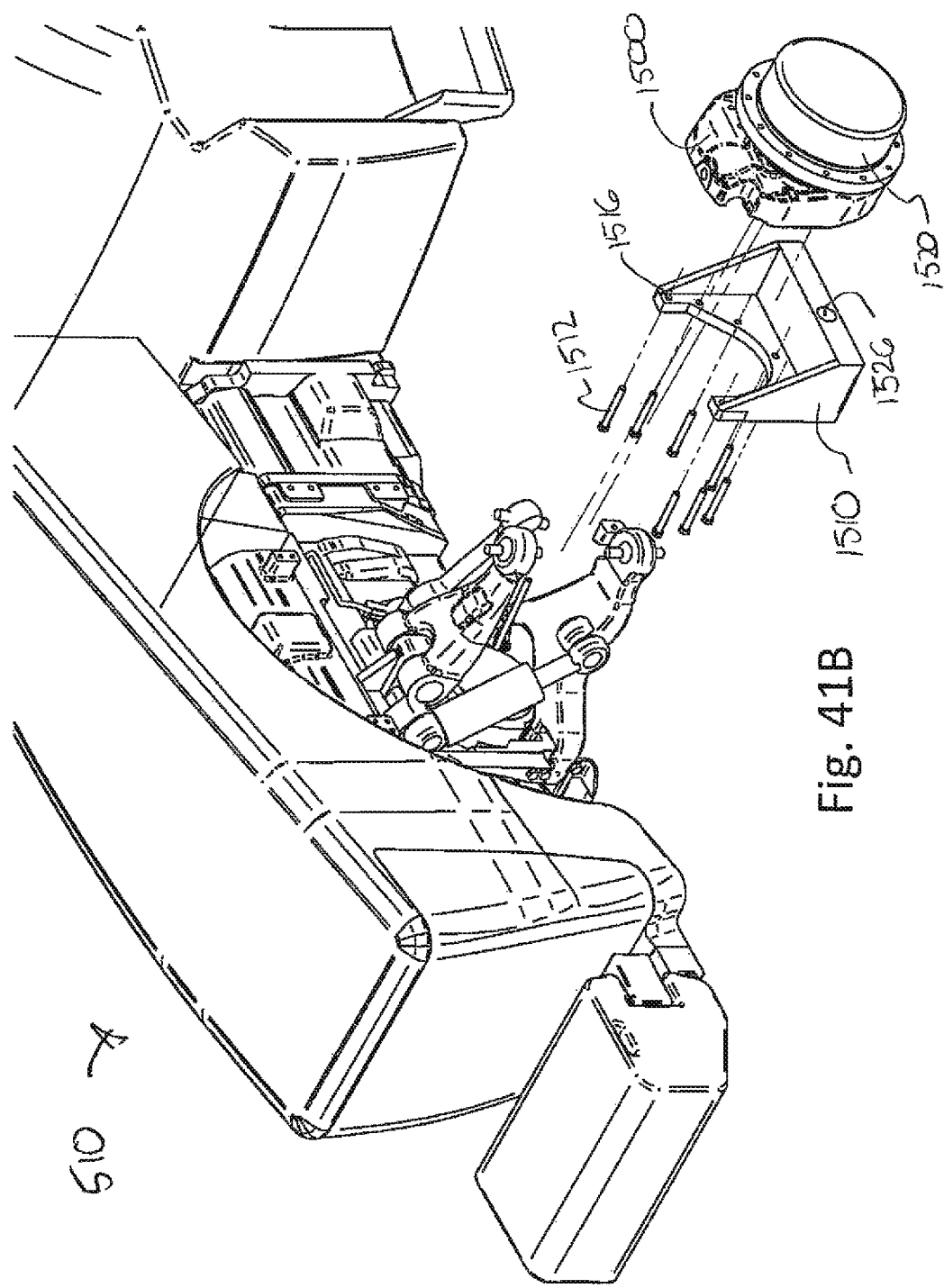

FIG. 41B is an exploded view of the farming tractor equipped with an embodiment of a steering knuckle of FIG. 41A.

Figure 41C:
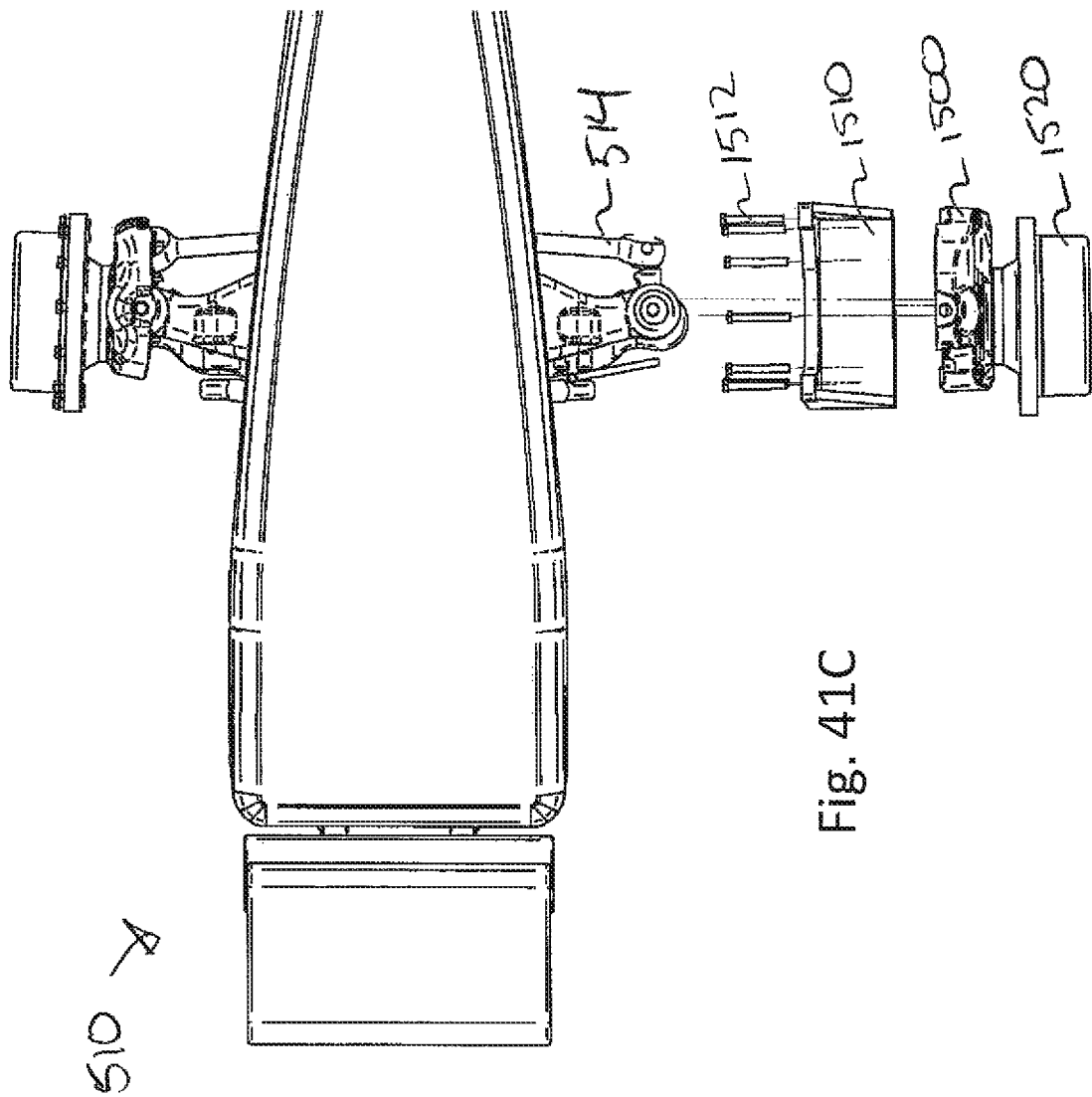

FIG. 41C is a top exploded view of the farming tractor equipped with an embodiment of a steering knuckle of FIG. 41A without the wheel hub.

Figure 41D:
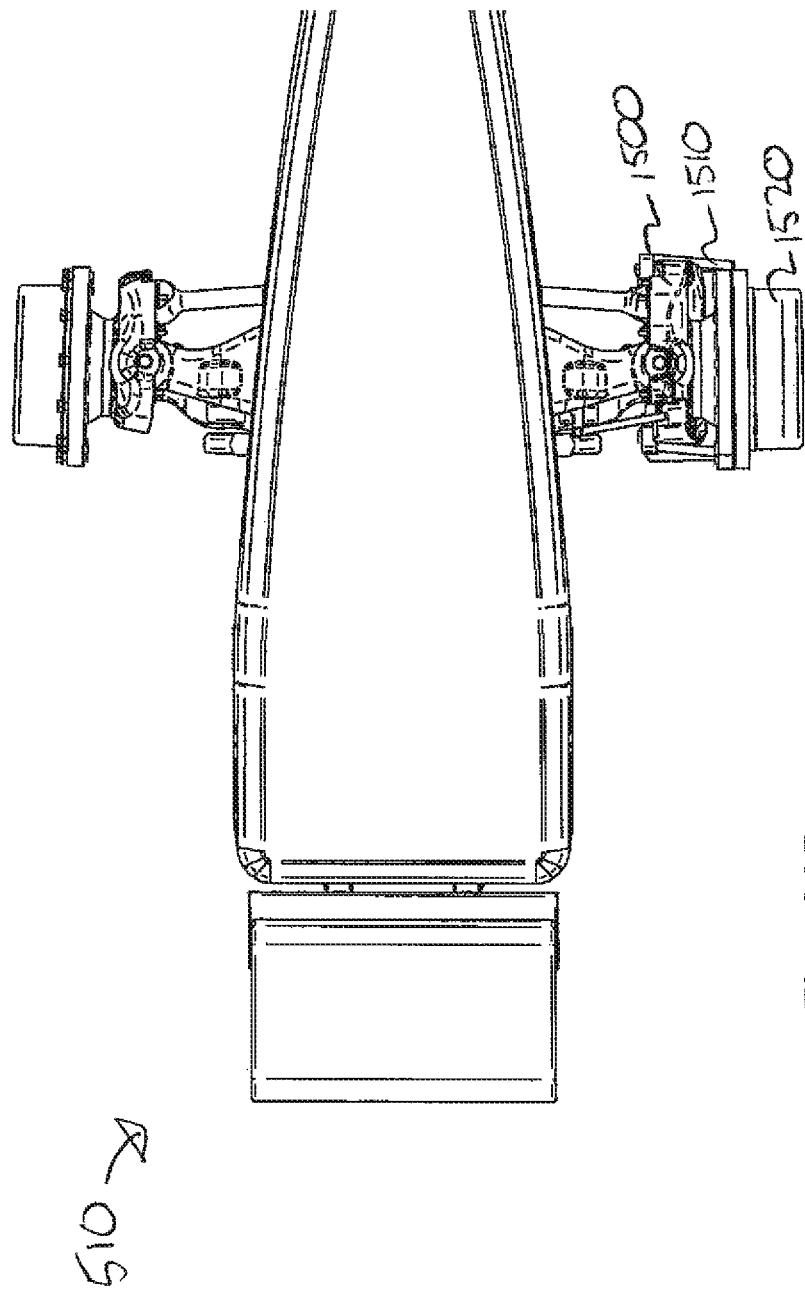

FIG. 41D is a top view of the farming tractor equipped with an embodiment of a steering knuckle of FIG. 41A.

Figure 42A:
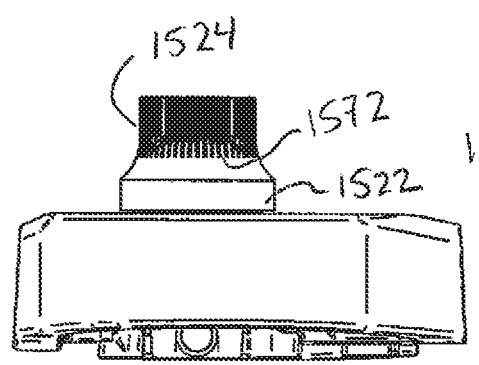

FIG. 42A is a bottom view of the steering knuckle of FIG. 41A.

Figure 42B:
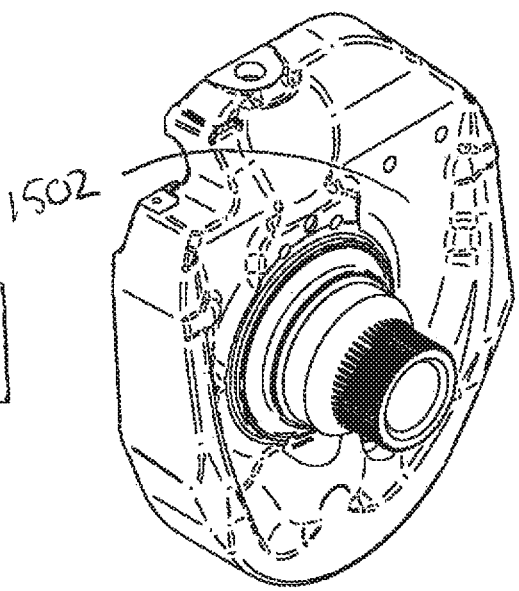

FIG. 42B is a perspective view of the steering knuckle of FIG. 42A.

Figure 42C:
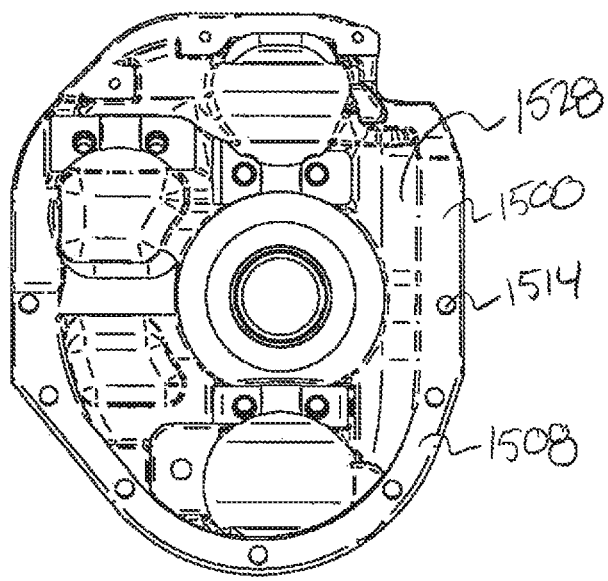

FIG. 42C is an interior view of the steering knuckle of FIG. 42A.

Figure 42D:
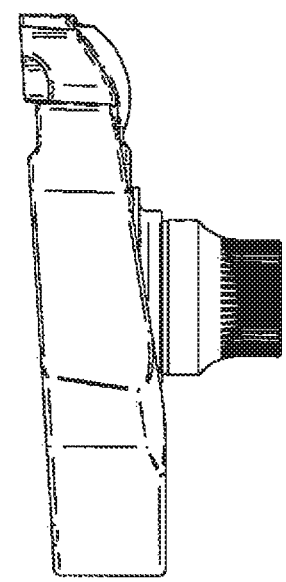

FIG. 42D is a front view of the steering knuckle of FIG. 42A.

Figure 42E:
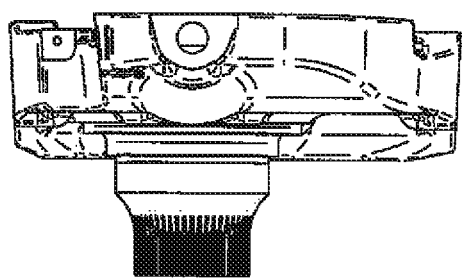

FIG. 42E is a top view of the steering knuckle of FIG. 42A.

Figure 42F:
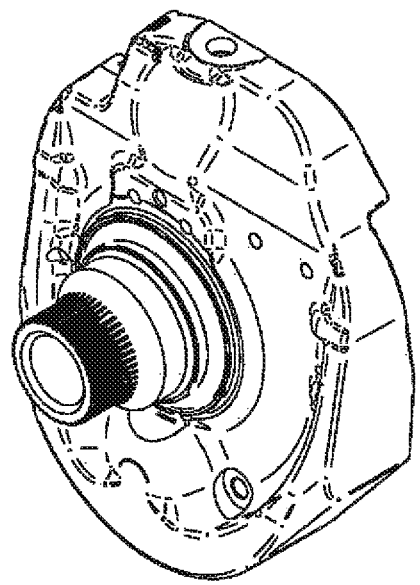

FIG. 42F is a perspective view of the steering knuckle of FIG. 42A.

Figure 42G:
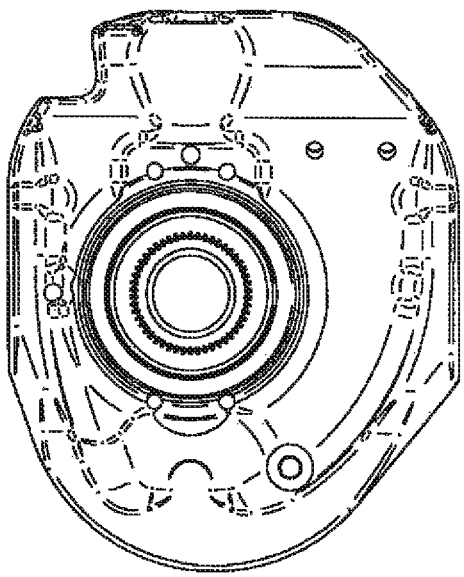

FIG. 42G is an exterior view of the steering knuckle of FIG. 42A.

Figure 42H:
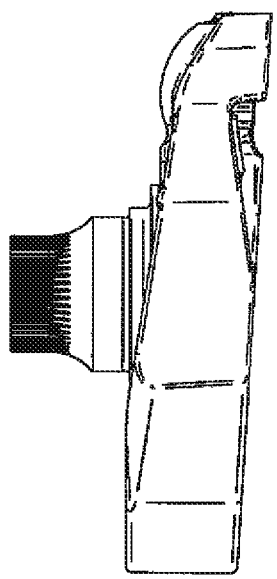

FIG. 42H is a rear view of the steering knuckle of FIG. 42A.

DETAILED DESCRIPTION OF THE PREFERRED EMBODIMENT

A novel steering knuckle for a vehicle will be described hereinafter. Although the invention is described in terms of specific illustrative embodiments, it is to be understood that the embodiments described herein are by way of example only and that the scope of the invention is not intended to be limited thereby.

Broadly, steering knuckles in accordance with the principles of the present invention can be used on vehicles, such as farming tractors, having either combined steering and suspension assemblies or having rigid axle with steering assembly.

Referring first to FIGS. 1 to 9, a first embodiment of a steering knuckle 100 in accordance with the principles of the present invention is illustrated.

Figure 1:
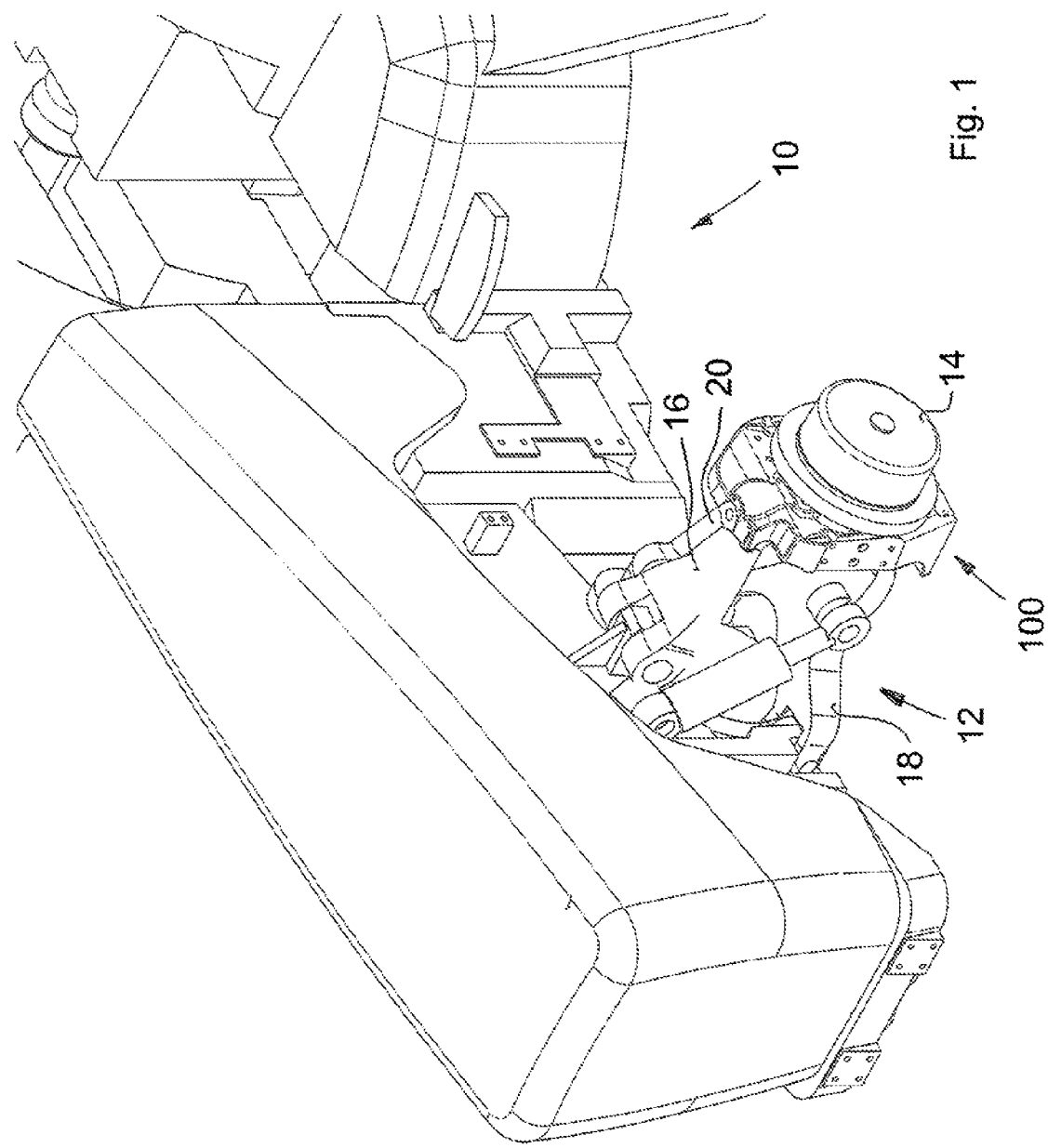
FIG. 1 is a fragmentary left side perspective view of a farming tractor equipped with an embodiment of a steering knuckle in accordance with the principles of the present invention.

Referring now to FIG. 1, the steering knuckle 100 is illustrated as normally installed to the front left steering and suspension assembly 12 of a vehicle 10. In FIG. 1, the vehicle 10 is a farming tractor commonly used on farms. Still, the steering knuckle 100 could be used on other vehicles having similar steering and suspension assembly.

The knuckle 100 is typically coupled to the steering and suspension assembly 12 via ball joints (or other pivotal arrangements). As it will shown in greater details below, the steering knuckle 100 is also configured to receive the drive shaft (not shown) of the vehicle 10 and to support the planetary gear assembly which drives the wheel hub 14 to which the wheel (not shown) of the vehicle 10 is normally mounted.

Though not shown, a right steering knuckle 100, which is substantially a mirror image of the left steering knuckle 100 shown in FIG. 1, is also installed on the right side of the vehicle 10. As both the left side and the right side knuckles 100 are substantially identical, aside from being mirror images of each other, only the left side knuckle 100 will be described below.

Though the knuckle 100 could be an original component, it is typically a replacement or an aftermarket component used to replace the original knuckle of the vehicle 10. It remains that a vehicle could be initially equipped with knuckles 100 such as to make the vehicle "track ready".

Figure 2:
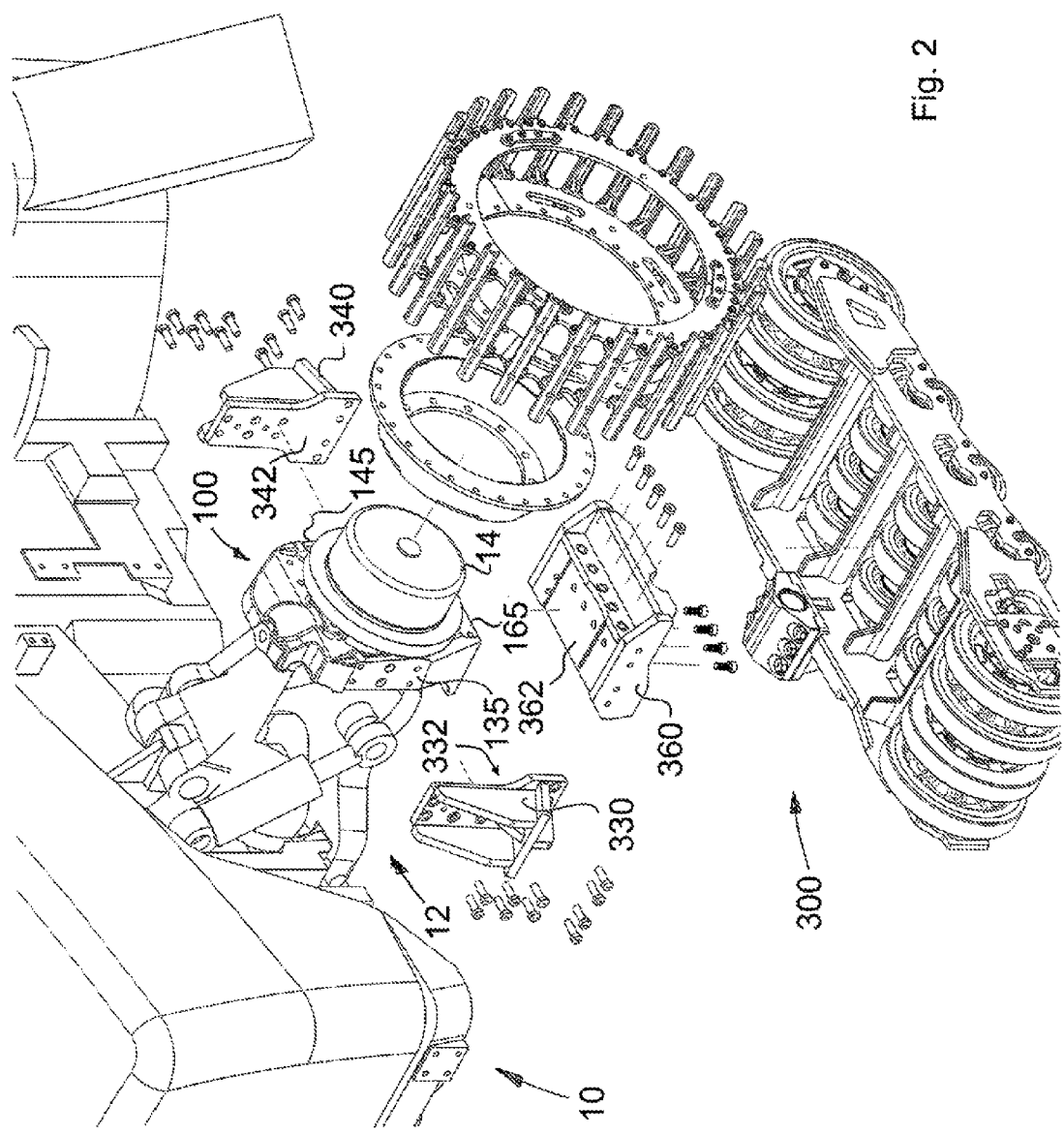
FIG. 2 is a fragmentary left side perspective view of the farming tractor equipped with the steering knuckle of FIG. 1, and further comprising an exploded track system without the endless traction band.

Referring now to FIG. 2 and more particularly to FIGS. 4 to 9, the steering knuckle 100 will be described in more details.

Broadly, the steering knuckle 100 can be seen as comprising an outer side 110 which normally faces away from the vehicle 10, an inner side 120 which normally faces the vehicle 10, and an overall periphery or peripheral surface 105 which generally comprises front and rear regions 130 and 140, and top and bottom regions 150 and 160.

Figure 4:
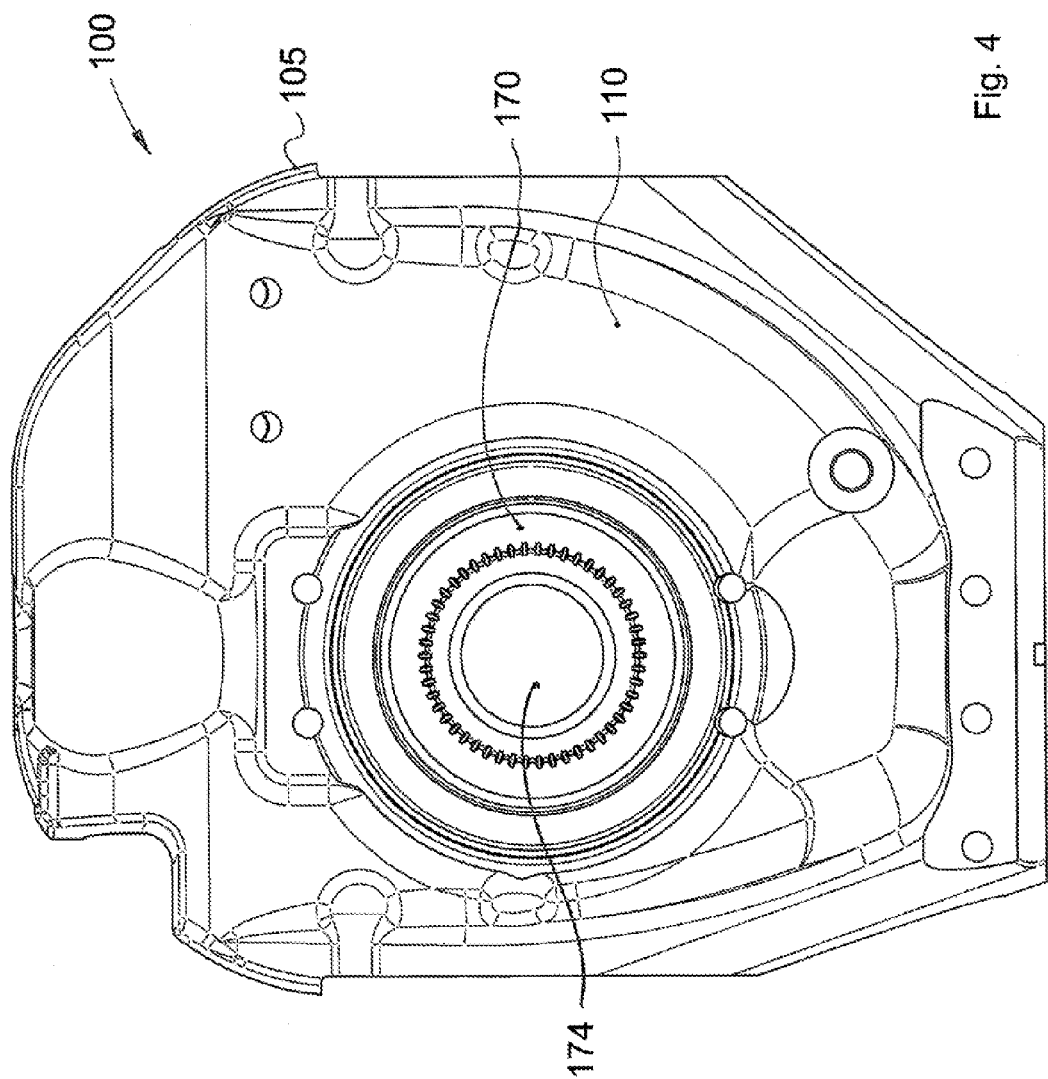
FIG. 4 is an exterior view of the steering knuckle of FIG. 1.

Notably, as can be seen in FIG. 4, the peripheral surface 105 of the steering knuckle 100 is not regular and its exact shape can vary widely according to the vehicle or vehicles for which the steering knuckle is designed for. Hence, the term front, top, rear and bottom used with respect to the regions of the peripheral surface 105 of the steering knuckle 100 must not be construed with geometric exactness.

Figure 5:
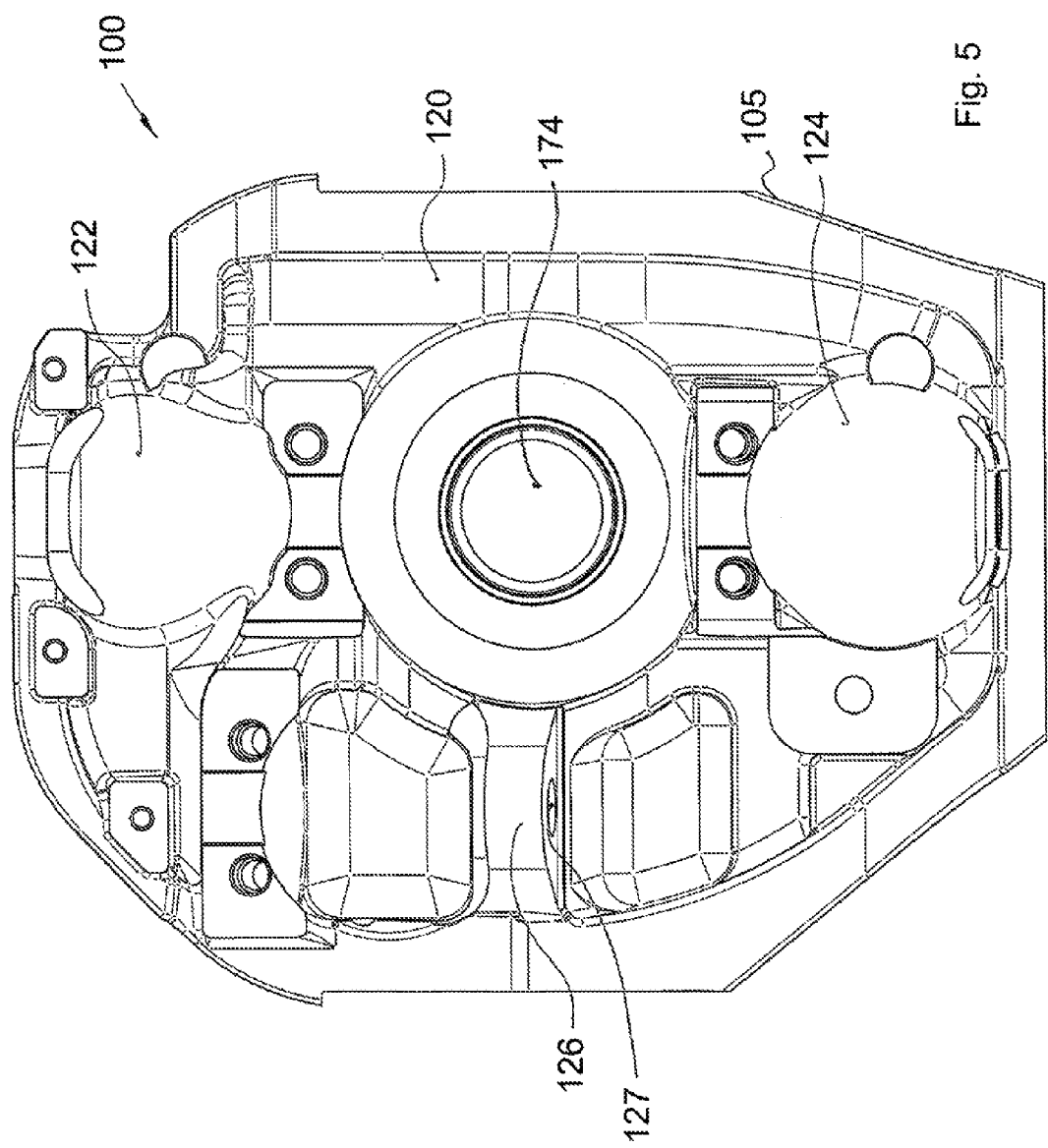
FIG. 5 is an interior view of the steering knuckle of FIG. 1.
Figure 6:
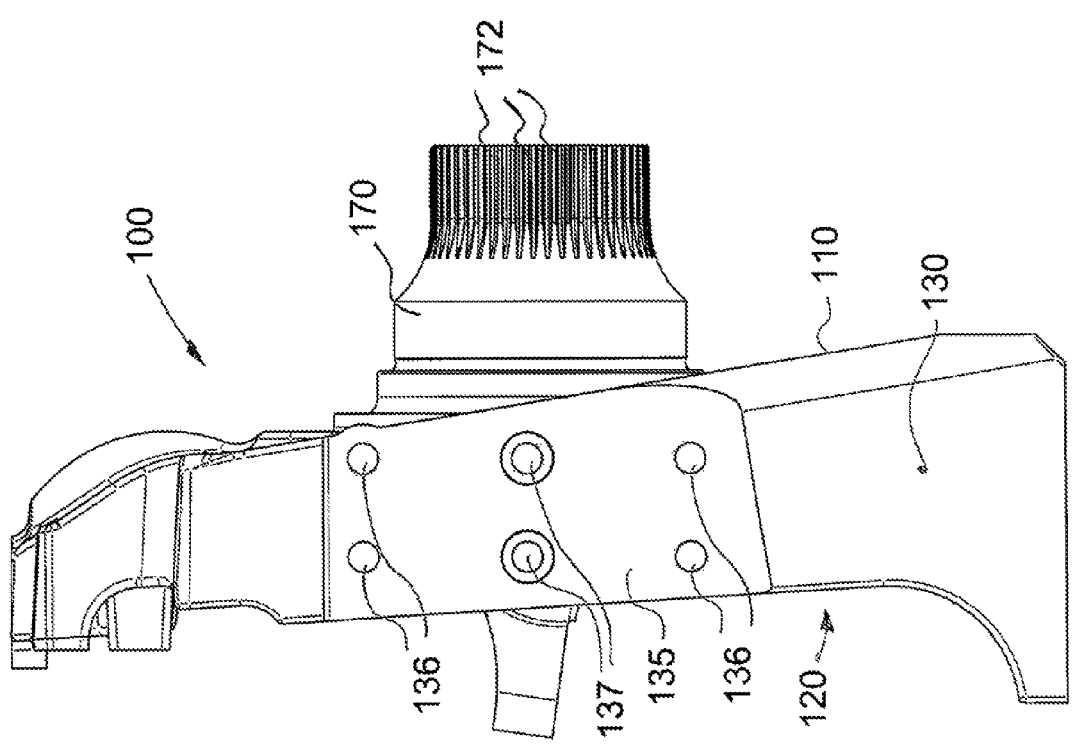
FIG. 6 is a front view of the steering knuckle of FIG. 1.
Figure 7:
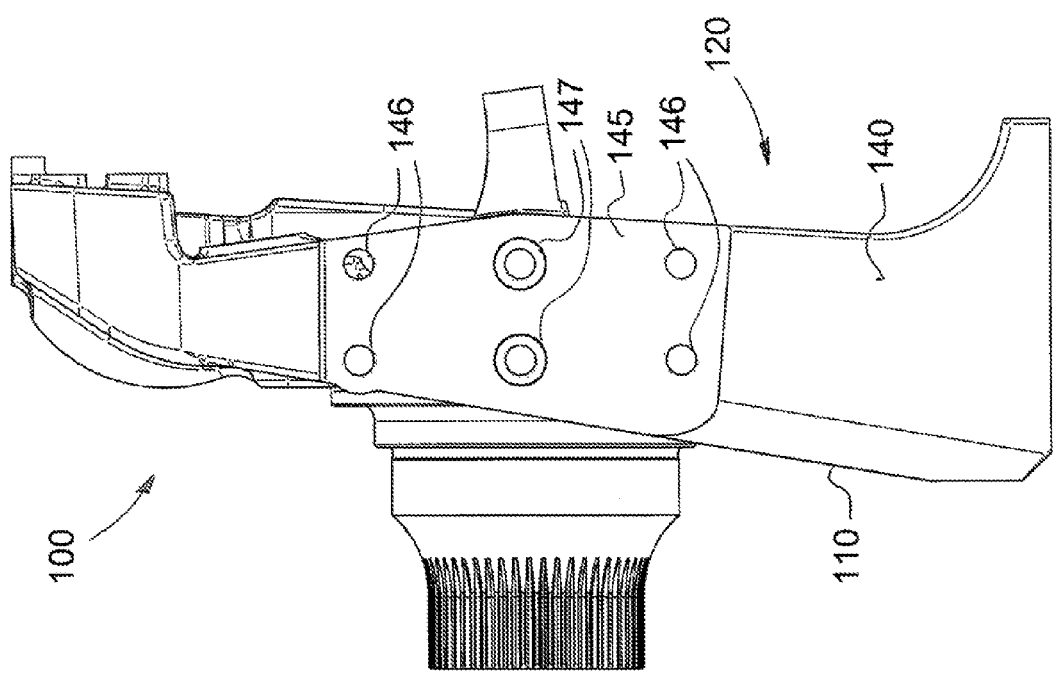
FIG. 7 is a rear view of the steering knuckle of FIG. 1.
Figure 8:
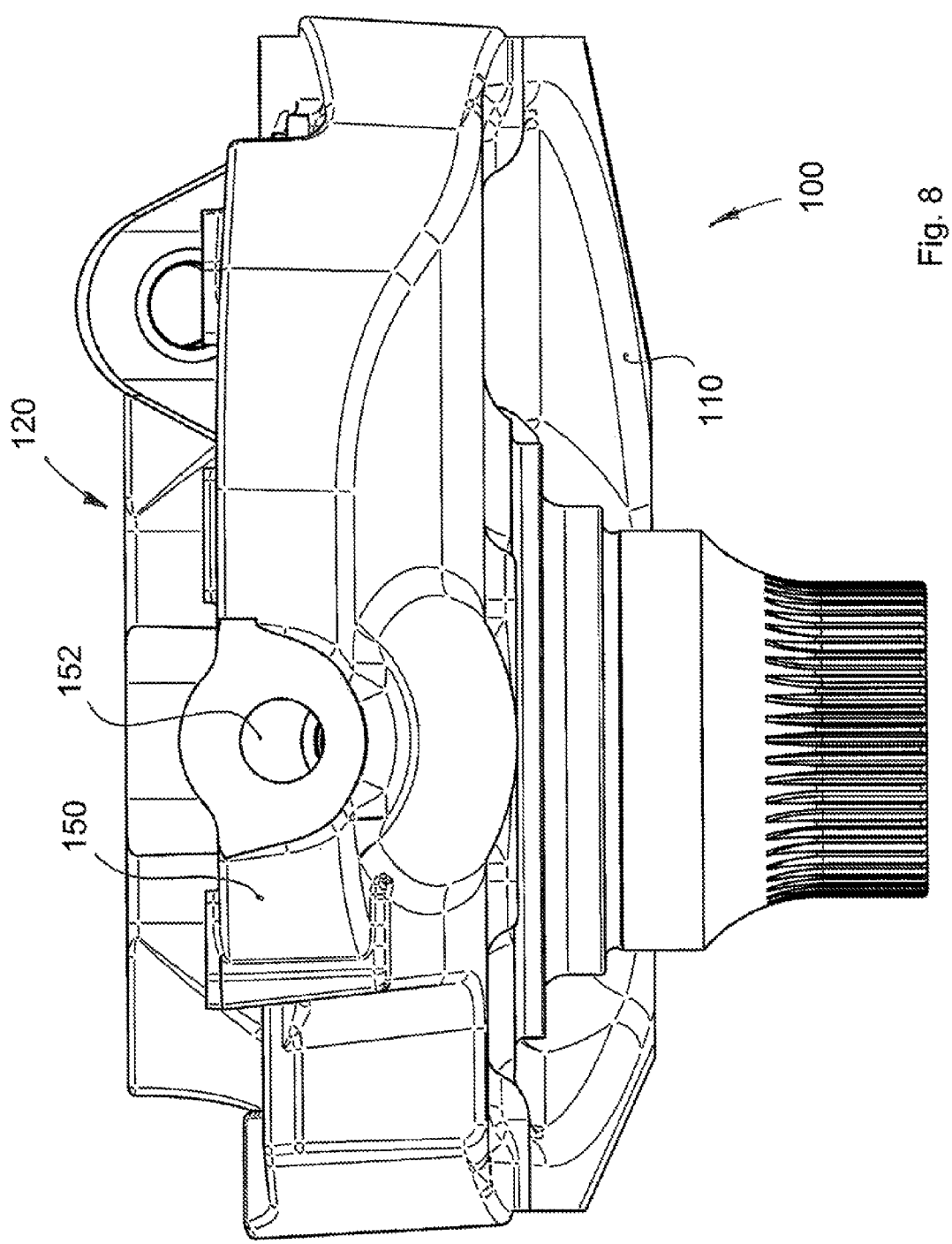
FIG. 8 is a top view of the steering knuckle of FIG. 1.
Figure 9:
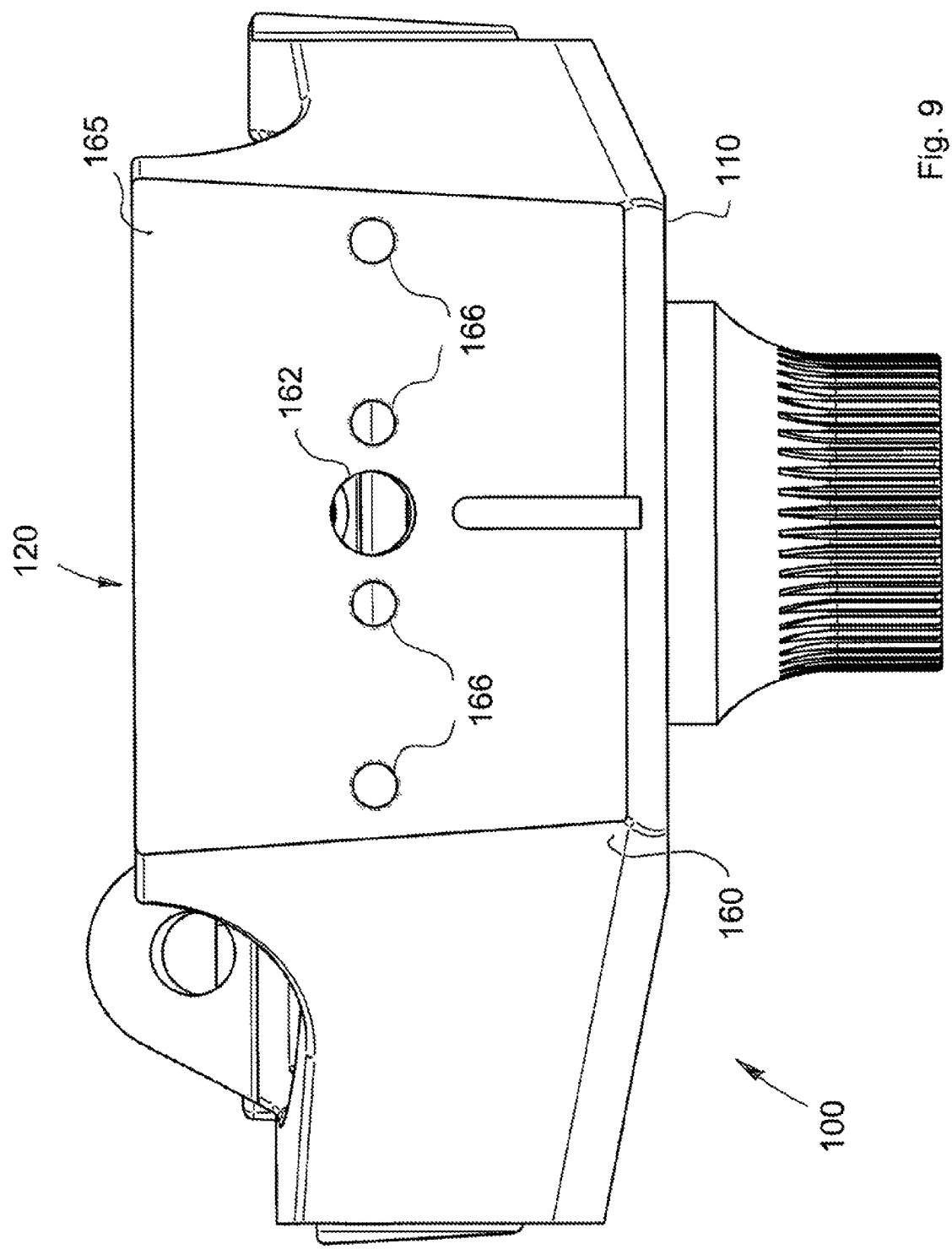
FIG. 9 is a bottom view of the steering knuckle of FIG. 1.

As can be seen in FIGS. 4 and 6, the steering knuckle 100 also comprises a stub 170 outwardly extending from the outer side 110. The stub 170 is configured to support the planetary gear assembly which drives the wheel hub 14 best shown in FIG. 1. To provide proper support between the planetary gear assembly and the stub 170, the circumference of the stub 170 is provided with axially extending splines 172. As best shown in FIG. 4 (and also in FIG. 5), the stub 170 defines an opening 174 through which can extend the drive shaft (not shown) of the vehicle 10. Understandably, the configuration of the stub 170 must match the configuration of the stub on the original knuckle replaced by the knuckle 100. In that sense, other embodiments of steering knuckles in accordance with the principles of the present invention could be provided without stub 170 if the original knuckle does not have a stub or if the driving system of the vehicle 10 does not require a stub.

Referring to FIG. 5, the inner side 120 of the steering knuckle is configured to accommodate the ball joints of the suspension and steering assembly 12 of the vehicle 10. In that sense, the inner side 120 comprises upper recess 122 and lower recess 124. Upper recess 122 is configured for accommodating the ball joint (not shown) located at the end of the upper control arm 16 of the suspension and steering assembly 12. Upper recess 122 also comprises an opening 152 extending to the upper region 150 (see also FIG. 8). Opening 152 is configured to receive the rod (not shown) supporting the upper ball joint (not shown). Similarly, lower recess 124 is configured for accommodating the ball joint (not shown) located at the end of the lower control arm 18 of the suspension and steering assembly 12. Lower recess 124 also comprises an opening 162 extending to the lower region 160 (see also FIG. 9). Opening 162 is configured to receive the rod (not shown) supporting the lower ball joint (not shown).

The inner side 120 also comprises an outwardly extending lug 126, having an opening 127 therethrough, for receiving the end of the steering arm 20 of the suspension and steering assembly 12.

Understandably, as the configuration of the suspension and steering assembly 12 differs on different vehicles, the inner side 120 is typically designed or customized to fit one or more specific vehicles (or vehicle configurations). Other embodiments of steering knuckles in accordance with the principles of the present invention could therefore have different inner side configurations to fit different configurations of suspension and steering assemblies. Hence, when the steering knuckle is used as a replacement, the inner side of the steering knuckle will typically substantially replicate the inner side of the steering knuckle it is configured to replace.

Referring now more particularly to FIGS. 2, 6, 7 and 9, in the first embodiment, the knuckle 100 comprises three attachment areas 135, 145 and 165. In the present embodiment, the attachment areas 135, 145 and 165 are respectively located on the front region 130, the rear region 140, and the bottom region 160.

Understandably, in other embodiments, there could be more, or less, attachment areas, and the attachment areas could be located elsewhere on the steering knuckle. For instance, in some embodiments, there could be an attachment area on the top region 150. Also, in some embodiments, an attachment area could extend over more than one regions (e.g. over the front and bottom regions, over the rear and bottom regions, etc.). In addition, in some embodiments, an attachment area could be located at the junction of two regions. Further still, in some embodiments, most, if not all, the peripheral surface could comprise attachment areas such as to allow the attachment elements to fully circumscribe the knuckle.

As can be seen from the figures, in the first embodiment, the attachment areas 135, 145 and 165 are generally flat such as to easily accommodate attachment elements or brackets 330, 340 and 360 (see FIGS. 2 and 3) having flat mating surfaces 332, 342 and 362 respectively. Still, in other embodiments, the attachment areas could be other than flat. For instance, the attachment areas 135, 145 and 165 and the mating surfaces 332, 342 and 362 of the attachment elements 330, 340 and 360 could have complementary configurations (e.g. male/female configurations, complementary toothed configurations, mortise and tenon configurations, etc.). Also, in the first embodiment, the attachment areas 135, 145 and 165 are respectively provided with fastener-receiving openings or bores 136/137, 146/147 and 166. In the first embodiment, these bores are threaded bolt-receiving bores. Understandably, in other embodiments, other fasteners or attachment mechanisms could be used to secure the attachment elements to the attachment areas (e.g. dowels, pins, keys, clamps, etc.).

As best shown in FIG. 2, by having these predetermined attachment areas 135, 145 and 165, the front region 130, the rear region 140 and the bottom region 160 provide predetermined locations on the steering knuckle 100 where a track system 300 (shown exploded in FIG. 2) can easily yet rigidly be secured.

In that sense, in the first embodiment, to mount the track system 300 to the steering knuckle 100, the track system 300 only needs attachment elements 330, 340 and 360. These attachment elements 330, 340 and 360 have bolt holes patterns which respectively match the bore patterns of the attachments areas 135, 145 and 165 such that they can easily be secured to the attachment areas 135, 145 and 165 of the steering knuckle 100 using bolts (see FIG. 2).

Figure 3:
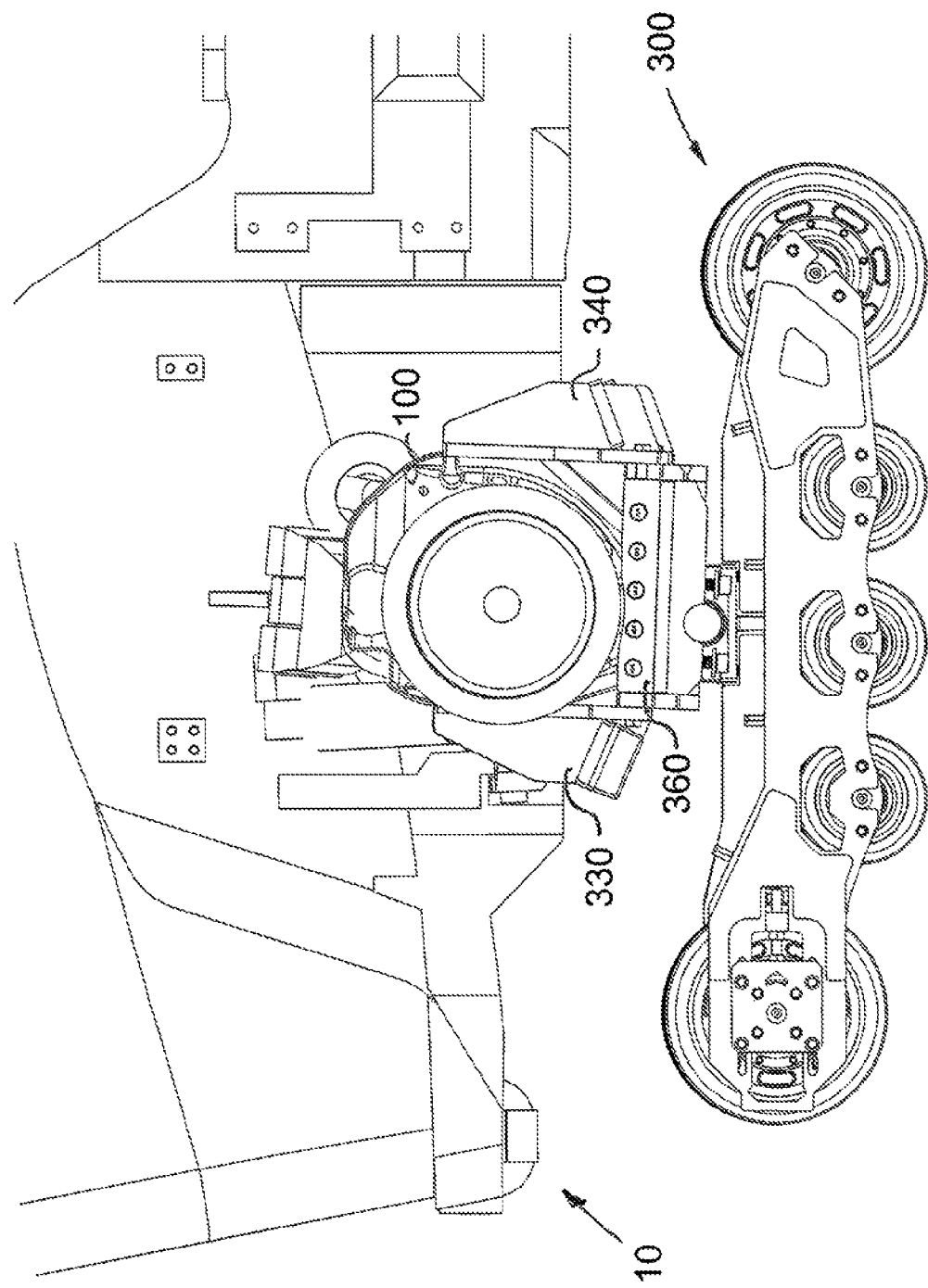
FIG. 3 is a fragmentary left side view of the farming traction of FIG. 1, further comprising a track system, without the endless traction band, attached to the knuckle.

To provide additional rigidity, the attachment elements 330, 340, 360 may further be configured to be fastened together as shown in FIGS. 2 and 3. Still, in other embodiments, the attachment elements 330, 340, 360 could be unitary and form a single attachment element.

Understandably, by having these predetermined attachment areas 135, 145 and 165, the steering knuckle 100 allows the installation of a wheel-replacing track system 300 more easily and more solidly. Indeed, the predetermined attachment areas 135, 145 and 165 provide predetermined locations on the steering knuckle 100 to secure the attachment elements 330, 340 and 360 needed to secure the track system 300 to the vehicle 10. By providing these predetermined locations, the present steering knuckle 100 avoids the need to secure the track system 300 at inconvenient or weak locations on the vehicle 10.

As an additional benefit, the predetermined attachment areas 135, 145 and 165 on the steering knuckle 100 allows the wheel-replacing track system 300 to be more properly aligned with respect to the vehicle 10.

In addition, since the steering knuckle 100 is configured to support the track system 300, the steering knuckle 100 is typically reinforced (e.g. made bigger and/or thicker), more particularly near or around the regions where the attachment areas 135, 145 and 165 are located. Other regions of the steering knuckle 100 could also be reinforced if necessary. The additional material allows the steering knuckle 100 to support and sustain the additional load transmitted to the steering knuckle 100 by the track system 300. Also, in some embodiments, the additional material allows the standardization of the locations of the attachment areas.

Still, the steering knuckle 100 is preferably configured to remain on the vehicle 10 as a regular knuckle when the track system 300 is removed and replaced by a regular wheel. In that sense, the steering knuckle 100 is preferably configured not to interfere with the proper functioning and steering of the wheel of the vehicle 10 when wheels are used.

Referring now to FIGS. 10 to 16, a second embodiment of a steering knuckle 600 in accordance with the principles of the present invention is illustrated.

Figure 10:
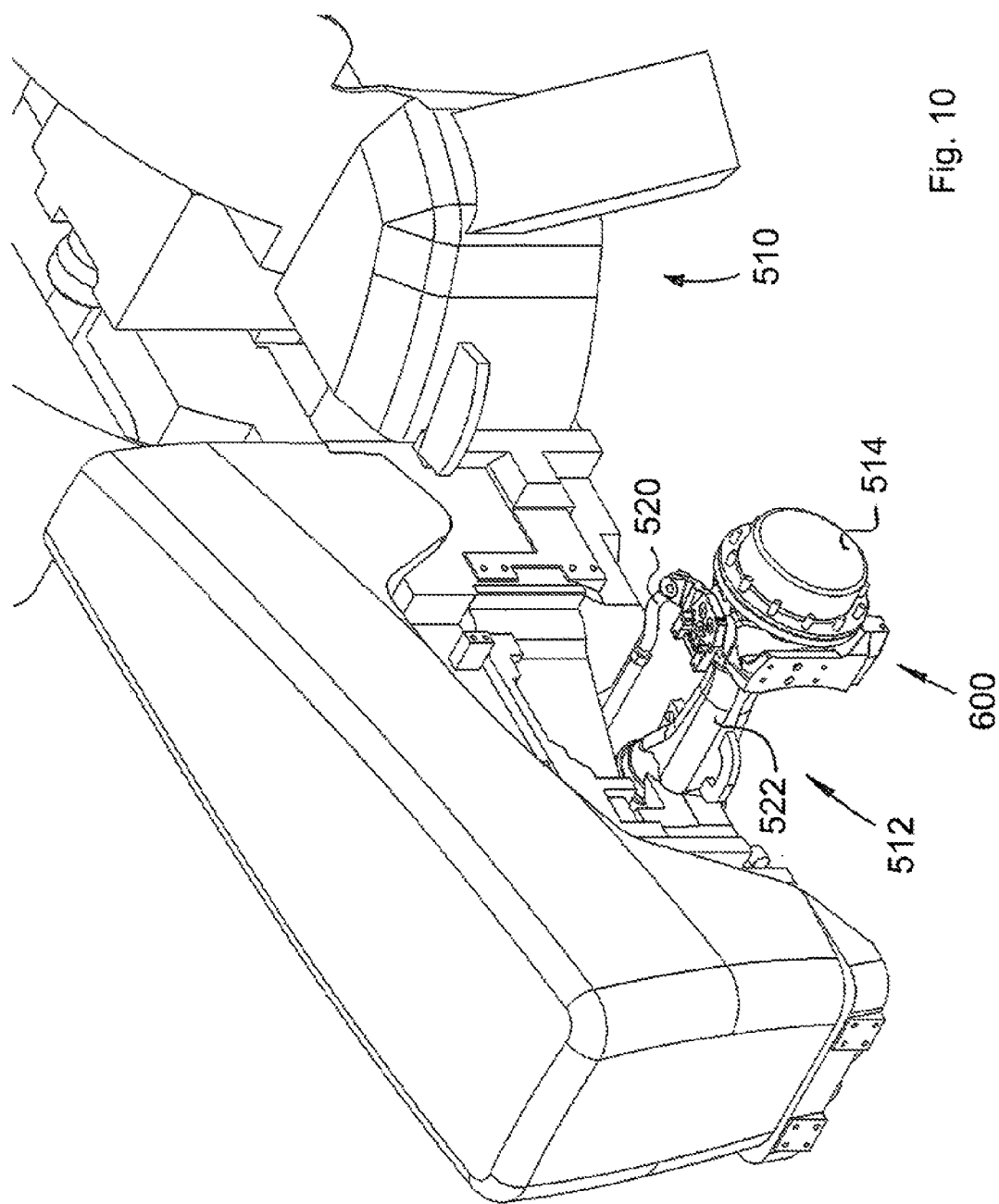
FIG. 10 is a fragmentary left side perspective view of a farming tractor equipped with another embodiment of a steering knuckle in accordance with the principles of the present invention.

Referring first to FIG. 10, the steering knuckle 600 is illustrated as normally installed to the front left steering assembly 512 of a vehicle 510. Notably, while in FIG. 1, the steering knuckle 100 was mounted to steering and suspension assembly 12, in FIG. 10, the vehicle 510 has a rigid axle 522 without suspension assembly and thus, the steering knuckle 600 is only mounted to the rigid axle 522 and the steering assembly 512.

As in FIG. 1, in FIG. 10, the vehicle 510 is a common farming tractor. Still, the steering knuckle 600 could be used on other vehicles having a similar steering configuration.

In the second embodiment, the steering knuckle 600 is typically coupled to the rigid axle 522 via a kingpin arrangement. It remains that the steering knuckle 600 is also configured to receive the drive shaft (not shown) of the vehicle 510 and to support the planetary gear assembly which drives the wheel hub 514 to which the wheel (not shown) of the vehicle 510 is normally mounted.

Though not shown, a right steering knuckle 600, which is substantially a mirror image of the left steering knuckle 600 shown in FIG. 10, is also installed on the right side of the vehicle 510. Since both the left side and the right side knuckles 600 are substantially identical, aside from being mirror images of each other, only the left side knuckle 600 will be described below.

Referring now to FIGS. 11 to 16, the steering knuckle 600 generally comprises an outer side 610, an inner side 620, and an overall periphery or peripheral surface 605. The peripheral surface 605 broadly comprises a front region 630, a rear region 640, a top region 650 and a bottom region 660.

Figure 11:
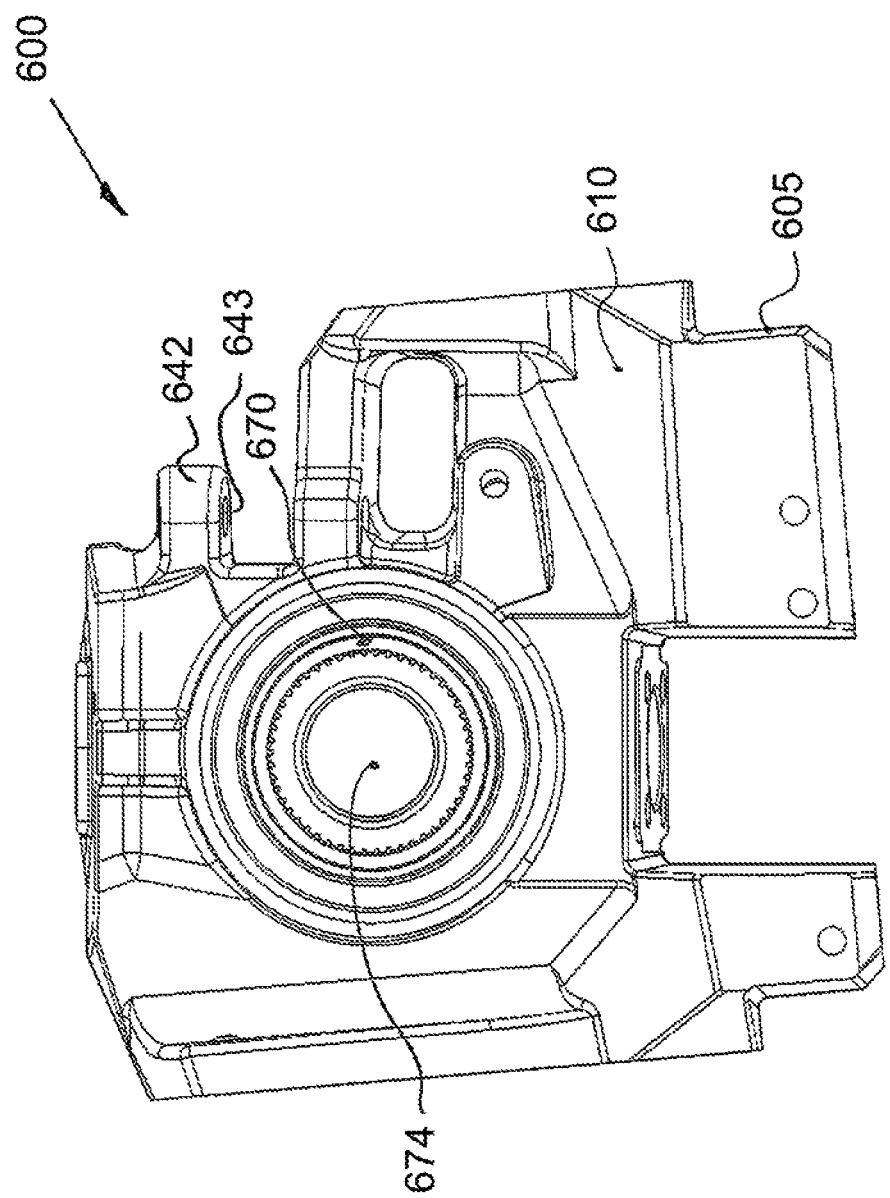
FIG. 11 is an exterior view of the steering knuckle of FIG. 10.
Figure 12:
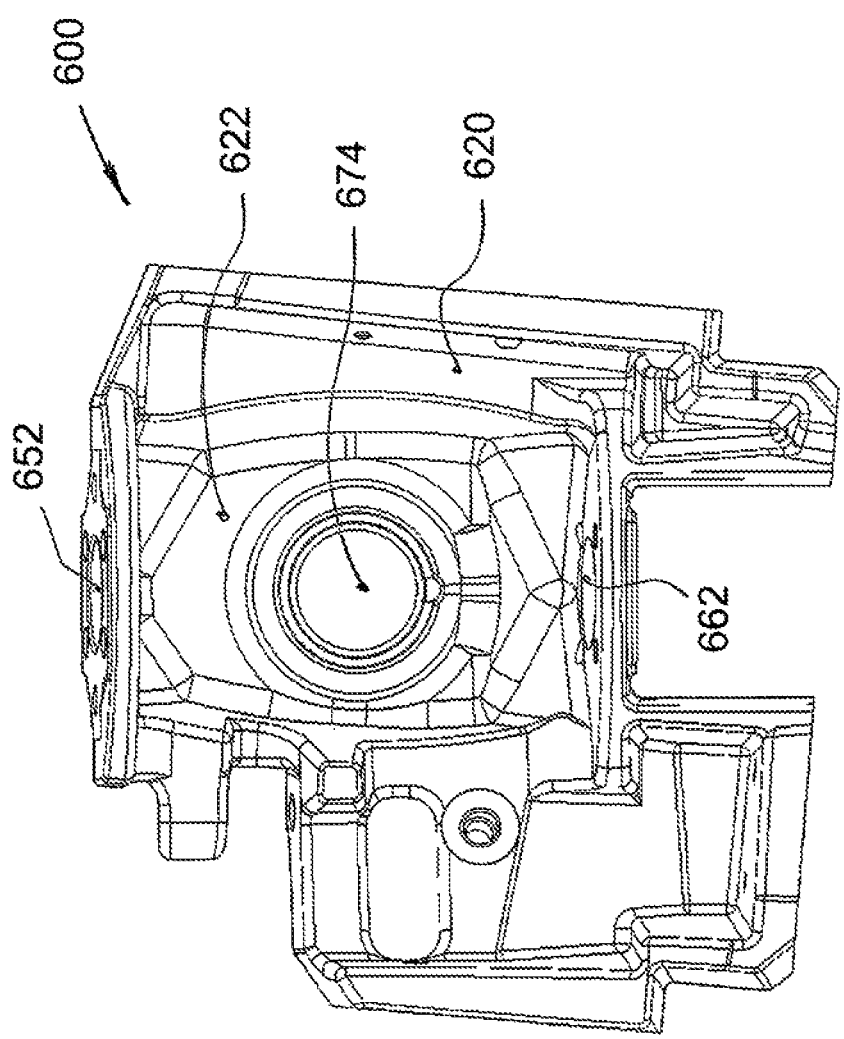
FIG. 12 is an interior view of the steering knuckle of FIG. 10.

Notably, as can be seen in FIGS. 11 and 12, the peripheral surface 605 of the steering knuckle 600 is clearly not regular and its exact shape can vary widely according to the vehicle or vehicles for which the steering knuckle 600 is designed for. Hence, the term front, top, rear and bottom used with respect to the regions of the peripheral surface 605 of the steering knuckle 600 must not be construed with geometric exactness.

Figure 13:
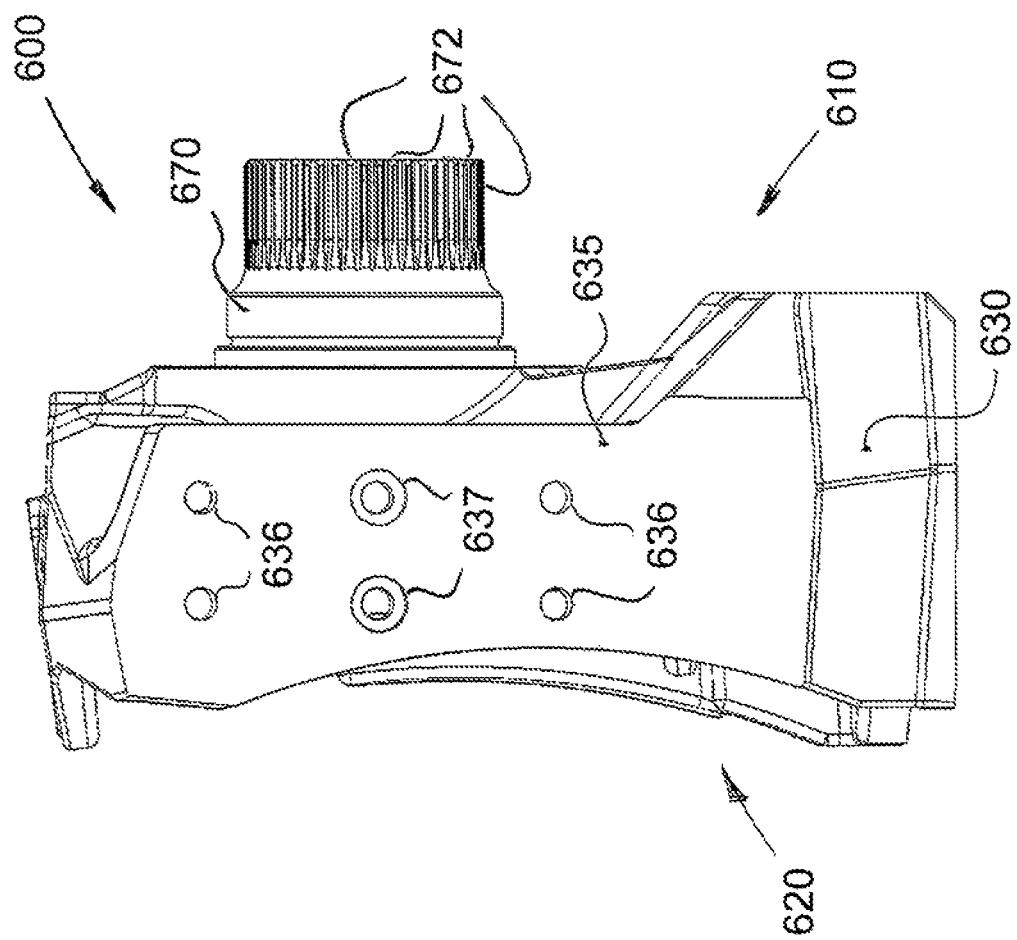
FIG. 13 is a front view of the steering knuckle of FIG. 10.

As can be seen in FIGS. 11 and 13, the steering knuckle 600 also comprises a stub 670 outwardly extending from the outer side 610. The stub 670 is configured to support the planetary gear assembly which drives the wheel hub 514 best shown in FIG. 10. To provide proper support between the planetary gear assembly and the stub 670, the circumference of the stub 670 is provided with axially extending splines 672. As best shown in FIG. 11 (and also in FIG. 12), the stub 670 defines an opening 674 through which can extend the drive shaft (not shown) of the vehicle 510. Understandably, the configuration of the stub 670 must match the configuration of the stub on the original knuckle replaced by the knuckle 600. In that sense, other embodiments of steering knuckles in accordance with the principles of the present invention could be provided without stub 670 if the original knuckle does not have a stub or if the driving system of the vehicle 510 does not require a stub.

Referring to FIG. 12, the inner side 620 of the steering knuckle is configured to accommodate the kingpin (also referred to as "pivot axle") assembly of the rigid axle 522 of the vehicle 510. In that sense, the inner side 620 comprises main recess 622. Main recess 622 is configured for accommodating the extremity of the axle 522 and the kingpin assembly. Main recess 622 also comprises an upper opening 652 extending to the upper region 650 (see also FIG. 15) and a lower opening 662 extending to the lower region 660 (see also FIG. 16). Upper opening 652 is configured to receive the upper kingpin member (not shown) while the lower opening 662 is configured to receive the lower kingpin member (not shown).

Understandably, as the configuration of the steering assembly 512 differs on different vehicles, the inner side 620 is typically designed or customized to fit on one or more specific vehicles (or vehicle configurations). Other embodiments of steering knuckles in accordance with the principles of the present invention could therefore have different inner side configurations to fit different configurations of axle and steering assemblies. Hence, when the steering knuckle is used as a replacement, the inner side of the steering knuckle will typically substantially replicate the inner side of the steering knuckle it is configured to replace.

Figure 14:
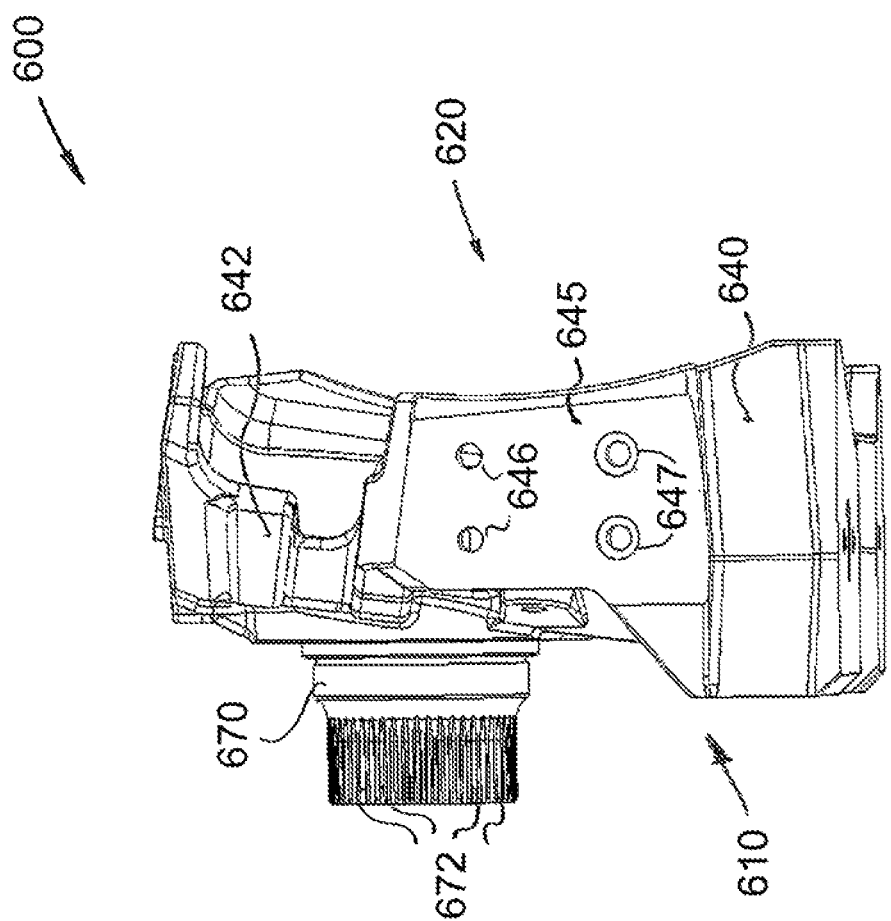
FIG. 14 is a rear view of the steering knuckle of FIG. 10.
Figure 15:
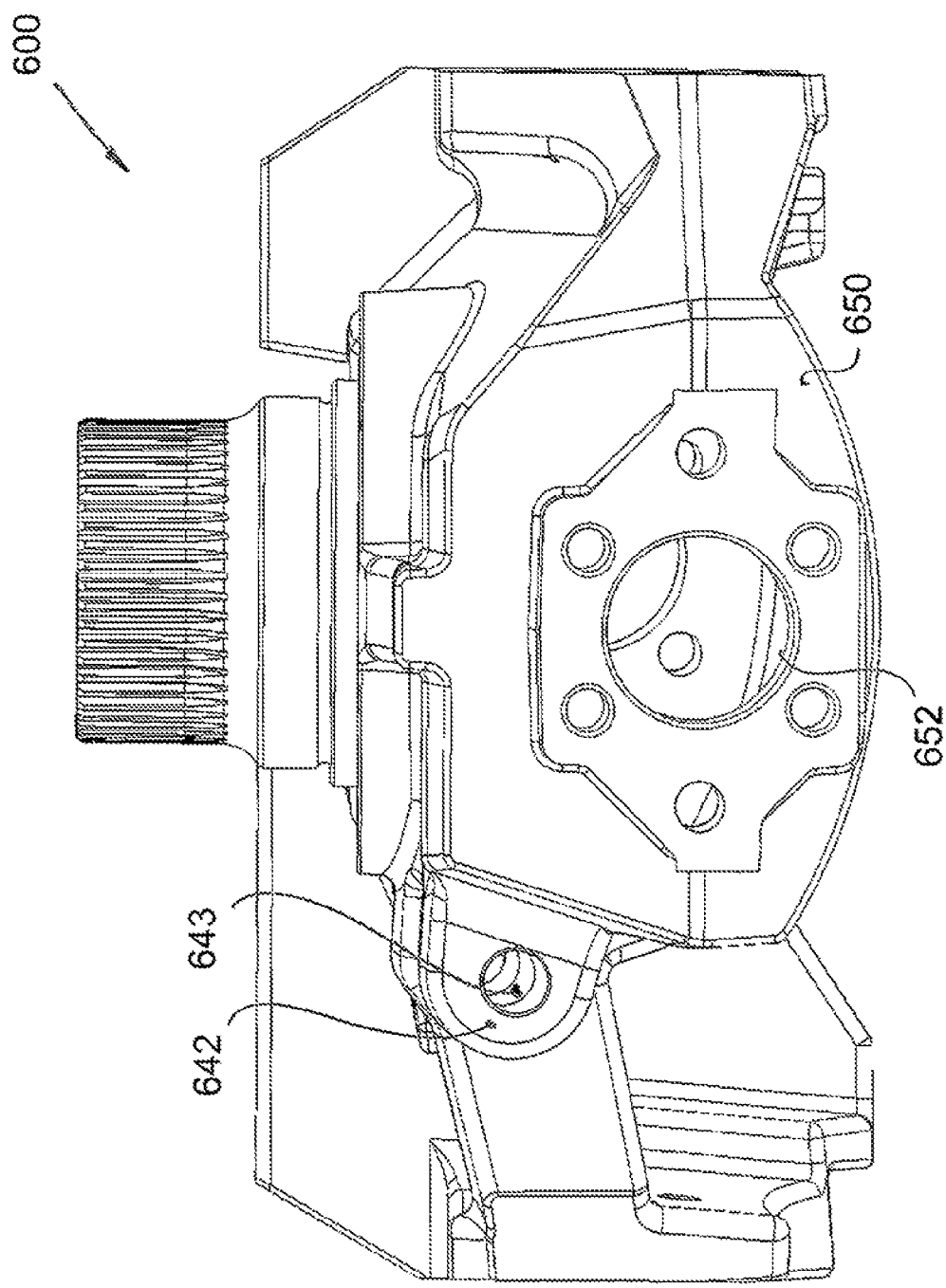
FIG. 15 is a top view of the steering knuckle of FIG. 10.
Figure 17A:
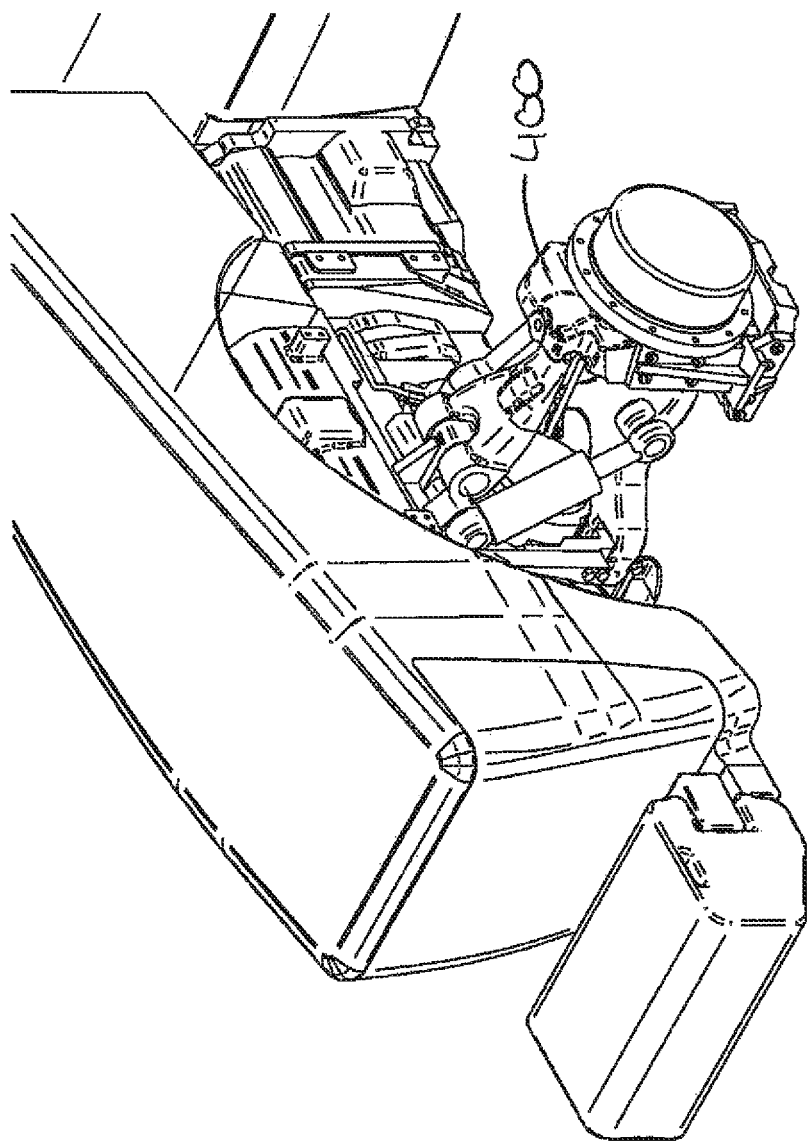
FIG. 17A is a fragmentary left side perspective view of a farming tractor equipped with an embodiment of a steering knuckle having angled attachment area in accordance with the principles of the present invention.
Figure 17B:
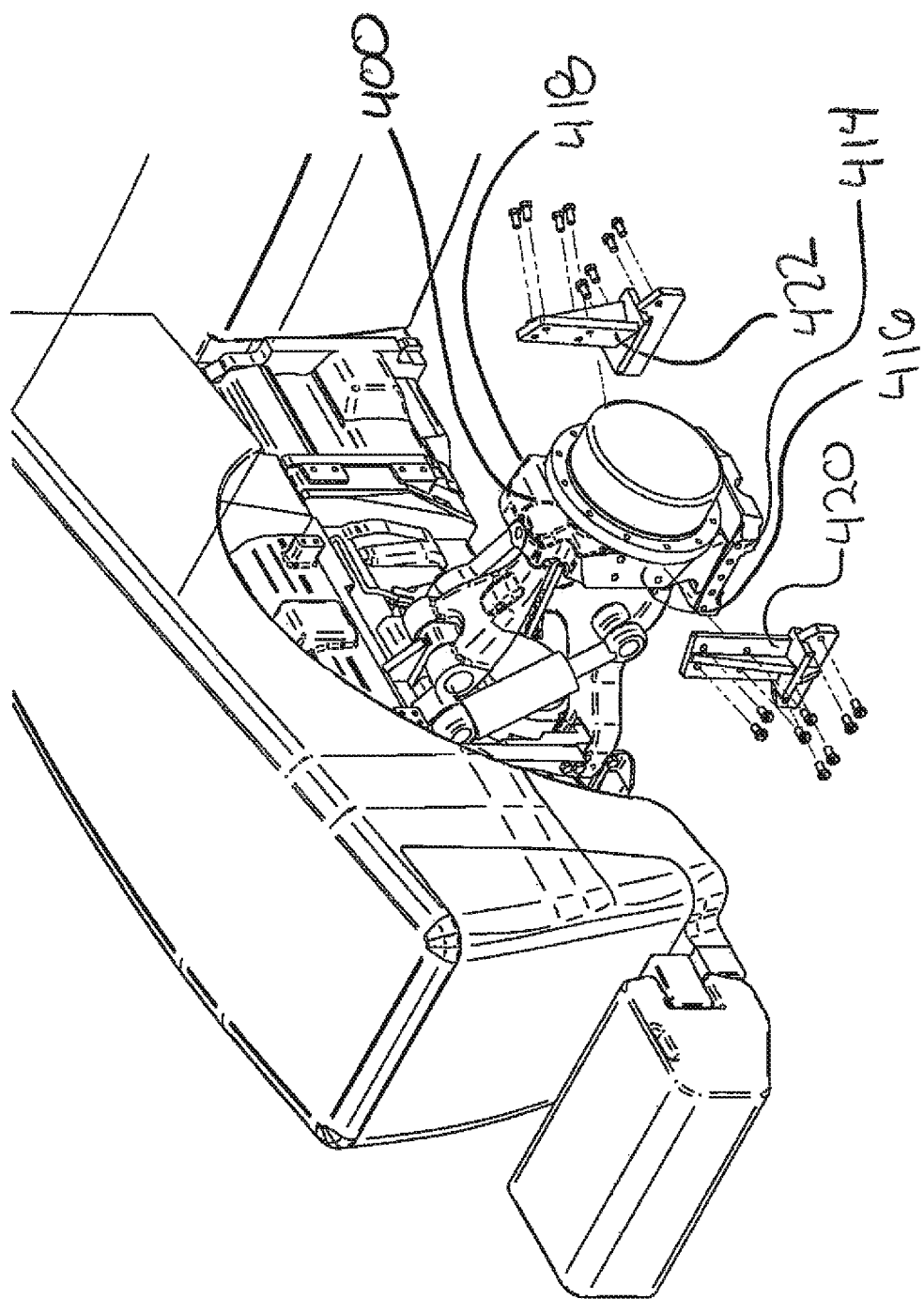
FIG. 17B is an exploded view of the farming tractor equipped with an embodiment of a steering knuckle of FIG. 17A.
Figure 17C:
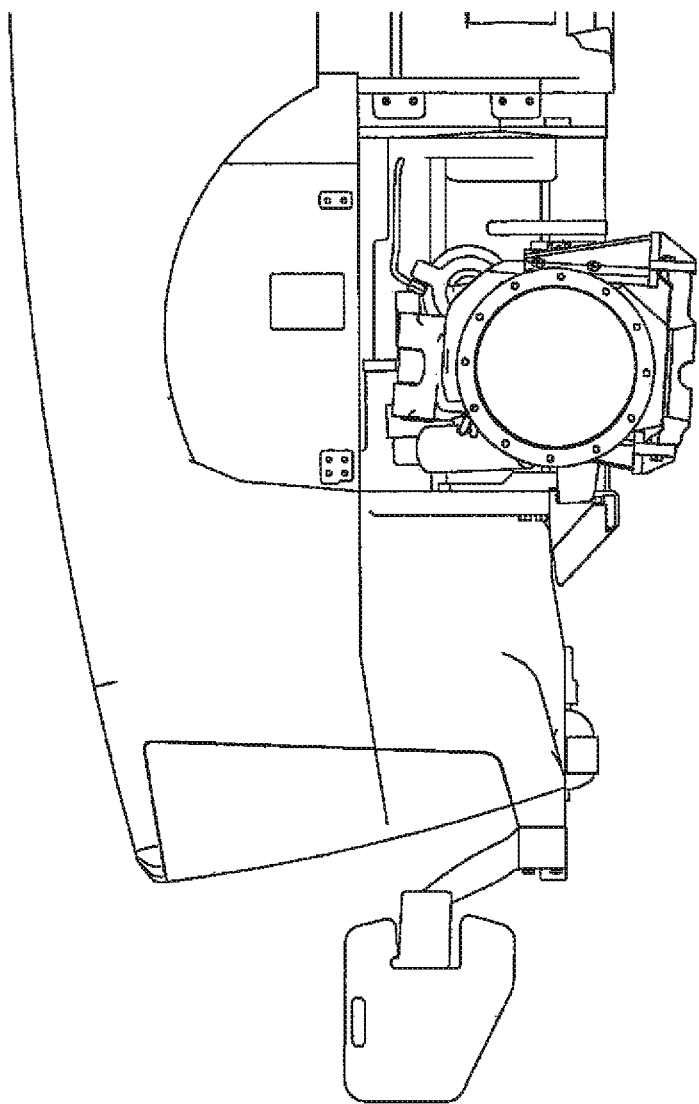
FIG. 17C is an exterior view of the farming tractor equipped with an embodiment of a steering knuckle of FIG. 17A.
Figure 17D:
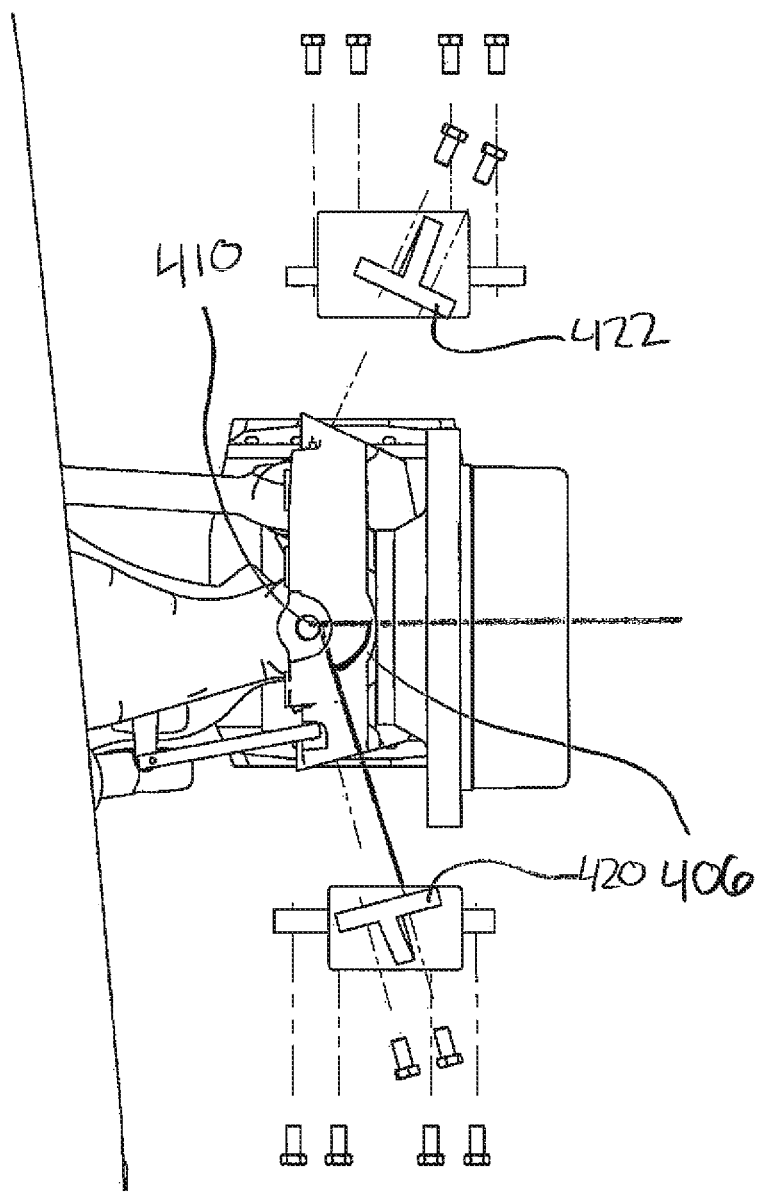
FIG. 17D is a top exploded view of the farming tractor equipped with an embodiment of a steering knuckle of FIG. 17A.
Figure 18D:
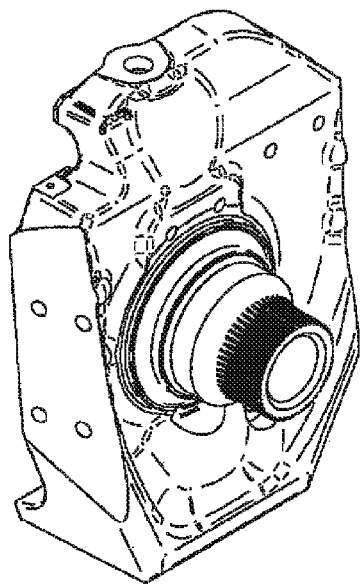
FIG. 18D is a perspective view of the steering knuckle of FIG. 18A.
Figure 18E:
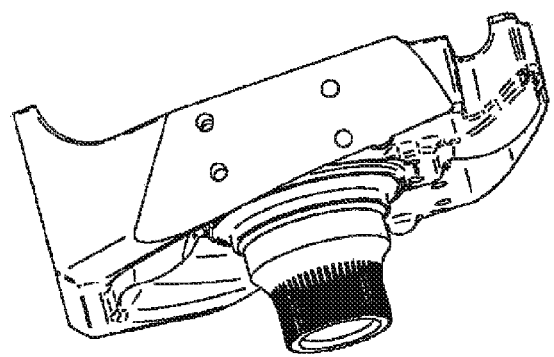
FIG. 18E is a perspective view along the B-B axis of the steering knuckle of FIG. 18A.
Figure 18F:
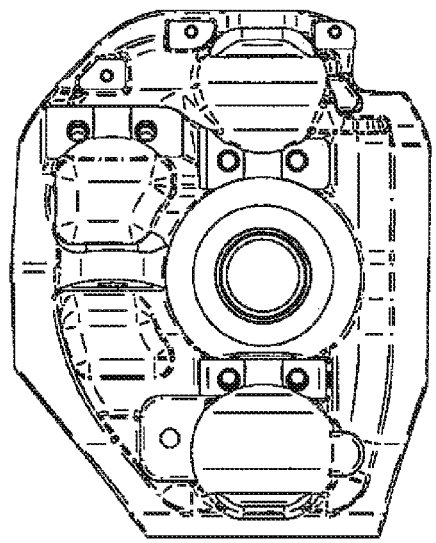
FIG. 18F is an interior view of the steering knuckle of FIG. 18A.
Figure 18G:
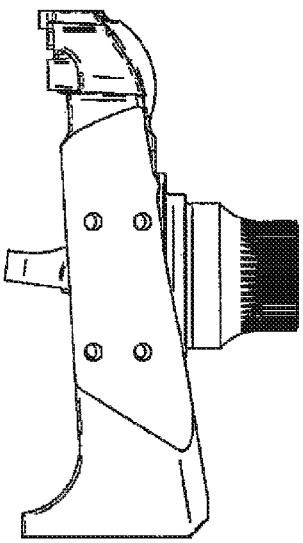
FIG. 18G is a front view of the steering knuckle of FIG. 18A.
Figure 18I:
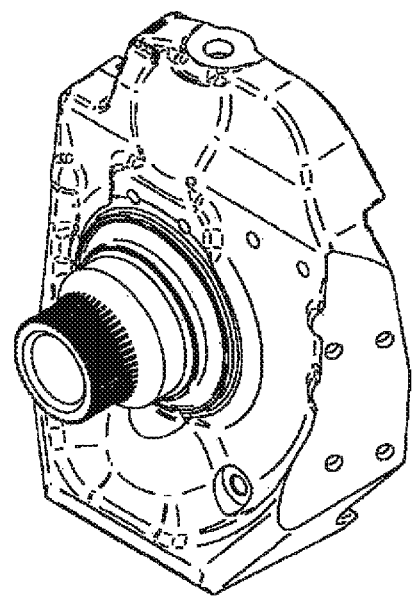
FIG. 18I is a perspective view of the steering knuckle of FIG. 18A.
Figure 18H:
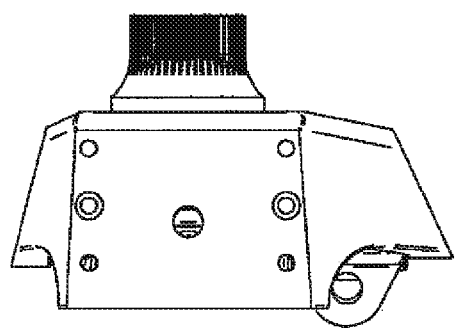
FIG. 18H is a bottom view of the steering knuckle of FIG. 18A.
Figure 18J:
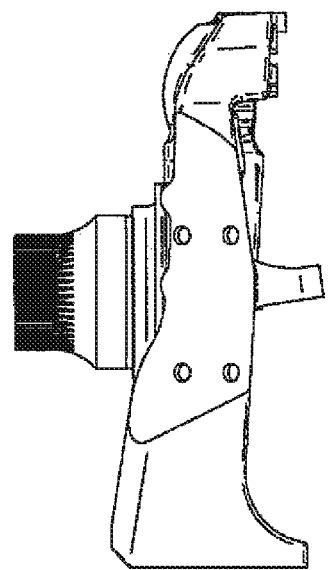
FIG. 18J is a rear view of the steering knuckle of FIG. 18A.

Referring now to FIGS. 11, 14 and 15, the rear region 640 of the steering knuckle 600 comprises an outwardly extending lug 642, having an opening 643 therethrough, for receiving the end of the steering arm 520 of the steering assembly 512 (see also FIG. 10).

Referring now more particularly to FIGS. 13, 14 and 16, in the second embodiment, the knuckle 600 also comprises three attachment areas 635, 645 and 665. The attachment areas 635, 645 and 665 are respectively located at the front region 630, the rear region 640, and the bottom region 660.

In the second embodiment, the attachment areas 635, 645 and 665 are generally flat such as to easily accommodate the flat mating areas of the attachment elements or brackets used to mounted the track system 300 to the vehicle 510. Understandably, as already mentioned, in other embodiments, the attachment areas and the mating areas of the attachment elements could be other than flat and have substantially complementary configurations. Notably, though attachment areas 635 and 645 are unitary, i.e. a single attachment area, attachment area 665 comprises two distinct areas 665A and 665B in order to provide space for the lower kingpin member.

Attachment areas 635, 645 and 665 are respectively provided with fastener-receiving bores 636/637, 646/647 and 666. In the second embodiment, these bores are threaded bolt-receiving bores. Understandably, as already mentioned, in other embodiments, other fasteners or attachment mechanisms could be used to secure the attachment elements to the attachment areas (e.g. dowels, pins, keys, clamps, etc.).

Understandably, as already mentioned above, in other embodiments, there could be more, or less, attachment areas, and the attachment areas could be located elsewhere on the steering knuckle.

As in the first embodiment, by having these predetermined attachment areas 635, 645 and 665, the second embodiment of steering knuckle 600 allows the installation of a wheel-replacing track system 300 more easily and more solidly as the attachment areas 635, 645 and 665 provide predetermined locations on the steering knuckle 600 to secure the attachment elements needed to secure the track system 300 to the vehicle 510. By providing these predetermined locations, the steering knuckle 600 avoids the need to secure the track system 300 at inconvenient or weak locations on the vehicle 510.

Also, since the steering knuckle 600 is configured to support the track system 300, it is typically reinforced (e.g. made bigger and/or thicker), more particularly near or around the regions where the attachment areas 635, 645 and 665 are located. Other regions could also be reinforced if necessary. The additional material allows the steering knuckle 600 to support and sustain the additional load transmitted thereto by the track system 300. Also, in some embodiments, the additional material allows the standardization of the locations of the attachment areas.

As can be seen from the foregoing description, different configurations of vehicle or vehicles might need different configurations of steering knuckles. Still, a steering knuckle in accordance with the principles of the present invention comprises one or more preconfigured attachment areas, which can be reinforced with additional knuckle material, where attachment element(s) used to secure a track system to a vehicle can be properly secured. As steering knuckles come in a wide variety of shapes, the number, position and configuration of the one or more preconfigured attachment areas on the steering knuckle, or on the periphery thereof, are consequently likely to vary.

According to another embodiment, now referring to FIGS. 17-18, by having predetermined attachment areas 414, 416, 418 the steering knuckle 400 allows the installation of a wheel-replacing track system 300 more easily and more solidly as the attachment areas 414, 416, 418 provide predetermined locations on the steering knuckle 400 to secure the attachment elements 420, 422 needed to secure the track system 300 to the vehicle 510. By providing these predetermined locations, the steering knuckle 400 avoids the need to secure the track system 300 at inconvenient or weak locations on the vehicle 510. According to this embodiment, the angle 460 of the fasteners used for mounting the track system 300 to the knuckle 400 may be any angle (from about 0 to about 360) around the vertical axis of the kingpin 410 (see FIG. 17D) as long as the fastener trajectory is unobstructed by an element of the vehicle, such as the driving shaft. As such, embodiments of the knuckle 400 may be configured with attachment areas 416, 418 having various, preferably at an angle favoring the ease of mounting the track system 300 provided that they have the proper reinforced knuckle 400 structure. An exemplary embodiment of the knuckle 400 is shown in FIG. 17B where the slightly angled front and rear attachment areas 416, 418 allow for an easier installation of the track system 300 to the knuckle 400 Still according to this embodiment, the attachment areas 416 and 418 could be at an angle or not. As such, the steering knuckle 400 configuration will depend on the mating track system 300 attachment elements 420, 422 and the initial size of the vehicle wheel. In this embodiment, the attachment areas 416 and 418 (see FIGS. 18A-C) were at 15 and 25 degree angles about the vehicle axle. According to other embodiments, the attachment areas 416 and 418 may have rounded areas and corresponding complementary mating mounting elements 420, 422 with angled fasteners, such as angled holes or threaded openings for securing the track system. In such other embodiments, the mating attachment elements 420, 422 would preferably have complementary mating configurations (i.e. convex attachment areas with complementary convex mating elements).

Figure 19A:
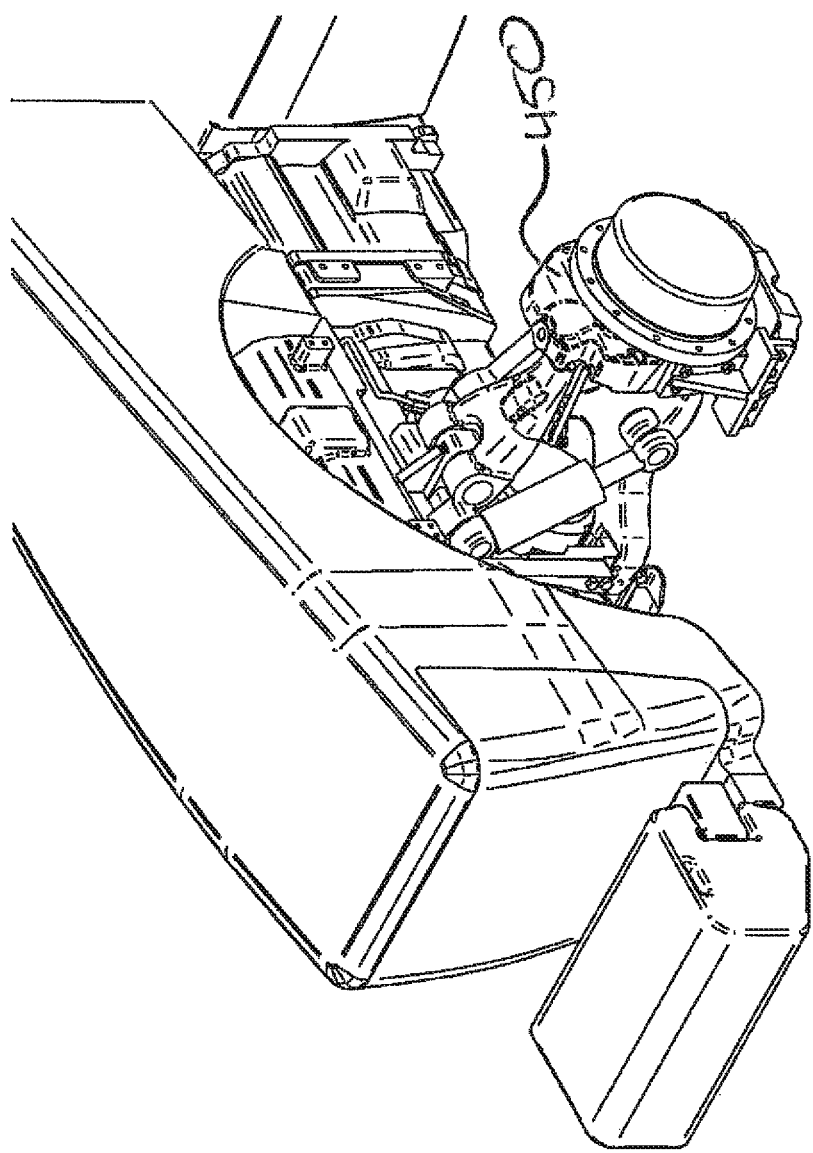
FIG. 19A is a fragmentary left side perspective view of a farming tractor equipped with an embodiment of a steering knuckle having angled attachment area in accordance with the principles of the present invention.
Figure 19B:
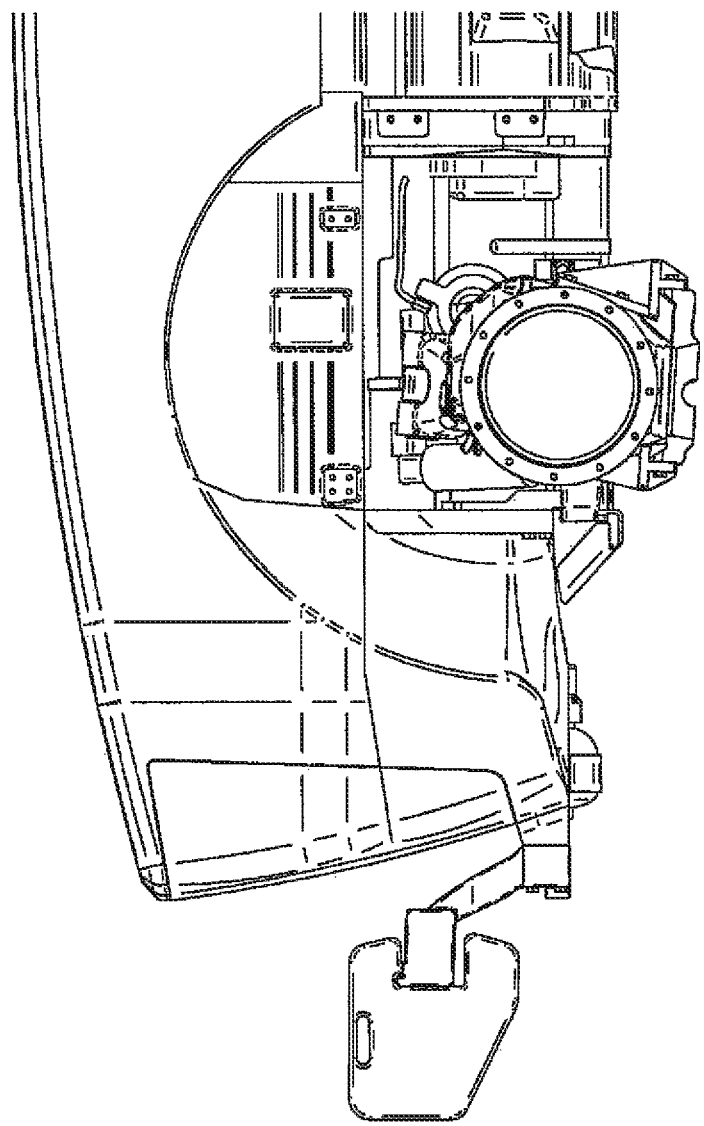
FIG. 19B is an exterior view of the farming tractor equipped with an embodiment of a steering knuckle of FIG. 19A.
Figure 19D:
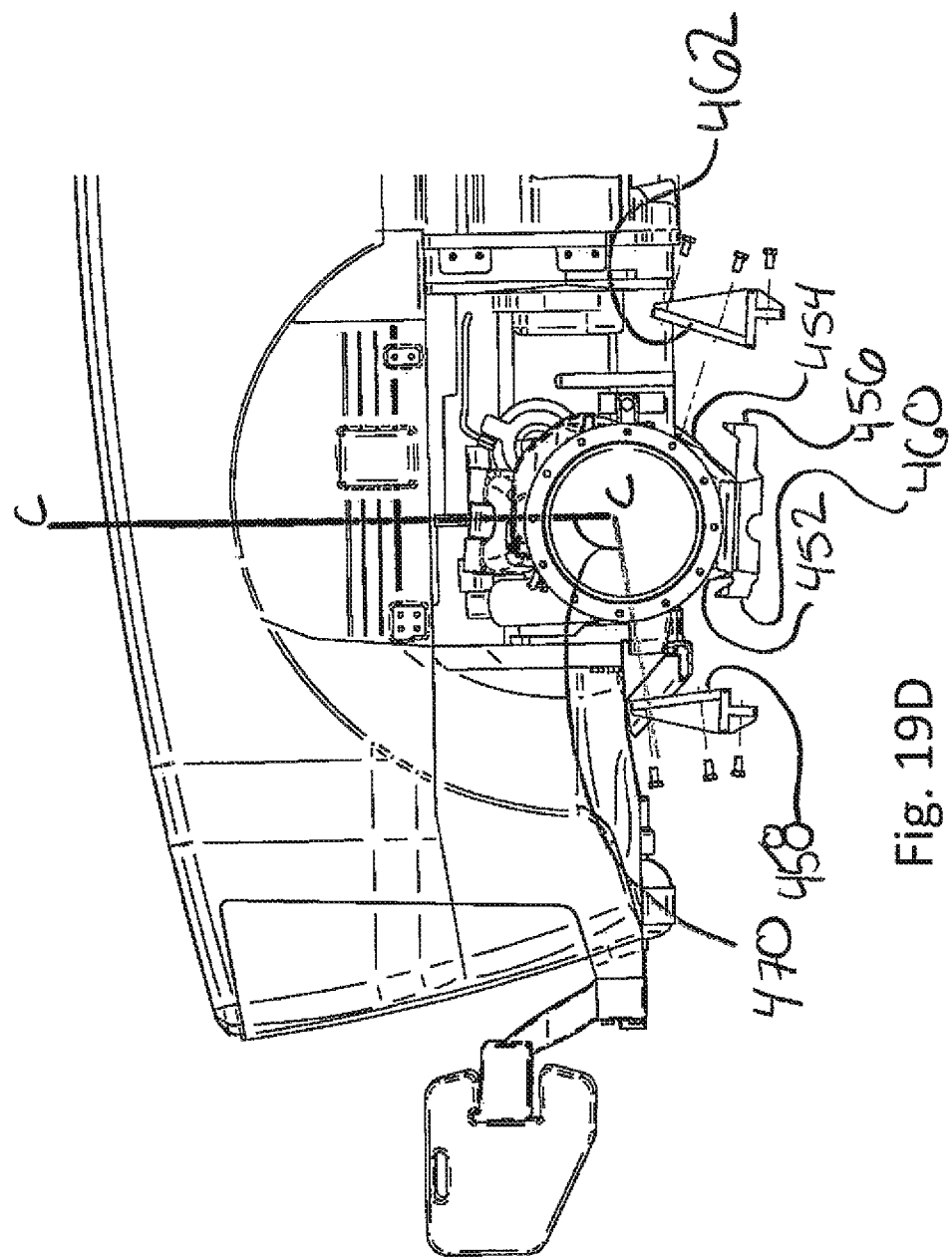
FIG. 19D is an exterior exploded view of the farming tractor equipped with an embodiment of a steering knuckle of FIG. 19A.
Figure 20E:
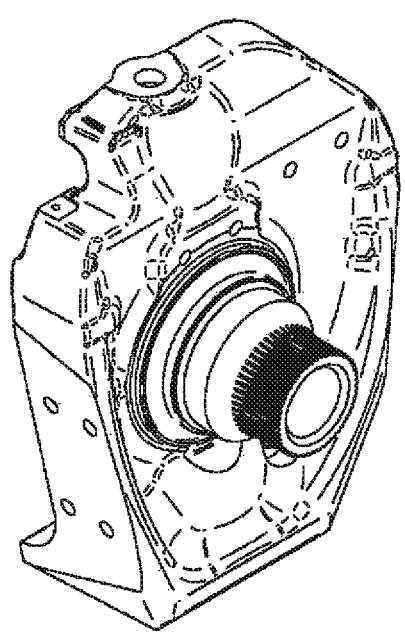
FIG. 20E is a perspective view of the steering knuckle of FIG. 20A.
Figure 20F:
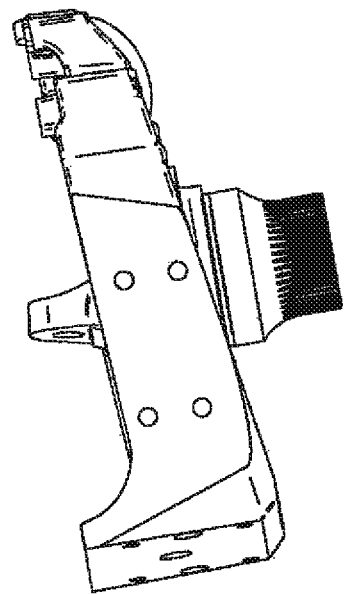
FIG. 20F is a perspective view along the B-B axis of the steering knuckle of FIG. 20A.
Figure 20G:
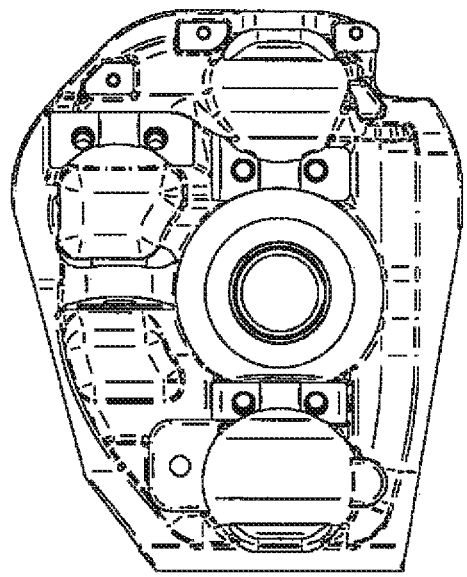
FIG. 20G is an interior view of the steering knuckle of FIG. 20A.
Figure 20H:
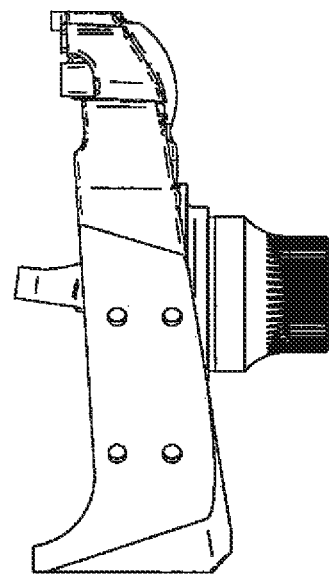
FIG. 20H is a front view of the steering knuckle of FIG. 20A.
Figure 20I:
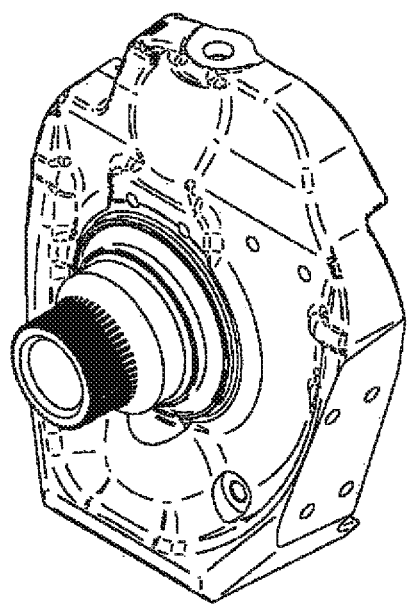
FIG. 20I is a perspective view of the steering knuckle of FIG. 20A.
Figure 20J:
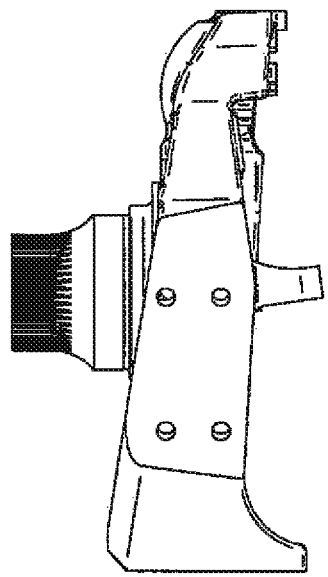
FIG. 20J is a rear view of the steering knuckle of FIG. 20A.
Figure 21A:
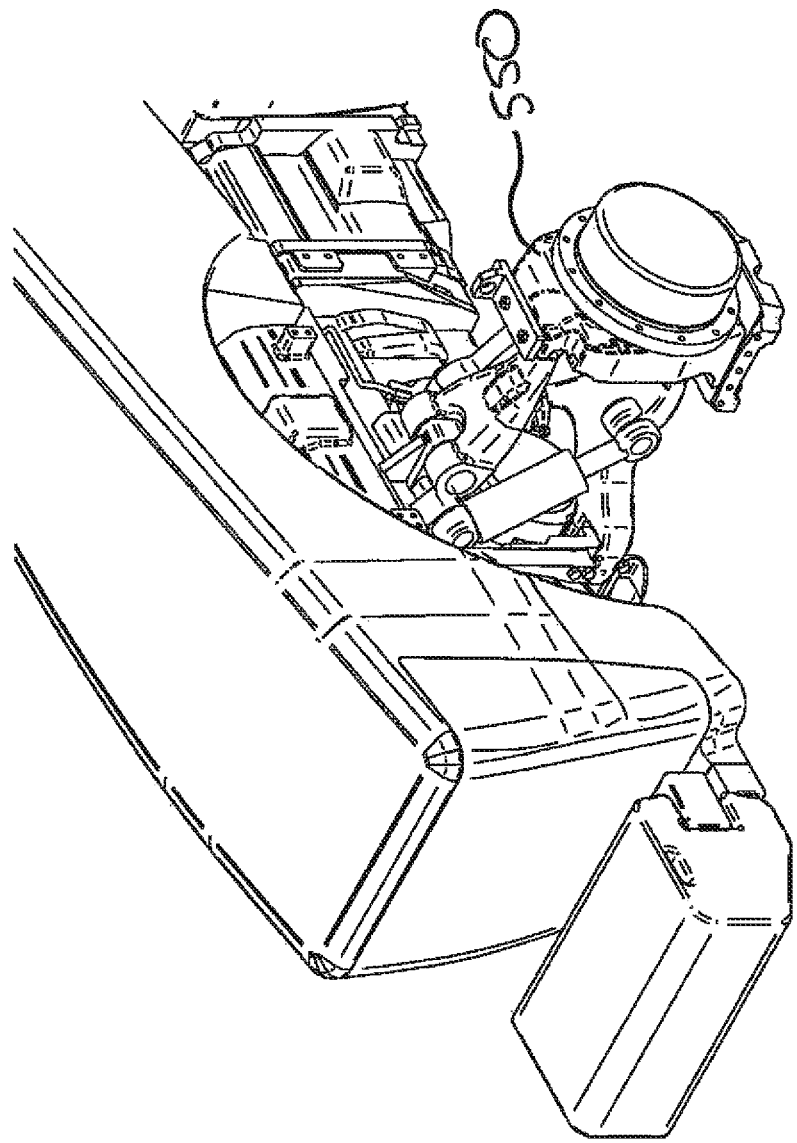
FIG. 21A is a fragmentary left side perspective view of a farming tractor equipped with an embodiment of a steering knuckle having top attachment area in accordance with the principles of the present invention.
Figure 21B:
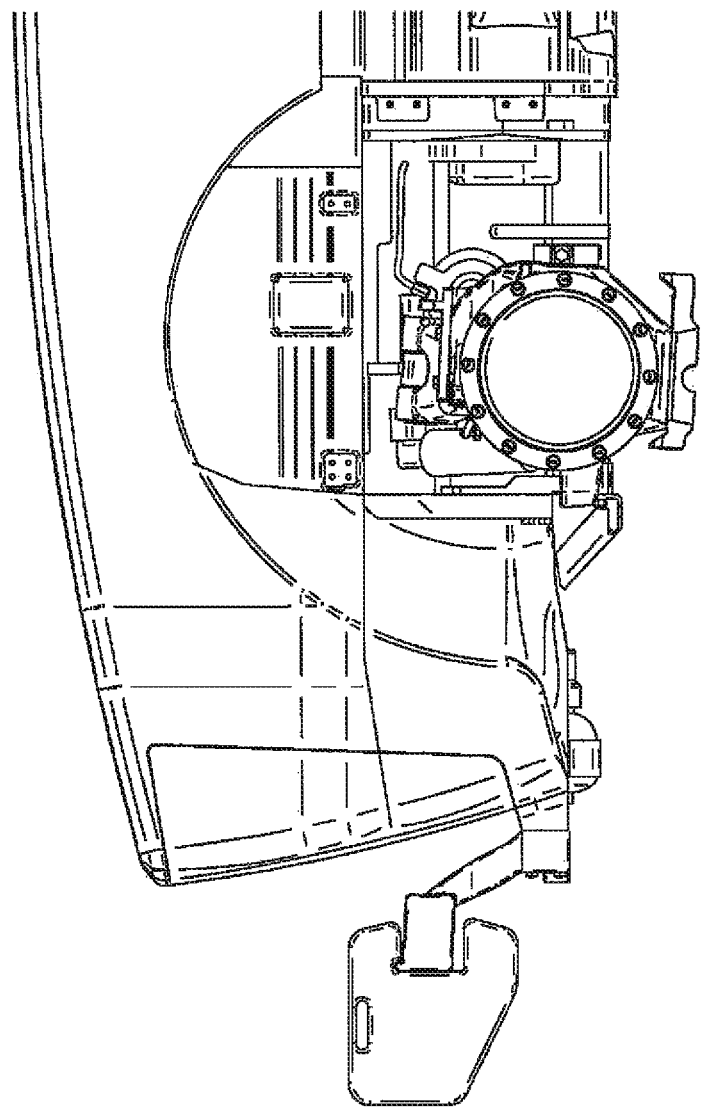
FIG. 21B is an exterior view of the farming tractor equipped with an embodiment of a steering knuckle of FIG. 21A.
Figure 21C:
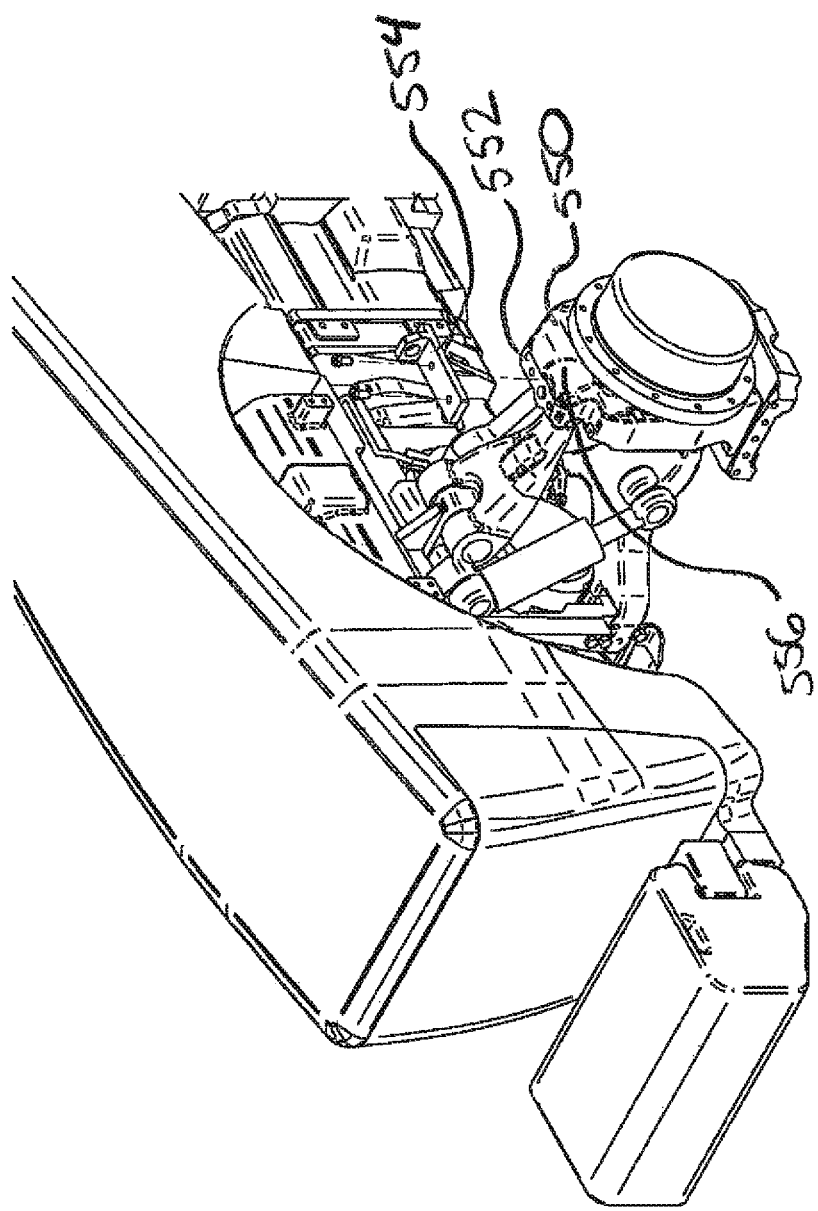
FIG. 21C is an exploded view of the farming tractor equipped with an embodiment of a steering knuckle of FIG. 21A.
Figure 21D:
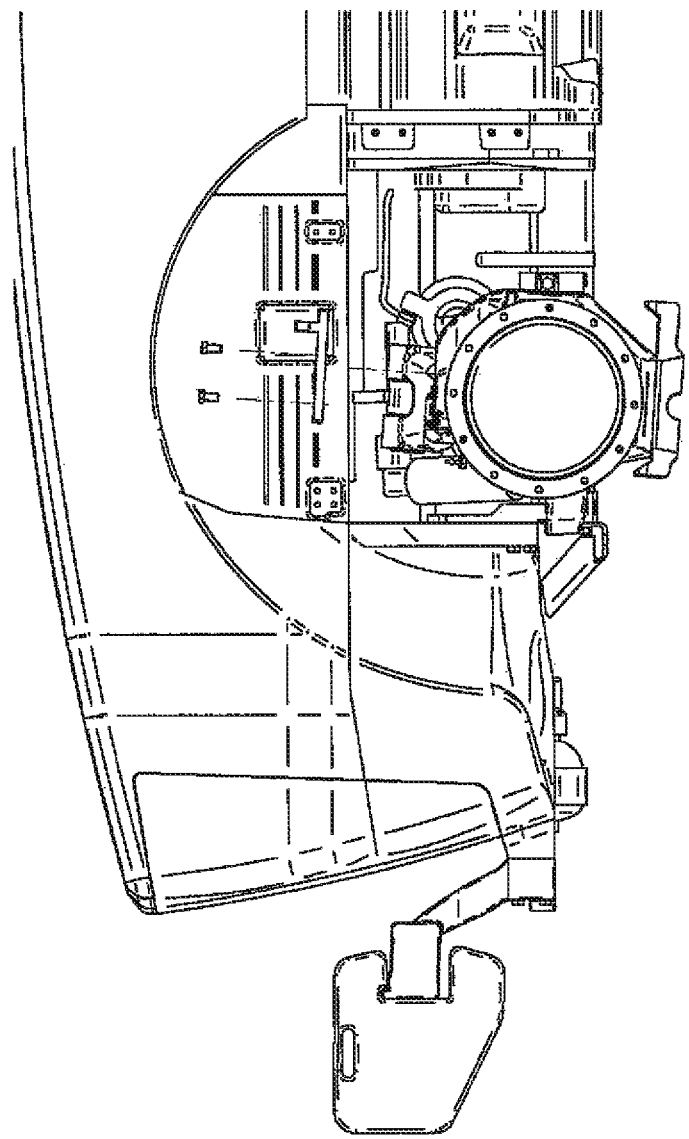
FIG. 21D is an exterior exploded view of the farming tractor equipped with an embodiment of a steering knuckle of FIG. 21A.
Figure 22A:
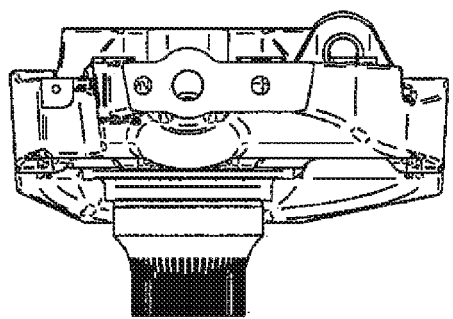
FIG. 22A is a top view of the steering knuckle of FIG. 21A.
Figure 22B:
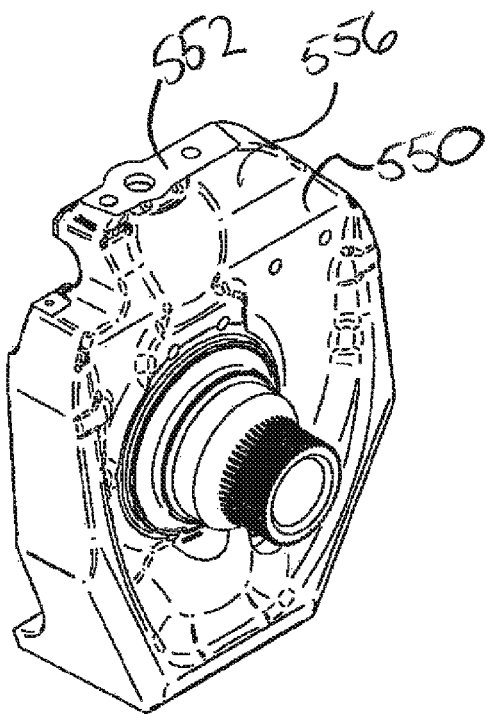
FIG. 22B is a perspective view of the steering knuckle of FIG. 22A.
Figure 22C:
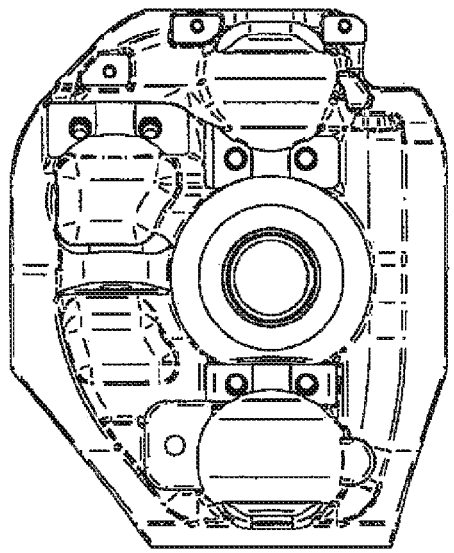
FIG. 22C is an interior view of the steering knuckle of FIG. 22A.
Figure 22D:
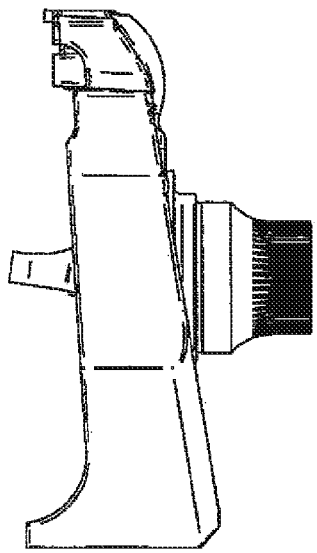
FIG. 22D is a front view of the steering knuckle of FIG. 22A.
Figure 22E:
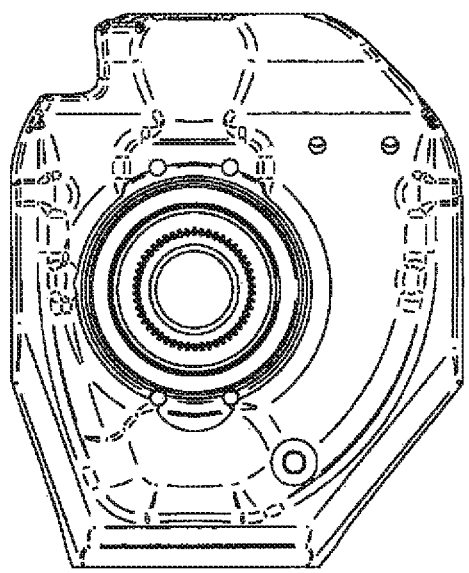
FIG. 22E is an exterior view of the steering knuckle of FIG. 22A.
Figure 22F:
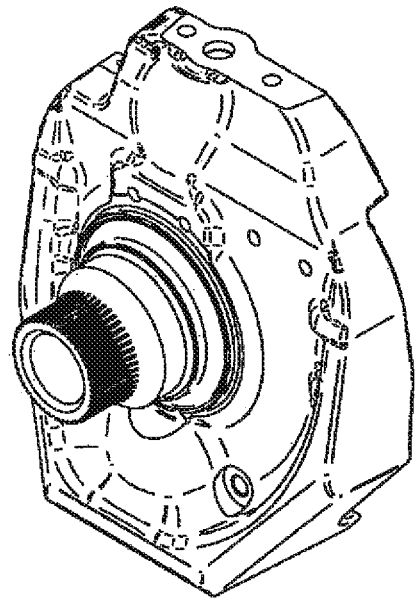
FIG. 22F is a perspective view of the steering knuckle of FIG. 22A.
Figure 22G:
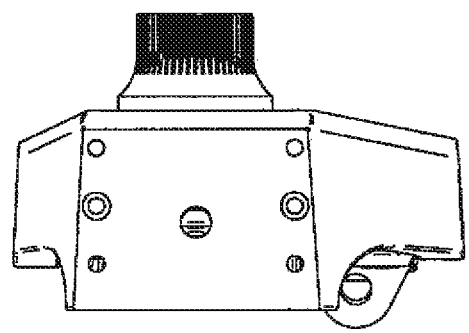
FIG. 22G is a bottom view of the steering knuckle of FIG. 22A.
Figure 22H:
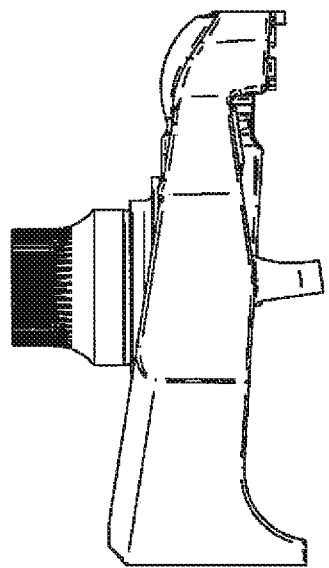
FIG. 22H is a rear view of the steering knuckle of FIG. 22A.
Figure 23A:
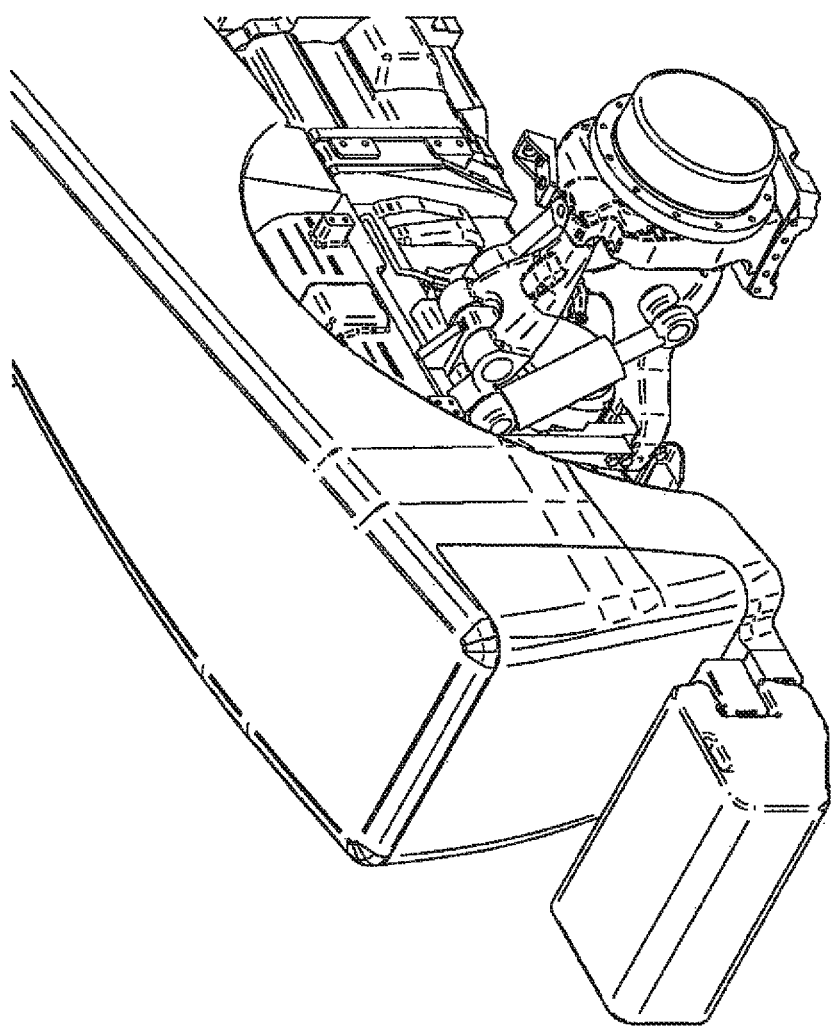
FIG. 23A is a fragmentary left side perspective view of a farming tractor equipped with an embodiment of a steering knuckle having angled top attachment area in accordance with the principles of the present invention.
Figure 23B:
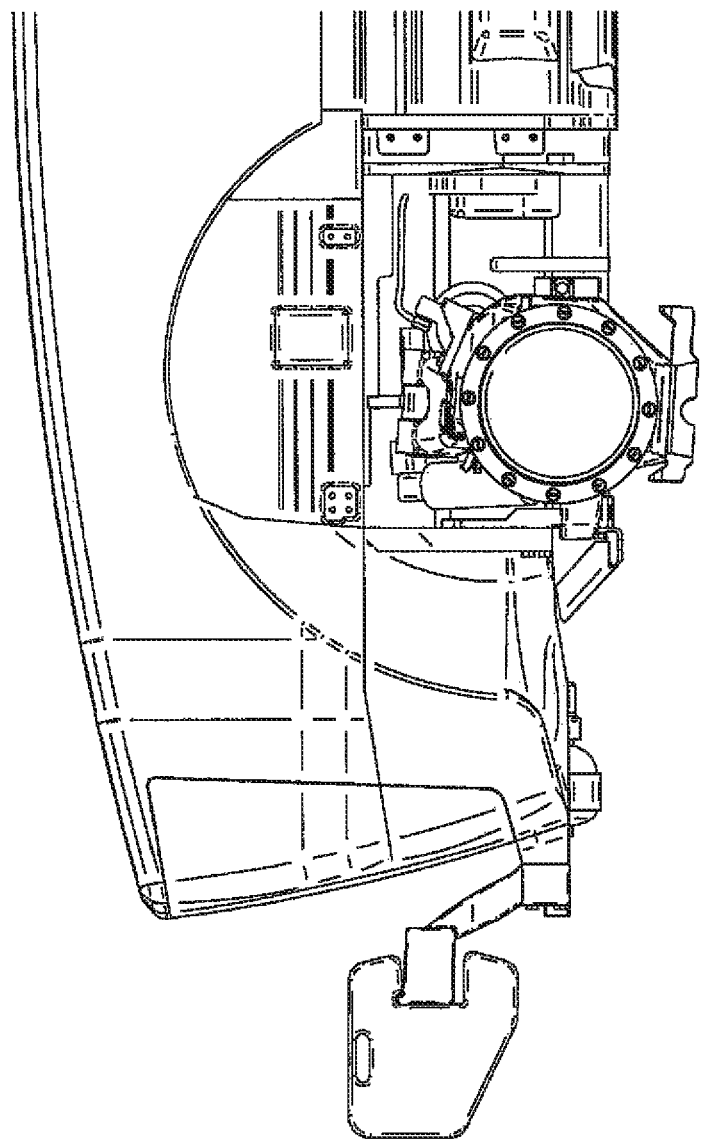
FIG. 23B is an exterior view of the farming tractor equipped with an embodiment of a steering knuckle of FIG. 23A.
Figure 23C:
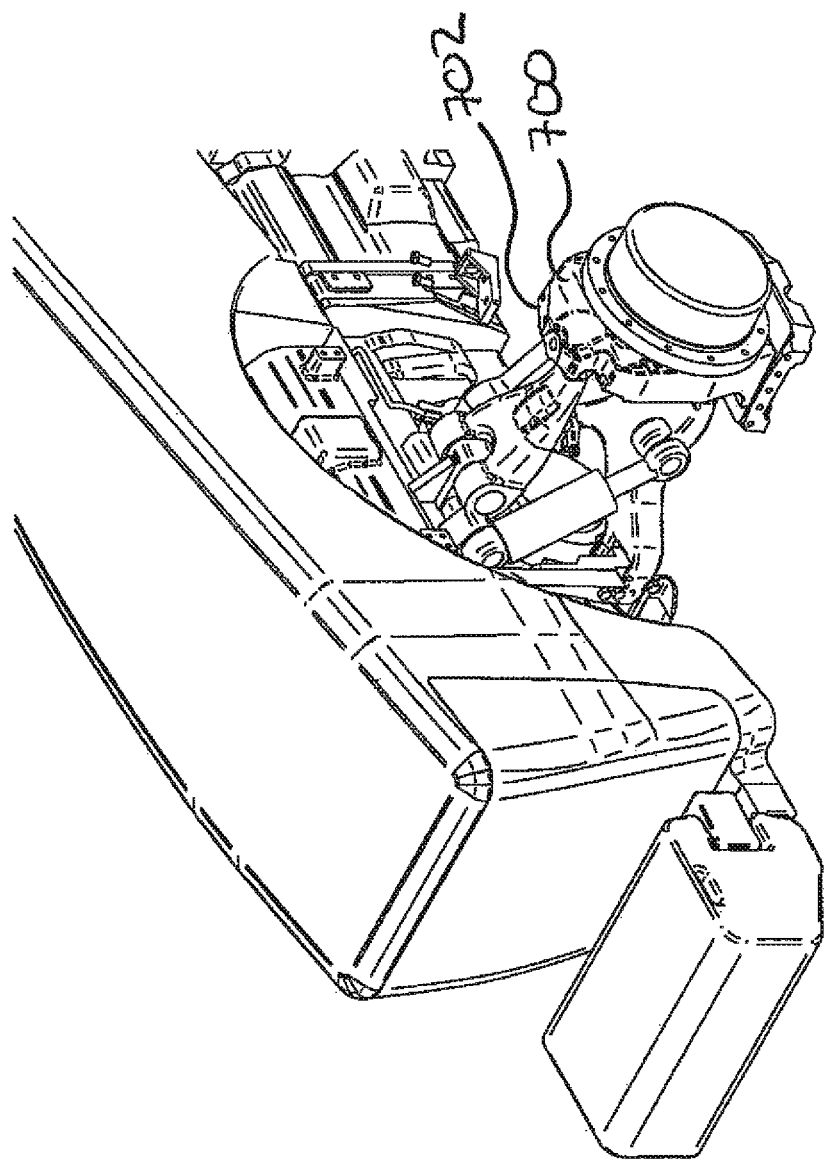
FIG. 23C is an exploded view of the farming tractor equipped with an embodiment of a steering knuckle of FIG. 23A.
Figure 23D:
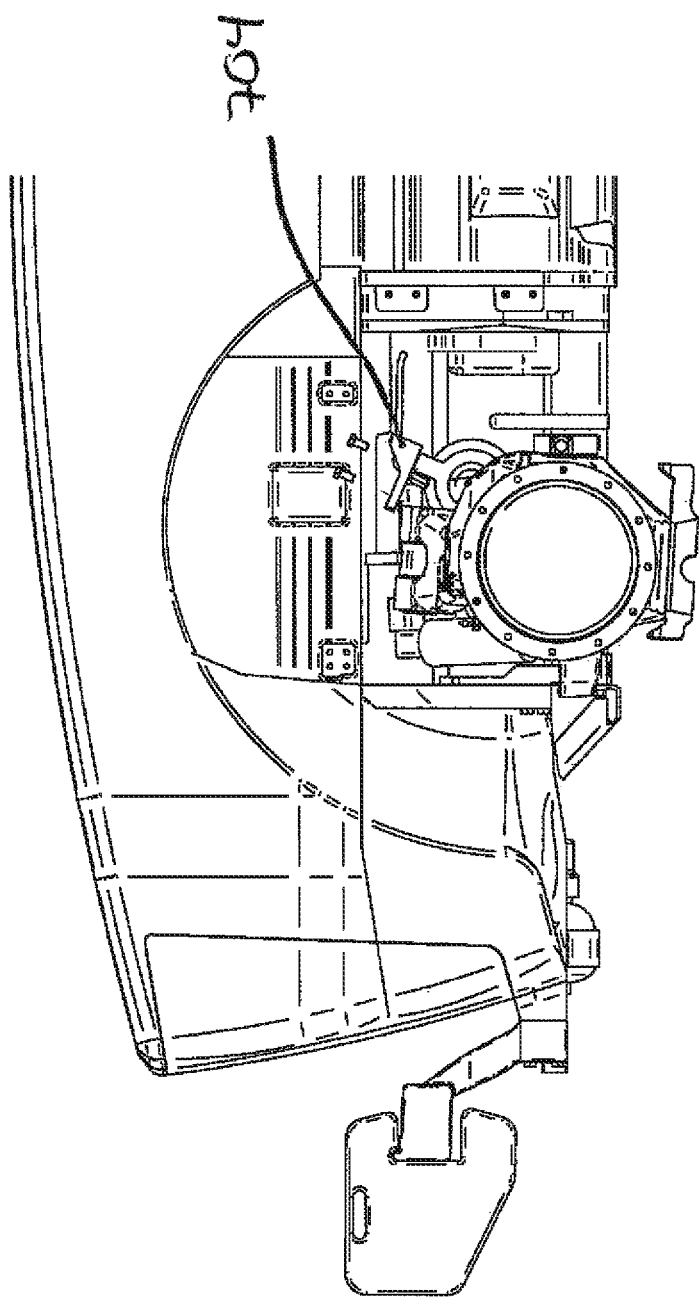
FIG. 23D is an exterior exploded view of the farming tractor equipped with an embodiment of a steering knuckle of FIG. 23A.
Figure 24A:
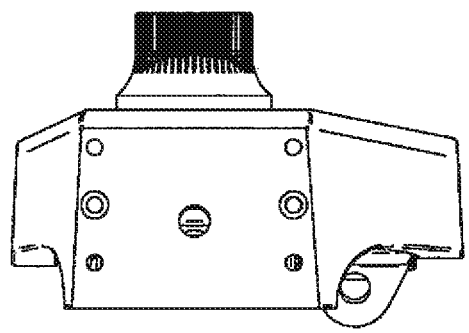
FIG. 24A is a bottom view of the steering knuckle of FIG. 23A.
Figure 24B:
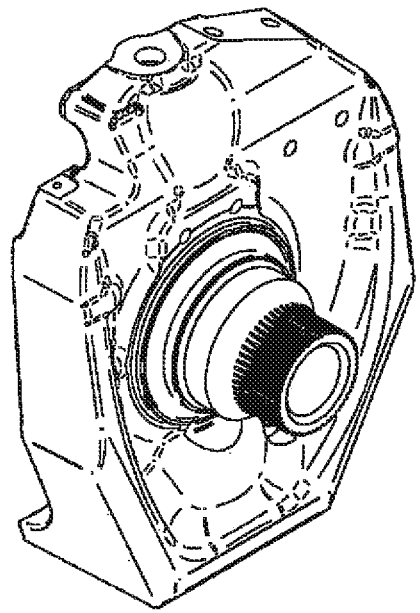
FIG. 24B is a perspective view of the steering knuckle of FIG. 24A.
Figure 24C:
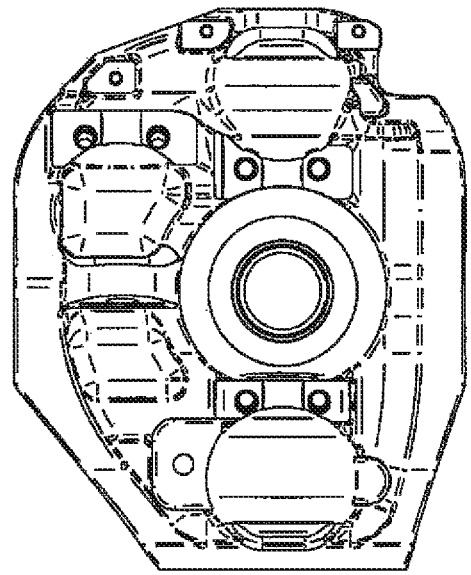
FIG. 24C is an interior view of the steering knuckle of FIG. 24A.
Figure 24D:
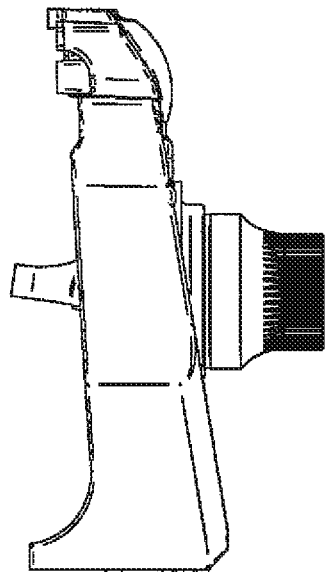
FIG. 24D is a front view of the steering knuckle of FIG. 24A.
Figure 24H:
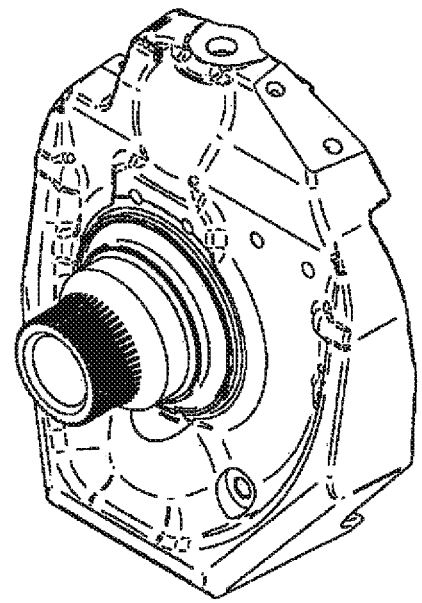
FIG. 24H is a perspective view of the steering knuckle of FIG. 24A.
Figure 24G:
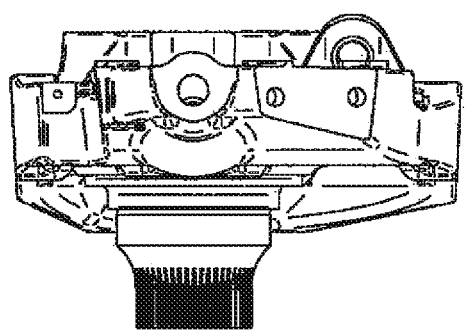
FIG. 24G is a top view of the steering knuckle of FIG. 24A.
Figure 24I:
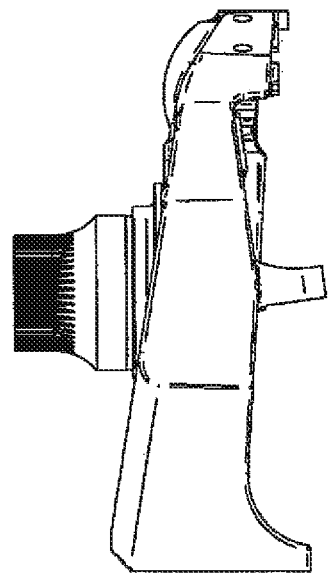
FIG. 24I is a rear view of the steering knuckle of FIG. 24A.

According to another embodiment, now referring to FIGS. 19-20 a steering knuckle 450 is shown having attachment areas 452 and 454 located on the front and rear portions 464, 466. The attachments areas 452, 454 according to this embodiment are tilted at an angle 470 around the driving axle while remaining substantially in a vertical plane perpendicular to the ground. The angle 470, is ranging from 15 to 165 degree, preferably between 30 and 150 degree about the kingpin axis C-C (see FIG. 19D) This embodiment provides an alternate means of attachment while generally requiring less reinforcement as the angled attachment areas 452, 454 allow optimized utilisation of the lower portion 472 of the reinforced steering knuckle 450. Likewise, the angled attachments areas 452, 454 allow for an easier attachment of the track system 300. Still, according to other embodiments, the attachment areas 452, 454 may have rounded and have, for instance, angled holes or threaded openings 474 for securing the track system 300. In such other embodiments, the mating attachment element 458, 462 would preferably have complementary mating configurations.

According to another embodiment, now referring to FIGS. 21-22, the steering knuckle 550 comprises top attachment areas 552, 554 for attachment of track systems 300 parallel to the pivot axle. Contrary to prior art systems attaching the track system directly in the kingpin openings (in the pivot axle), the present embodiment provides a reinforced steering knuckle 550 able to vertically mount a track system 300. The steering knuckle 550 preferably comprise a top protrusion 556 reinforced over the area where the kingpin is located to provide solidified vertical attachment areas 552. As such, the knuckle 550 according to this embodiment could allow installation of system similar to the known systems typically attaching in the kingpin holes without requiring significant adaptations. According to this embodiment, one with ordinary skills in the art may install previous vertically mounted systems (not shown) in a safer and more secure way. Understandably as all embodiments disclosed herein, the present knuckle 550 allows the user to mount either conventional wheels or tracks system 300 to the same steering knuckle 550. The reinforced steering knuckle 550 provide the user with an alternative for using existing vertically mounted attachment track systems by only modifying the mounting member.

According to another embodiment, similar to the top attachment embodiment (FIGS. 21-22), now referring to FIGS. 23-24, the steering knuckle 700 comprise attachment areas 702 along the periphery of its knuckle 700. In this embodiment, the orientation of an axis normal to at least one of the fasteners is generally between 15 and 165 preferably about 30 and 150 degrees from the vertical axis or pivot axis. As such, this embodiment is configured for attachments 704 which may optimize the attachment area 702 by providing multiple attachment angles. In addition, this embodiment may be more versatile and provide better flexibility for different track system 300 requiring attachment along the upper 710 or lower 712 region of the steering knuckle 700.

Figure 25B:
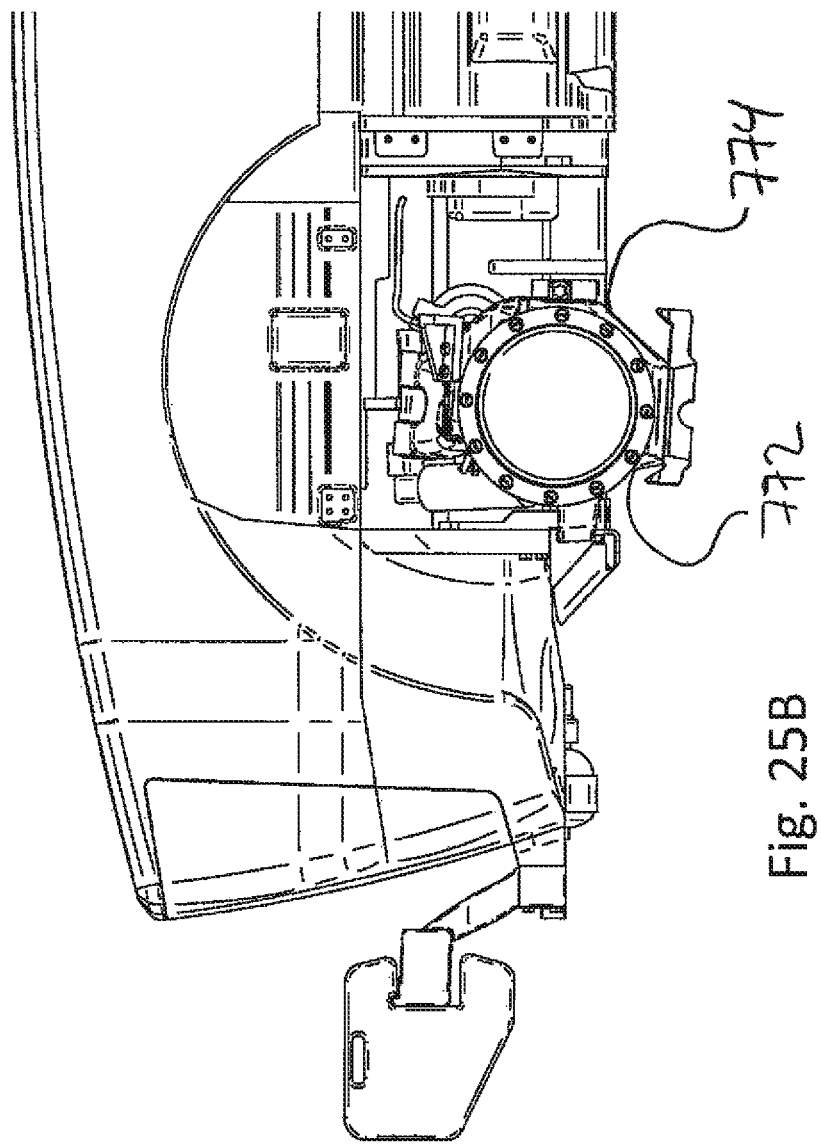
FIG. 25B is an exterior view of the farming tractor equipped with an embodiment of a steering knuckle of FIG. 25A.
Figure 26A:
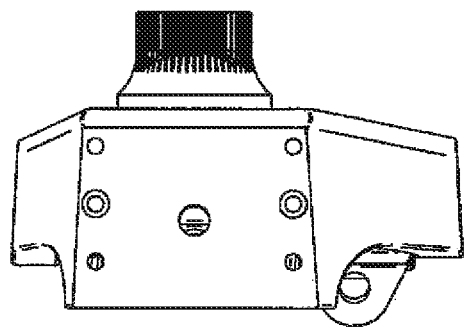
FIG. 26A is a bottom view of the steering knuckle of FIG. 25A.
Figure 26B:
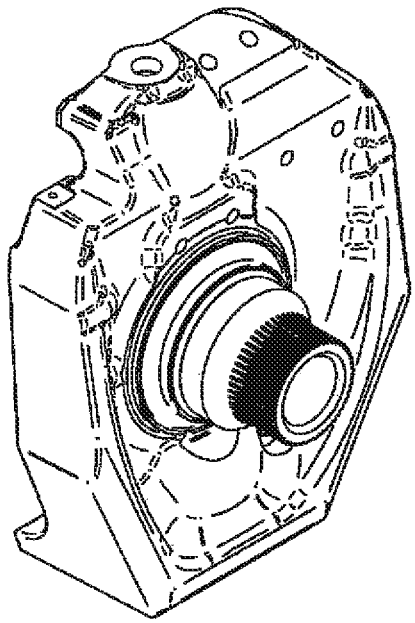
FIG. 26B is a perspective view of the steering knuckle of FIG. 26A.
Figure 26C:
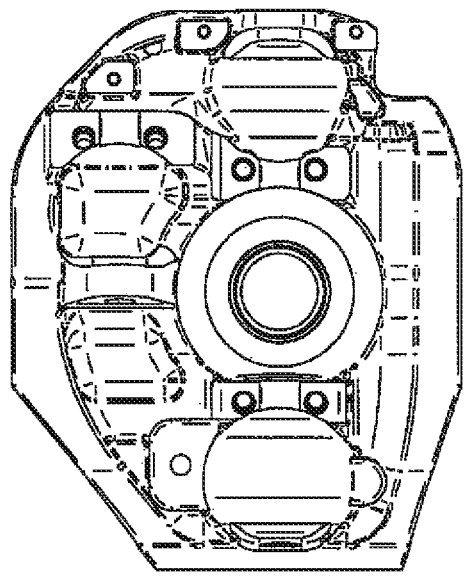
FIG. 26C is an interior view of the steering knuckle of FIG. 26A.
Figure 26D:
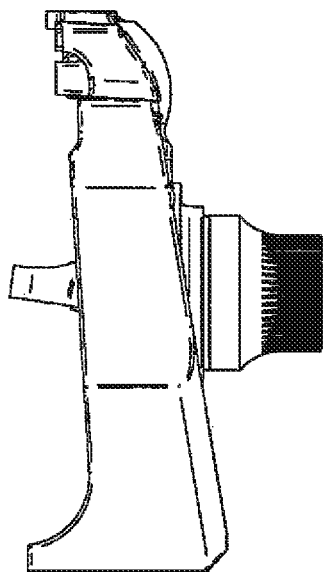
FIG. 26D is a front view of the steering knuckle of FIG. 26A.
Figure 26F:
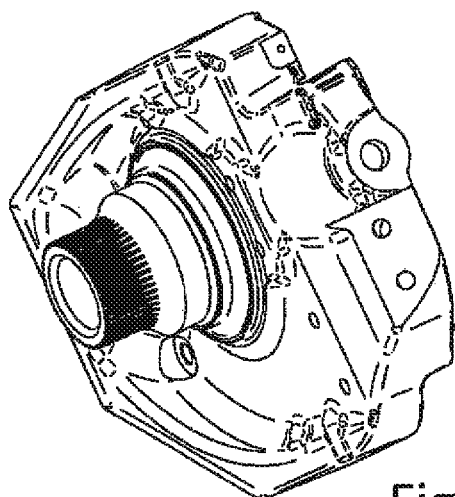
FIG. 26F is a perspective view along the A-A axis of the steering knuckle of FIG. 26E.
Figure 26G:
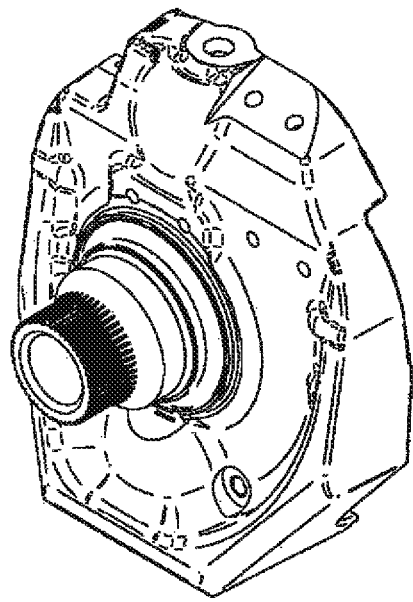
FIG. 26G is a perspective view of the steering knuckle of FIG. 26A.
Figure 26E:
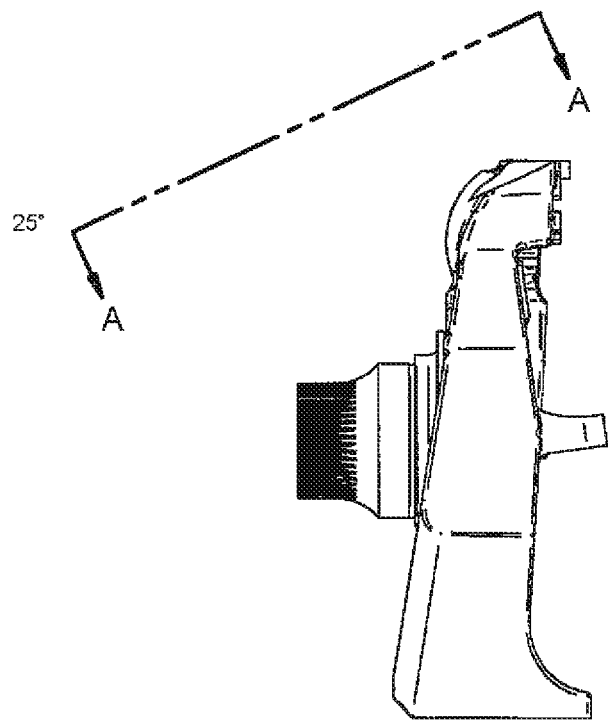
FIG. 26E is a rear view of the steering knuckle of FIG. 26A.
Figure 26H:
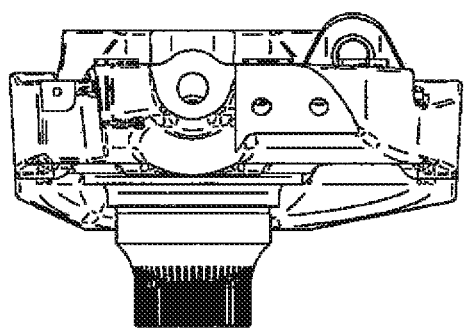
FIG. 26H is a top view of the steering knuckle of FIG. 26A.
Figure 26I:
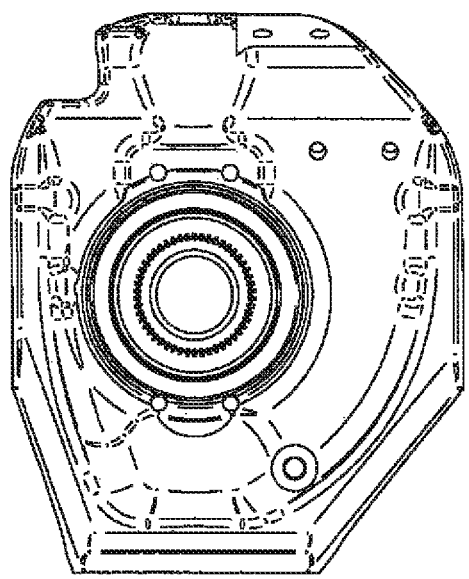
FIG. 26I is an exterior view of the steering knuckle of FIG. 26A.

According to another embodiment, now referring to FIGS. 25-26, the steering knuckle 750 may comprise tilted attachment areas 752, in the upper portion of the knuckle 750. As such, the attachment area 750 may be at an angle to allow the fasteners 770 to be inserted at an angle 766 between 5 and 85, preferably between about 15 and 75 degrees about the pivot axis 768. In such an embodiment, the angle 766 of the fasteners 770 securing the attachment area 752 and mating attachment element 754 favors easier mounting process for the track system. In addition, in such an embodiment, the front 772 and rear 774 portions of the steering knuckle 750 are unhindered by the sometime bulky track system 300 mounting members. According to this embodiment, the track system is mounted in a configuration that preferably vertically sandwich the knuckle 750 providing a secure mounting of the track system 300 to the steering knuckle 750.

Figure 27A:
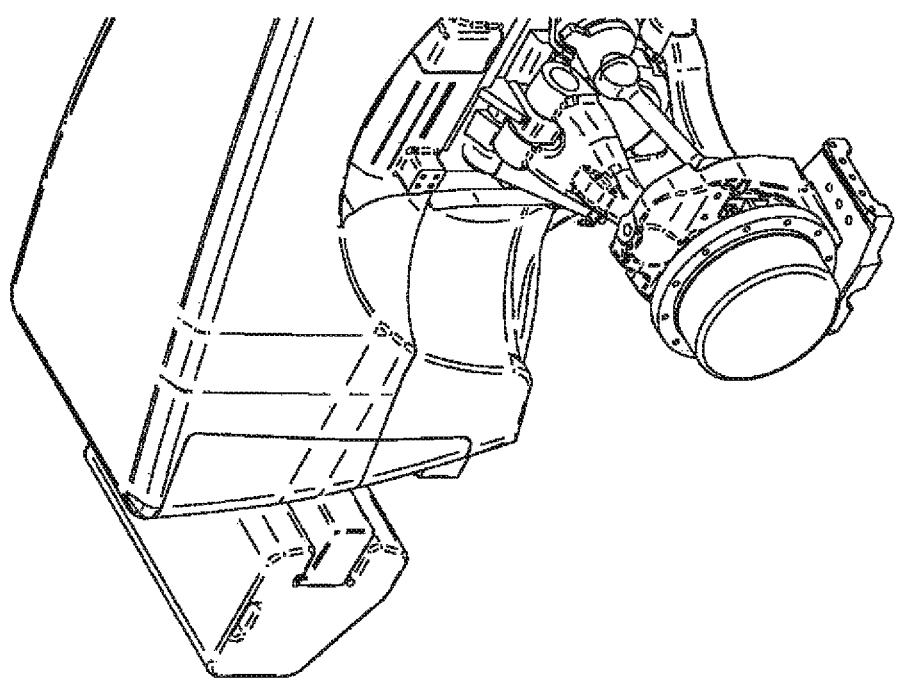
FIG. 27A is a fragmentary left side perspective view of a farming tractor equipped with an embodiment of a steering knuckle having lateral attachment area in accordance with the principles of the present invention.
Figure 27B:
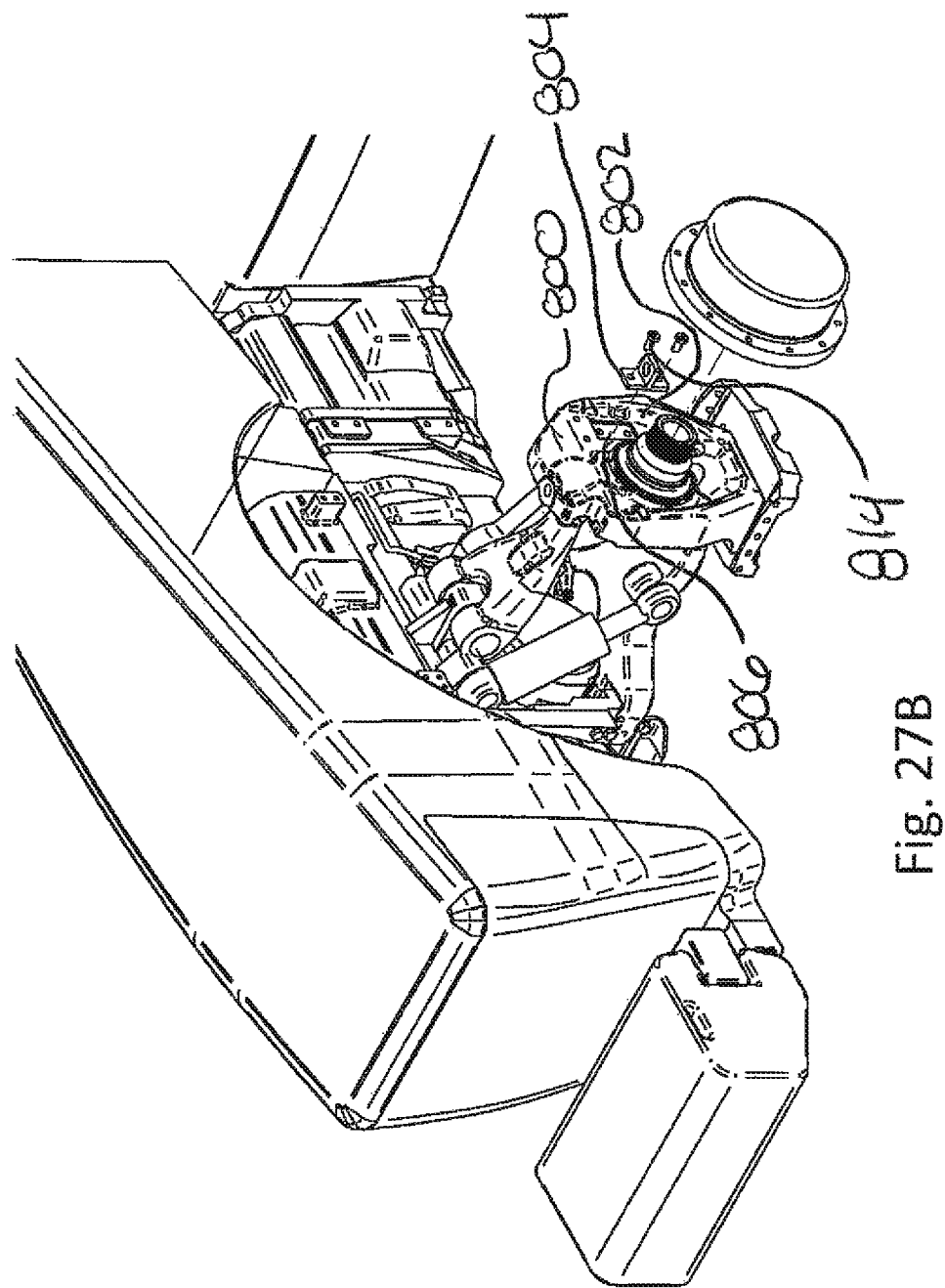
FIG. 27B is an exploded view of the steering knuckle of FIG. 27A.
Figure 27C:
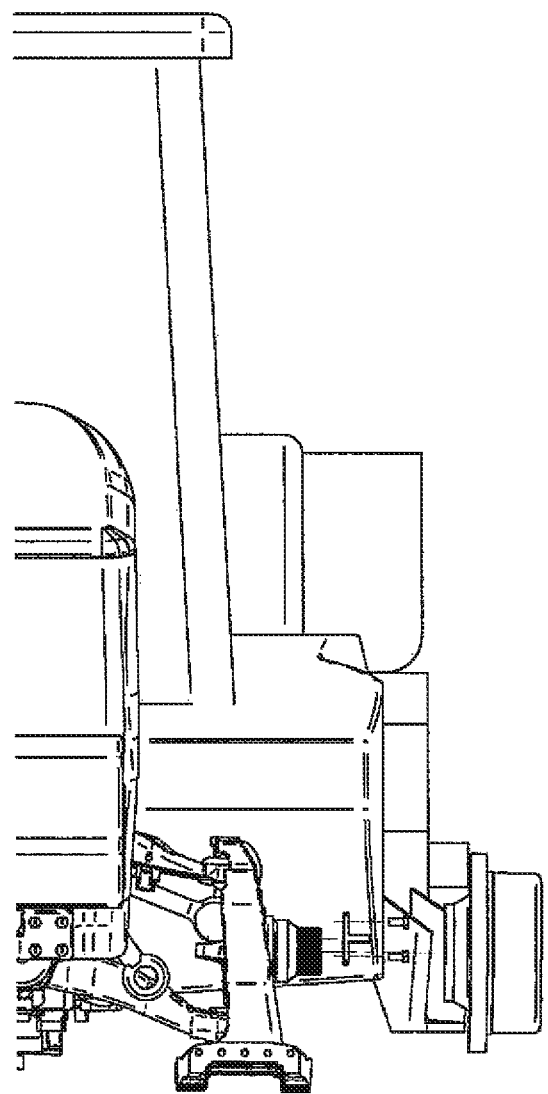
FIG. 27C is a fragmentary front exploded view of the farming tractor equipped with an embodiment of a steering knuckle of FIG. 27A.
Figure 28E:
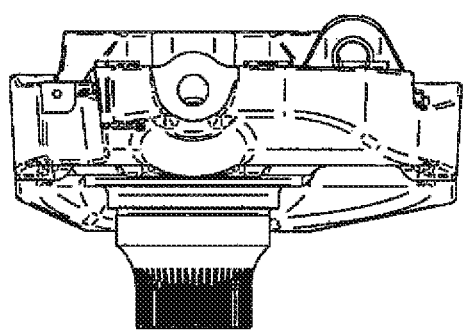
FIG. 28E is a top view of the steering knuckle of FIG. 28A.
Figure 28F:
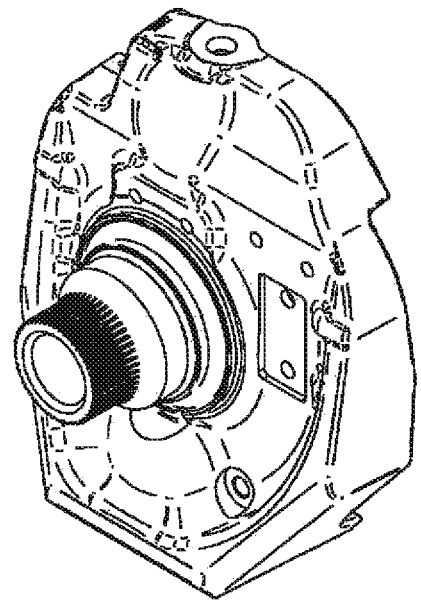
FIG. 28F is a perspective view of the steering knuckle of FIG. 28A.
Figure 28G:
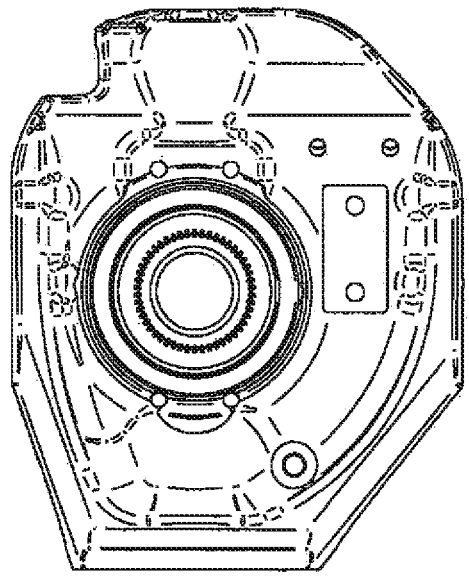
FIG. 28G is an exterior view of the steering knuckle of FIG. 28A.
Figure 28H:
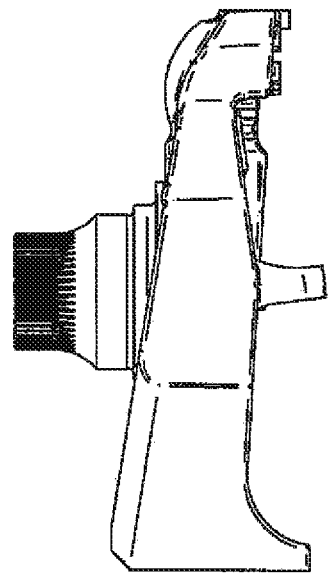
FIG. 28H is a rear view of the steering knuckle of FIG. 28A.

According to another embodiment, now referring to FIGS. 27-28, the track system 300 may be mounted on the lateral portion 802 of the reinforced steering knuckle 800. As such, according to this embodiment the steering knuckle 800 may have the ability of securing the track system 300 to the lateral area 802. Understandably, to secure the track system using the lateral area 802, also referred to as the exterior face 802 of the knuckle 800, the knuckle must have an oversized configuration to insure that attachment areas 806 and mating attachment element 804 are not hindering the rotating element 810 driving the sprocket wheel. Using the lateral side 802 for attachment may allow a less bulky steering knuckle periphery 808 as the lateral or exterior face 802 is generally stronger than its periphery 808. As such, the periphery 808, in such embodiments, would require less reinforcement as the periphery is not used as attachment areas. Understandably the exemplary embodiment shown in FIG. 27-28 is only one of a variety of laterally reinforced steering knuckle 800 possible. As illustrated with the various previous embodiments, the lateral attachment areas 806 may have threaded openings or any other suitable attachment anchors for securing the attachment element 802, preferably using fasteners 814 such as threaded bolts.

Figure 29A:
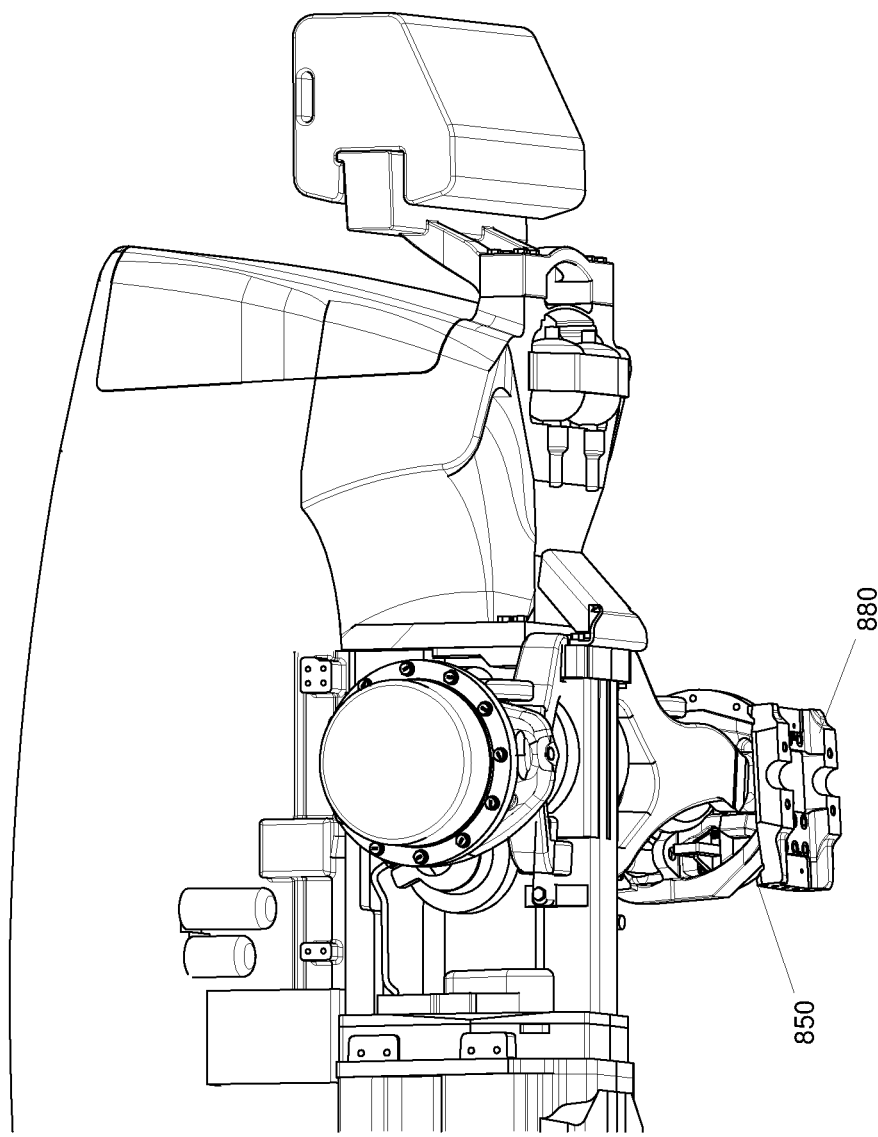
FIG. 29A is a fragmentary right side perspective view of a farming tractor equipped with an embodiment of a steering knuckle in accordance with the principles of the present invention.
Figure 29B:
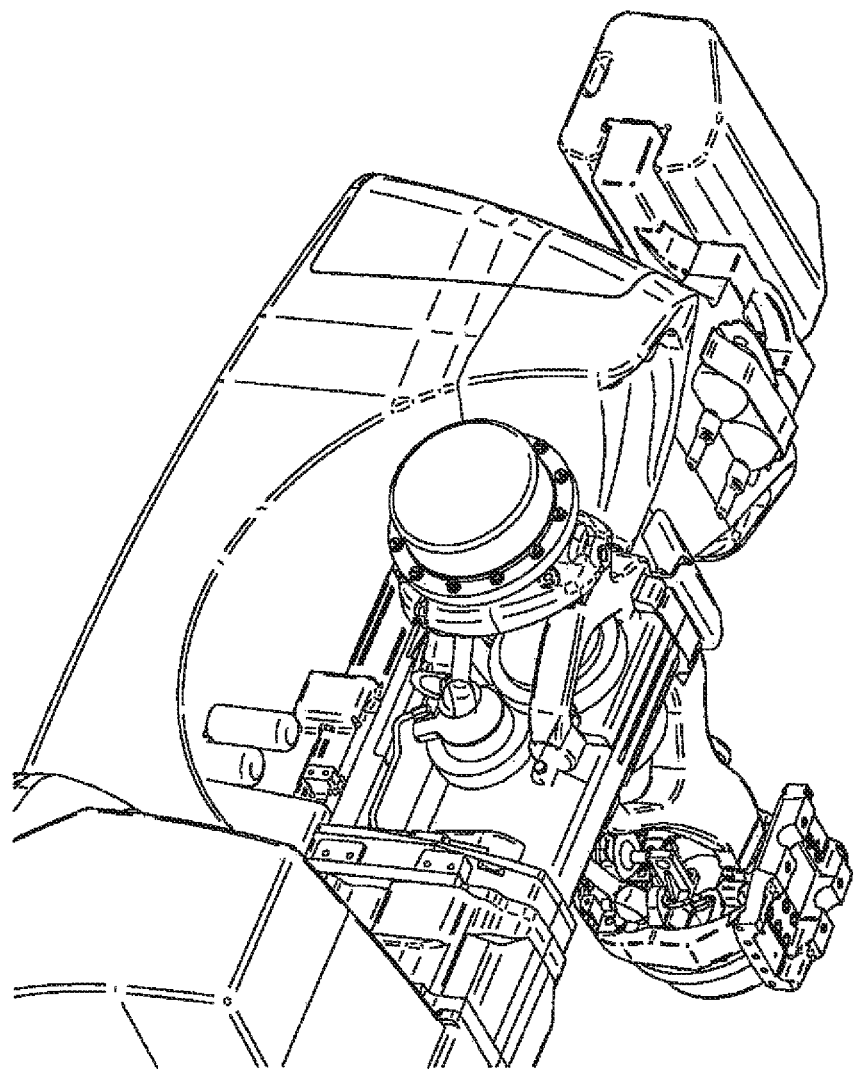
FIG. 29B is a fragmentary right side perspective view of the farming tractor equipped with an embodiment of a steering knuckle of FIG. 29A.
Figure 29C:
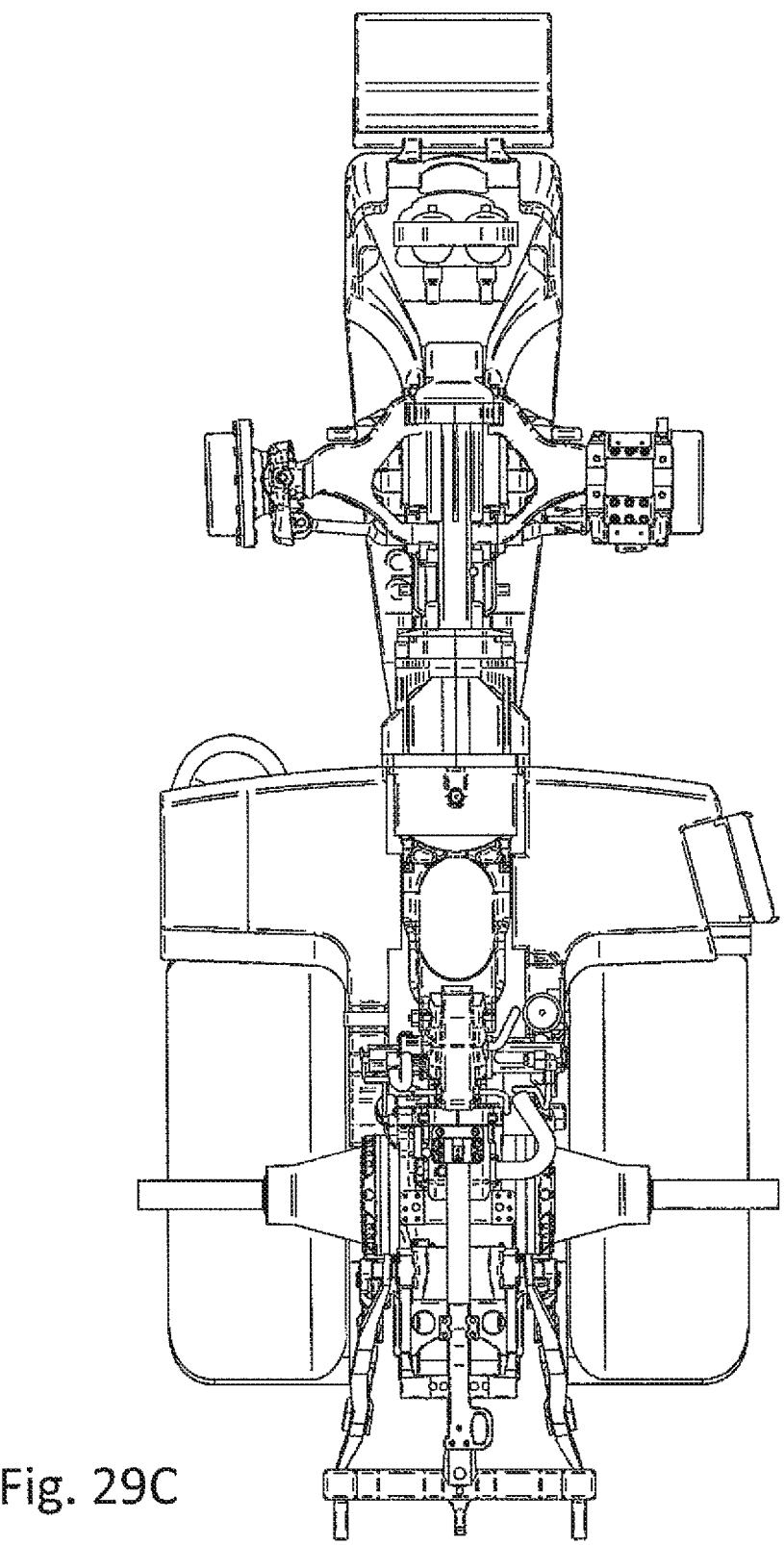
FIG. 29C is a bottom view of the farming tractor equipped with an embodiment of a steering knuckle of FIG. 29A.
Figure 30E:
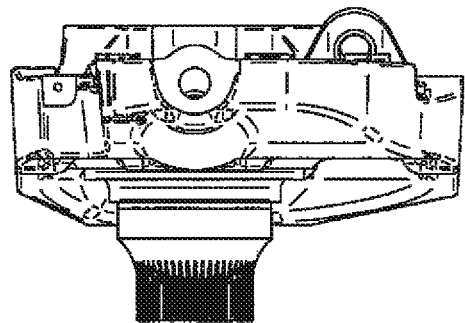
FIG. 30E is a top view of the steering knuckle of FIG. 30A.
Figure 30F:
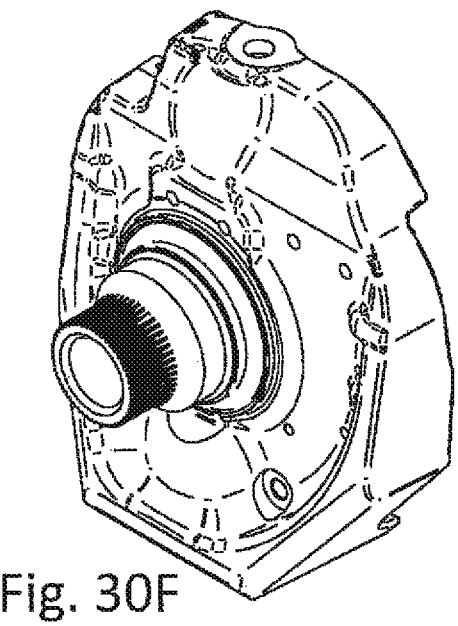
FIG. 30F is a perspective view of the steering knuckle of FIG. 30A.
Figure 30G:
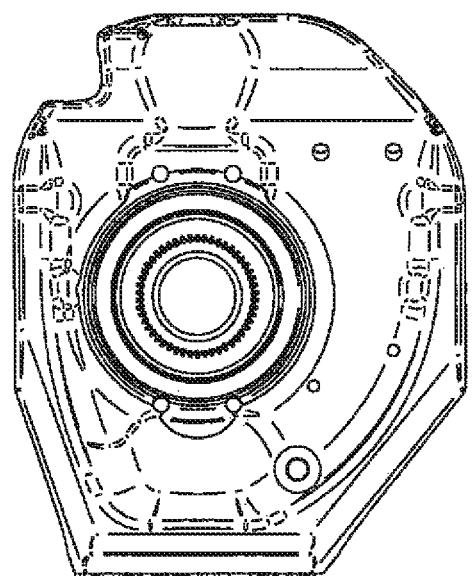
FIG. 30G is an exterior view of the steering knuckle of FIG. 30A.
Figure 30H:
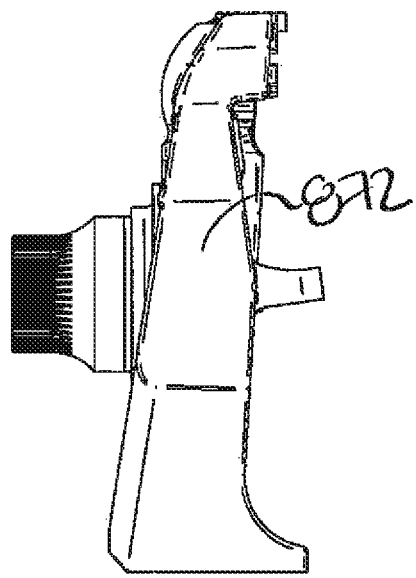
FIG. 30H is a rear view of the steering knuckle of FIG. 30A.

According to another embodiment, now referring to FIGS. 29-30, the steering knuckle 850 is attached primarily through attachment areas located on the under most surface 852, also referred to as the bottom surface, of the steering knuckle 850. According to this embodiment, the inner side 854 of the steering knuckle 850 is configured to accommodate the kingpin (also referred to as "pivot axle") assembly of the rigid axle 522 of the vehicle 510 through opening 856. In that sense, the inner side 854 comprises main recess 858. Main recess 858 is configured for accommodating the extremity of the axle 522 and the kingpin assembly. Main recess 858 also comprises an upper opening 856 extending to the upper region 860 (see also FIGS. 30B-C) and a lower opening 862 extending to the lower region 864 (see also FIG. 30A). Upper opening 856 is configured to receive the upper kingpin member (not shown) while the lower opening 862 is configured to receive the lower kingpin member (not shown). Additionally, in this embodiment, the knuckle is reinforced to allow for attachment of the track system 300 on the lower surface 852 of the knuckle 850. As such according to this embodiment, a steering knuckle 850 could allow attachment of the track system 300 solely through the bottom surface 852, thus limiting any requirement for bulky attachments on any of the front 870 or rear 872 sides and lateral areas 874. Mounting element 880 is preferably secured to the bottom surface 852 of the steering knuckle 850 using attachment areas, preferably threaded openings 882.

Figure 31A:
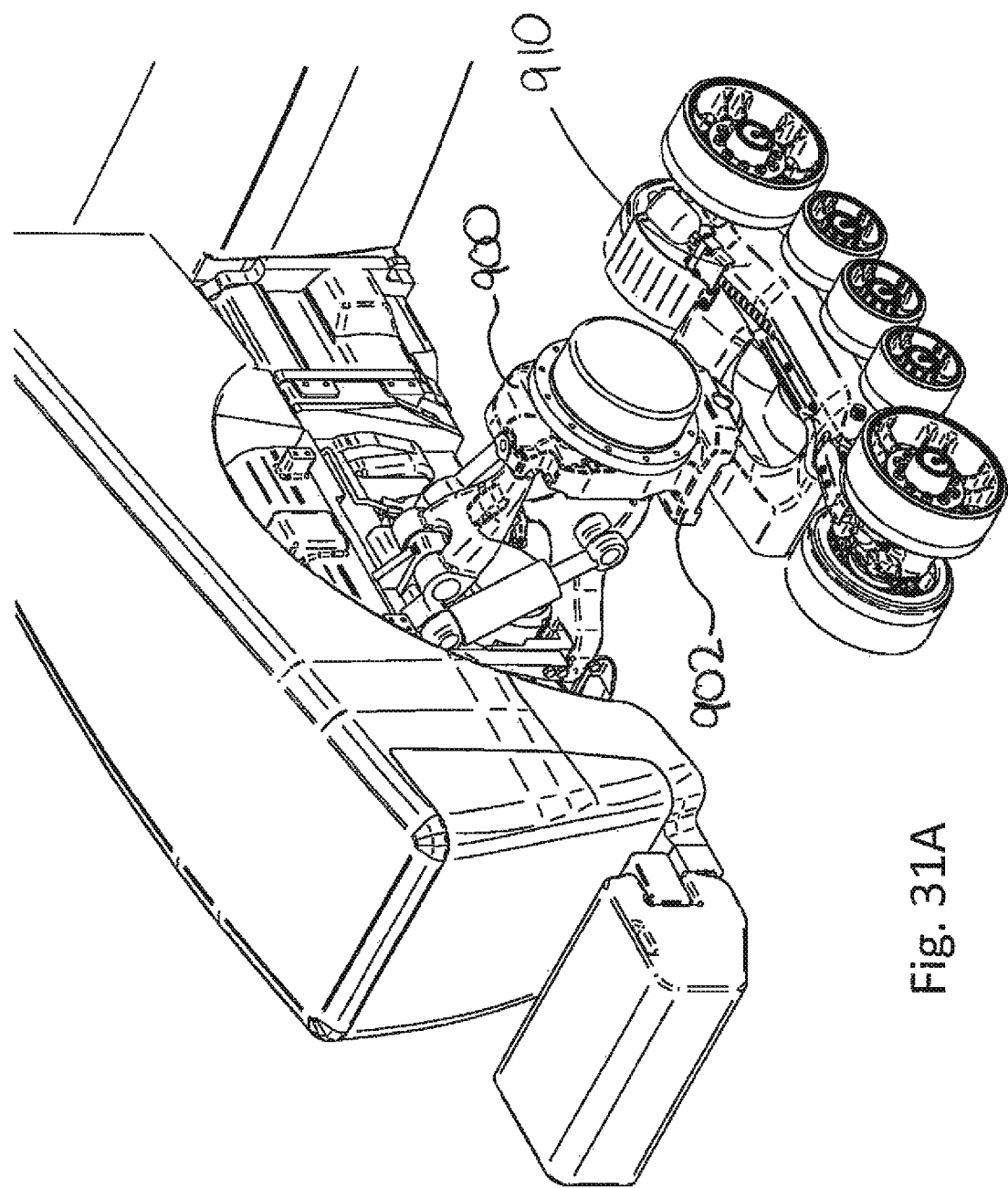
FIG. 31A is a fragmentary right side perspective view of a farming tractor equipped with an embodiment of a steering knuckle in accordance with the principles of the present invention.
Figure 31B:
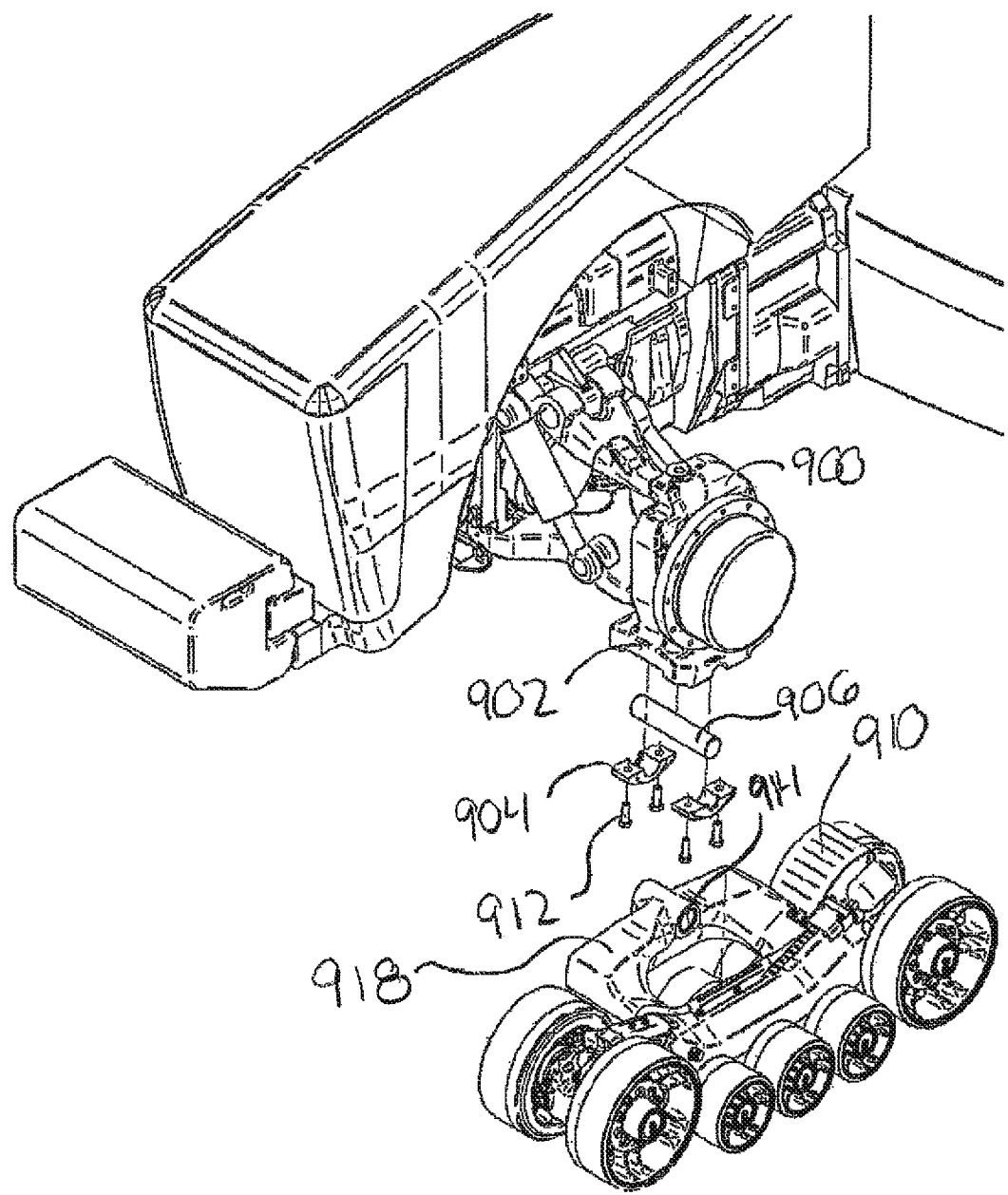
FIG. 31B is an exploded view of the farming tractor equipped with an embodiment of a steering knuckle of FIG. 31A.
Figure 32A:
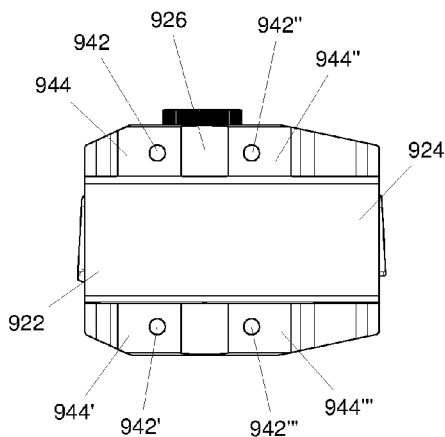
FIG. 32A is a bottom view of the steering knuckle of FIG. 31A.
Figure 32B:
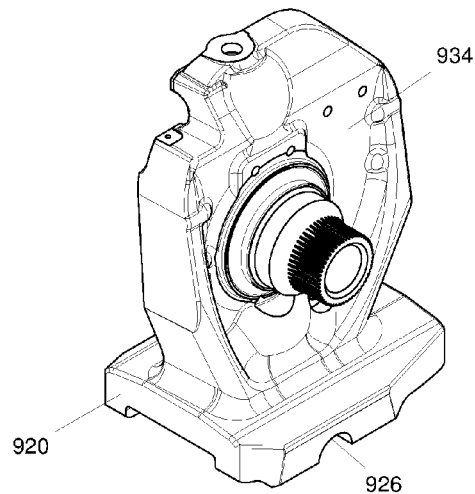
FIG. 32B is a perspective view of the steering knuckle of FIG. 32A.
Figure 32C:
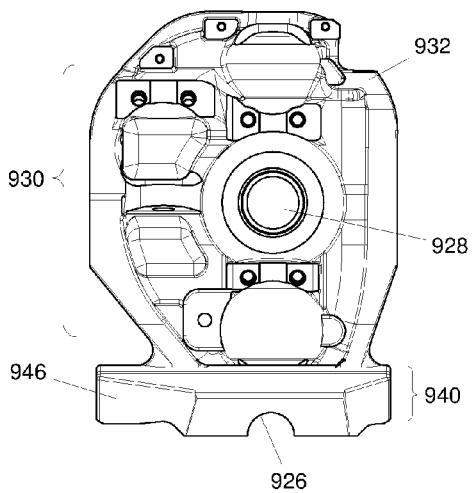
FIG. 32C is an interior view of the steering knuckle of FIG. 32A.
Figure 32D:
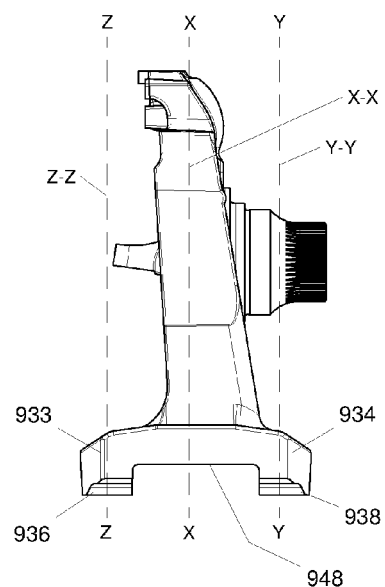
FIG. 32D is a front view of the steering knuckle of FIG. 32A.
Figure 32E:
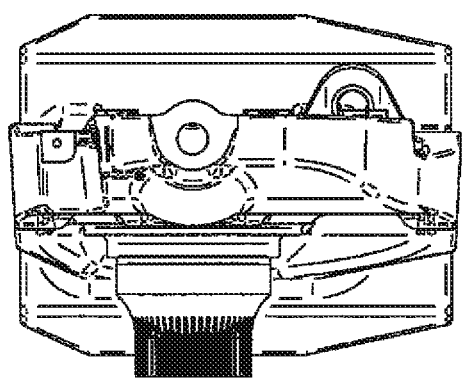
FIG. 32E is a top view of the steering knuckle of FIG. 32A.
Figure 32F:
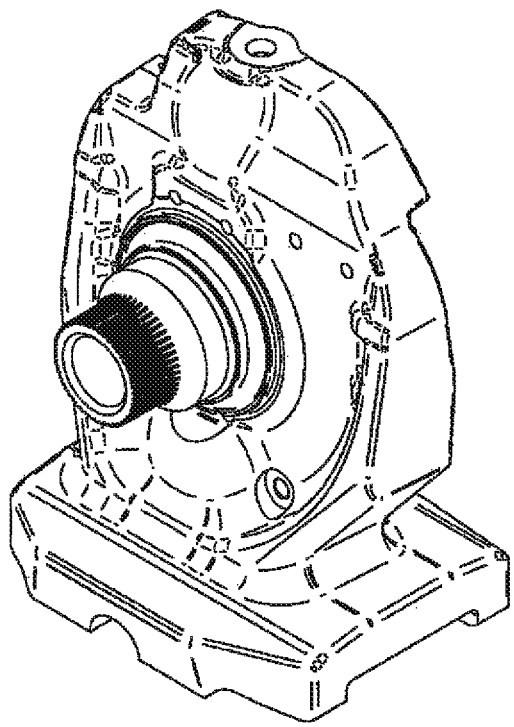
FIG. 32F is a perspective view of the steering knuckle of FIG. 32A.
Figure 32G:
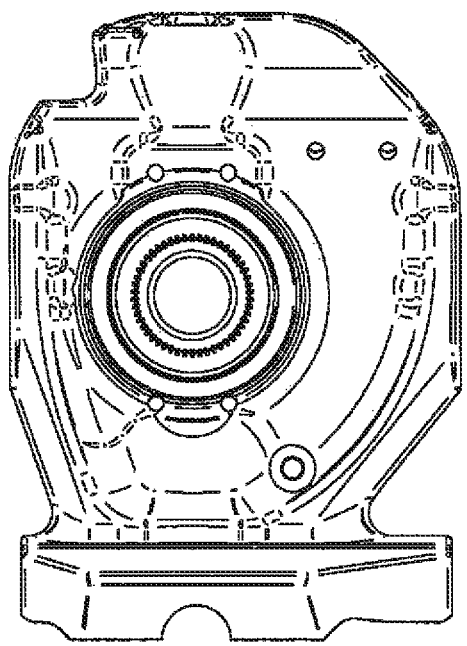
FIG. 32G is an exterior view of the steering knuckle of FIG. 32A.
Figure 32H:
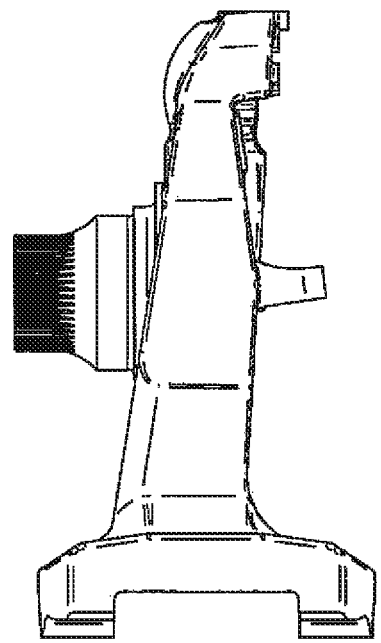
FIG. 32H is a rear view of the steering knuckle of FIG. 32A.
Figure 33A:
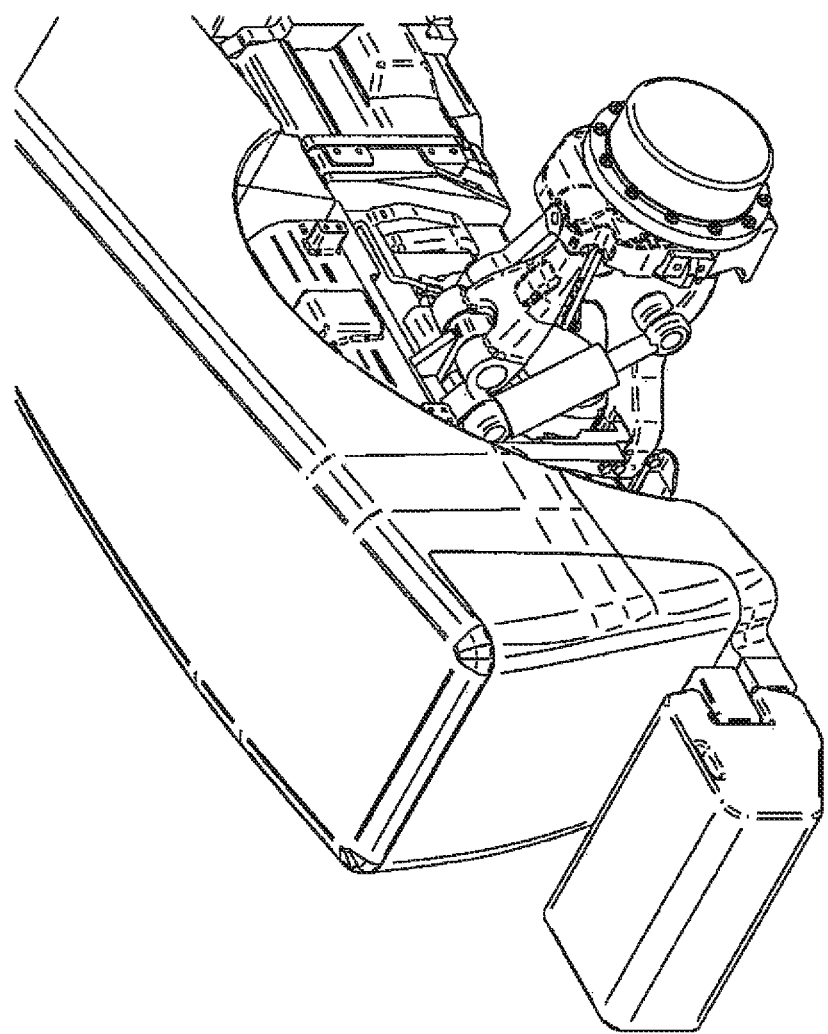
FIG. 33A is a fragmentary right side perspective view of a farming tractor equipped with an embodiment of a steering knuckle in accordance with the principles of the present invention.
Figure 33B:
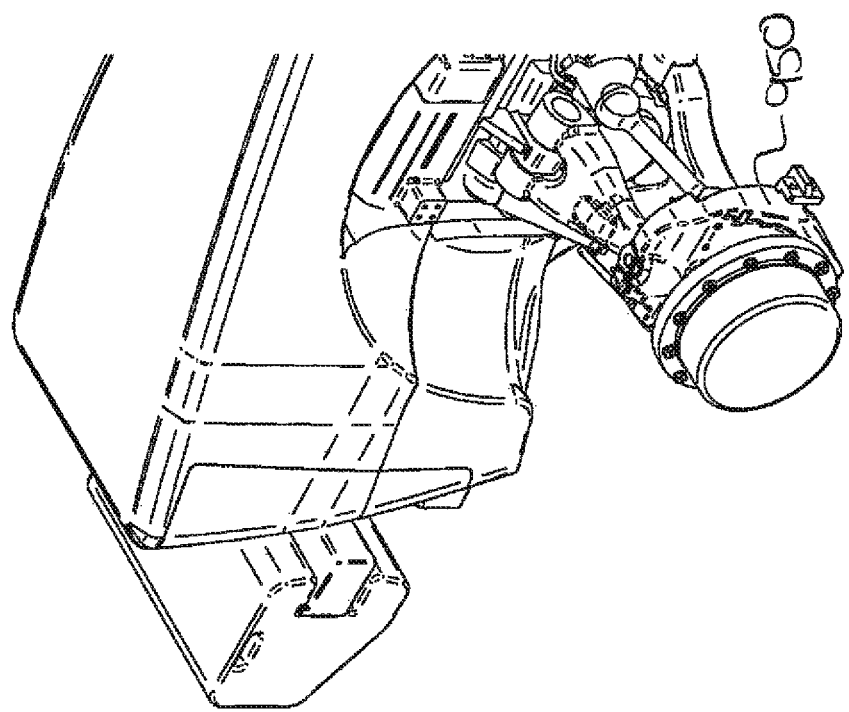
FIG. 33B is a perspective view of the farming tractor equipped with an embodiment of a steering knuckle of FIG. 33A.
Figure 33C:
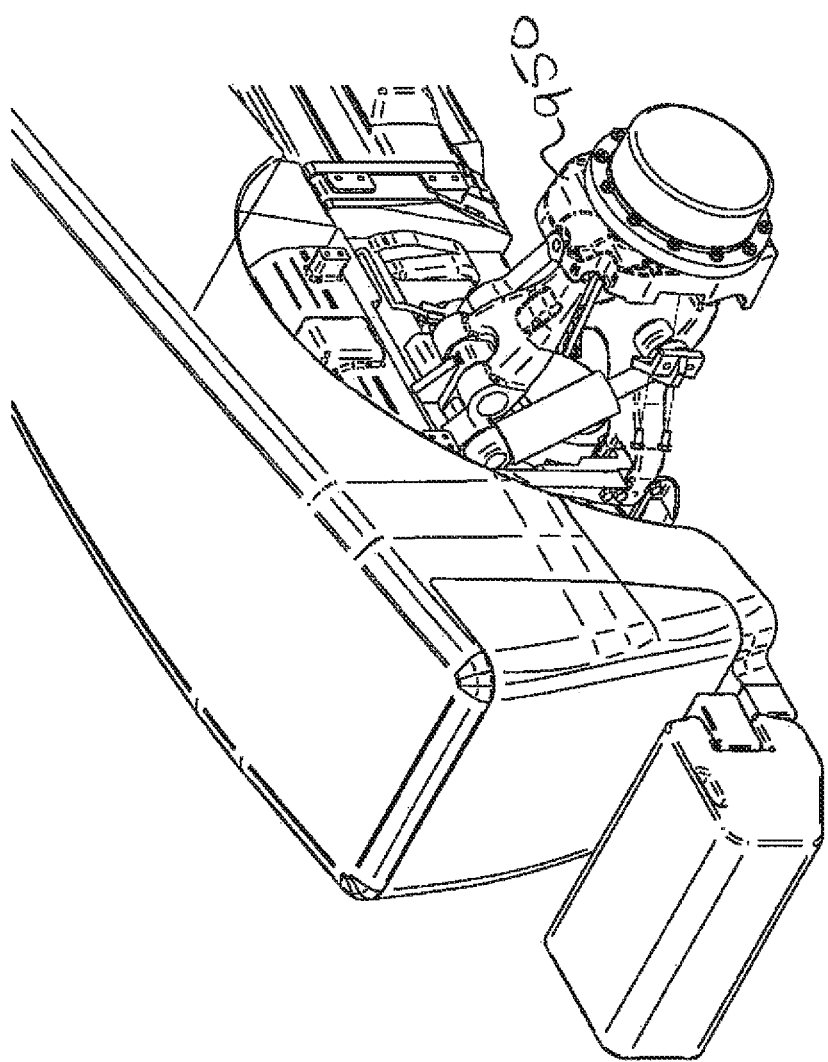
FIG. 33C is an exploded view of the farming tractor equipped with an embodiment of a steering knuckle of FIG. 33A.
Figure 33D:
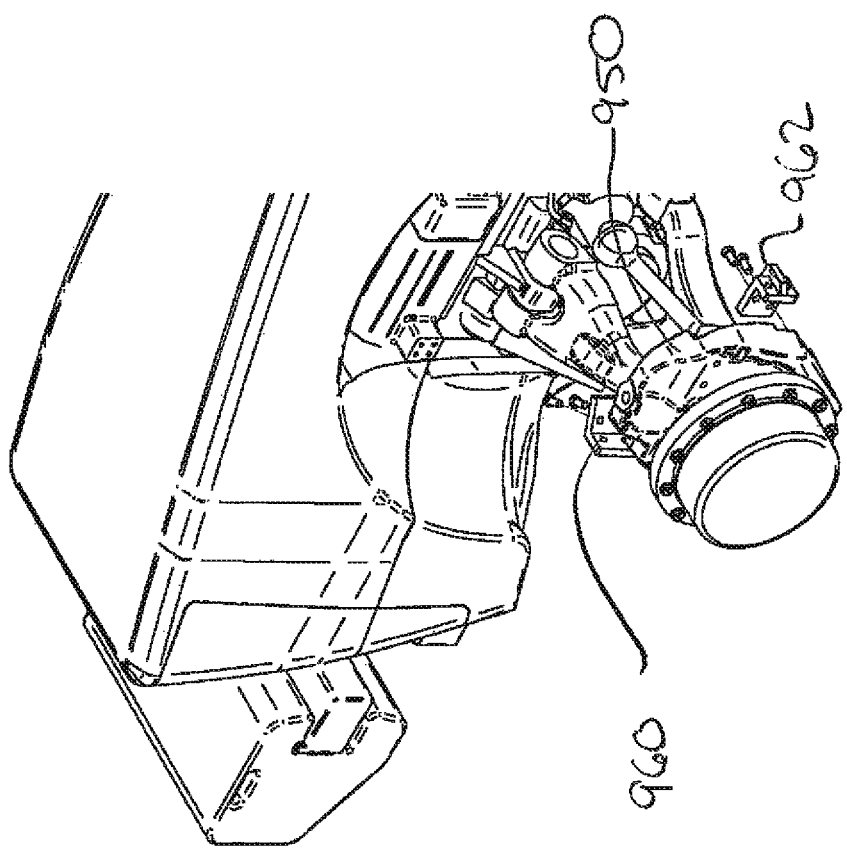
FIG. 33D is an exploded view of the farming tractor equipped with an embodiment of a steering knuckle of FIG. 33A.
Figure 33E:
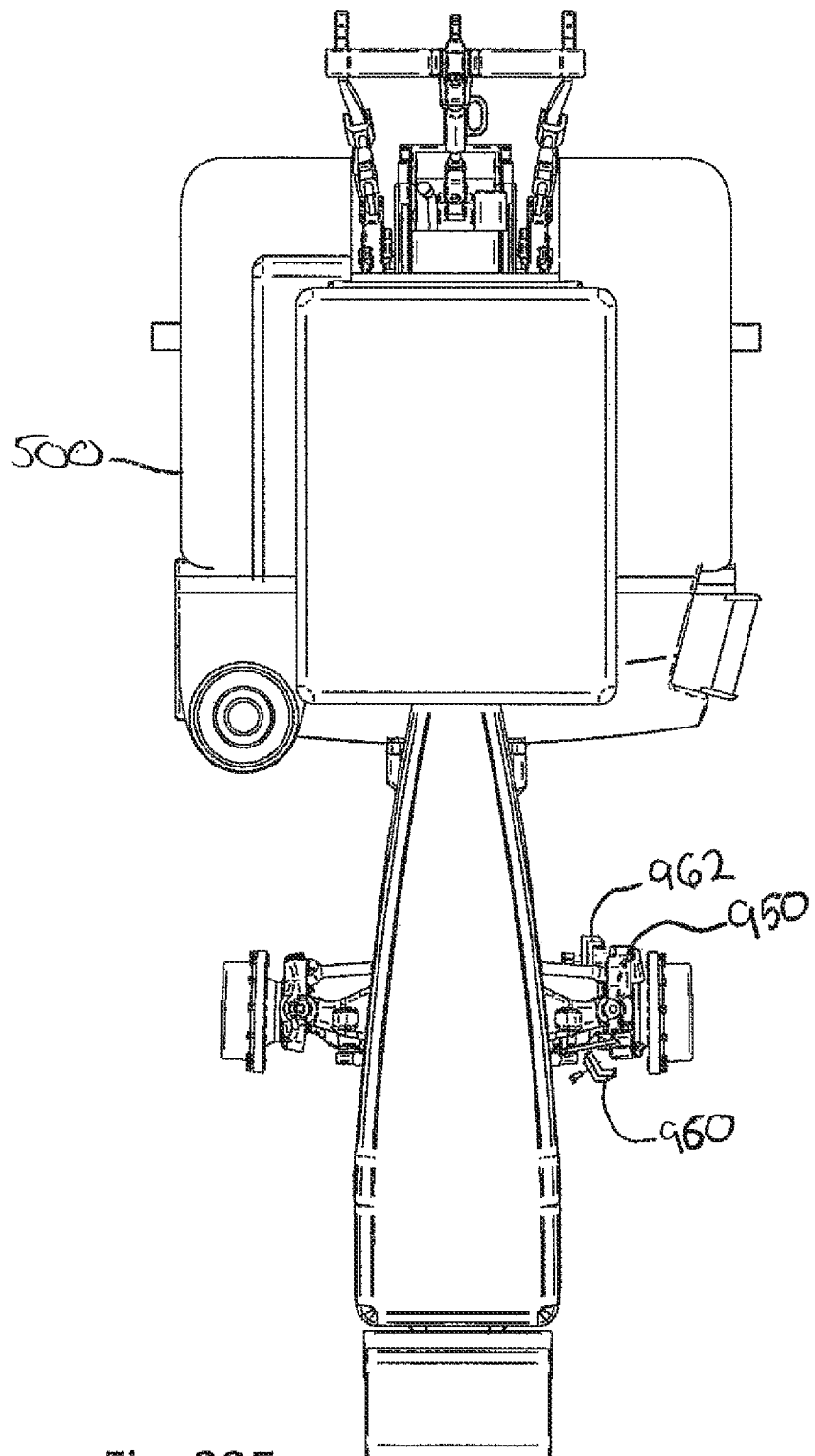
Figures 34A, 34B:
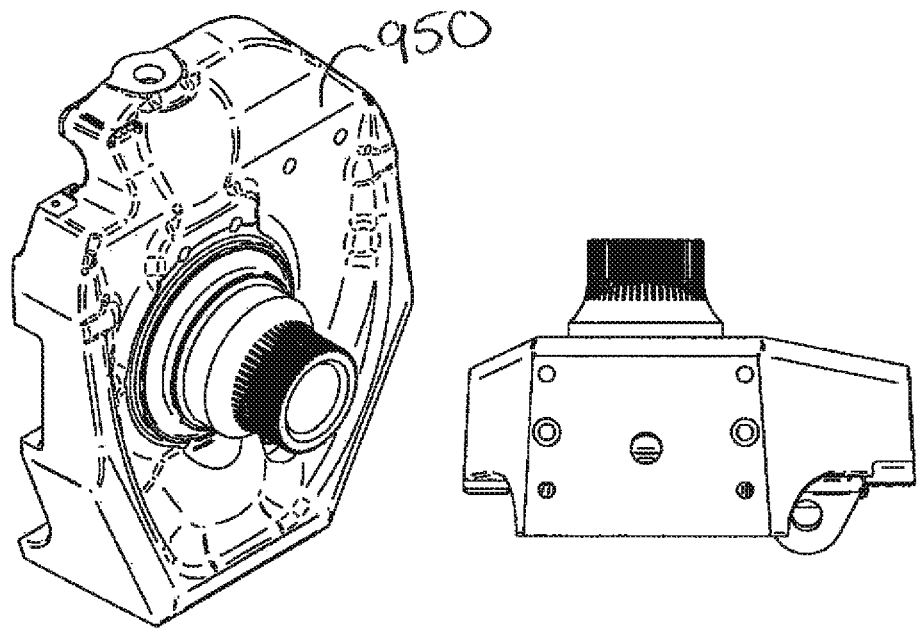
Figures 34C, 34D:
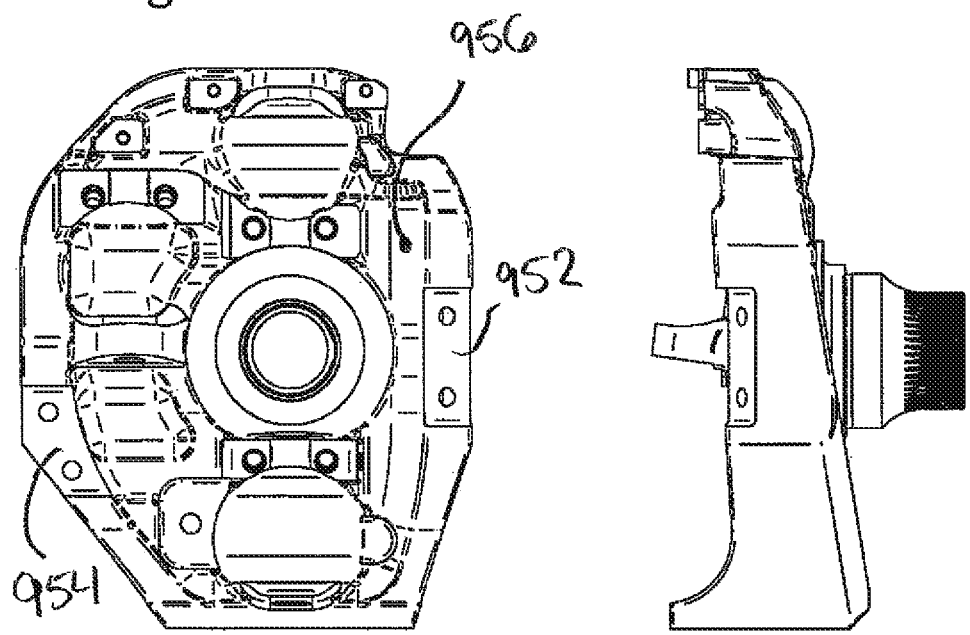
Figure 34G:
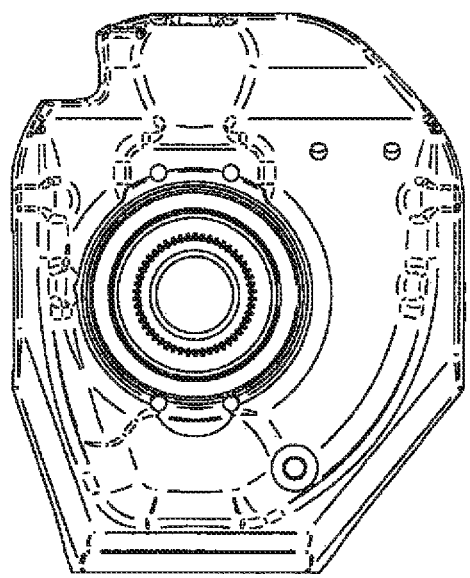
Figure 34H:
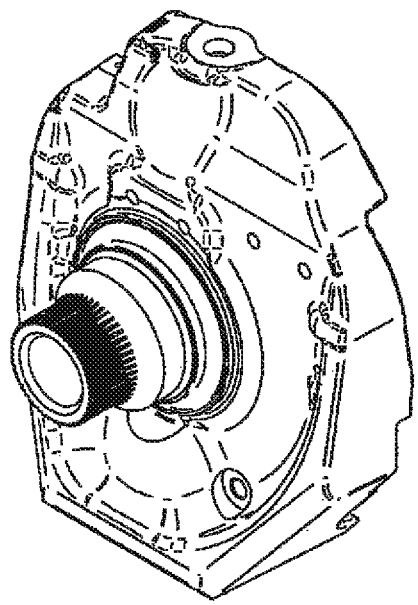
Figure 34I:
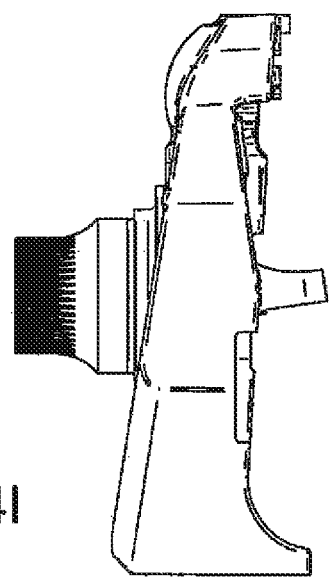

According to yet another embodiment, now referring to FIGS. 31-32 the steering knuckle 900 has an integrated track system mounting element 902. Such mounting member is generally, as shown in other embodiments (FIGS. 17-30), mounted to the steering knuckle using fasteners. According to this embodiment, the reinforced steering knuckle 900 could be provided with a mounting member 902 integrated to the steering knuckle. As such, these embodiments comprise a mounting member 902 integrated to the lower portion 940 also referred to as the attachment portion of the steering knuckle 900. Accordingly, the knuckle 900 is designed with an integrated mounting member without hindering its ability to mount either conventional wheels or track systems 910. In such embodiment, the track system 910 is preferably mounted using an elongated member 906, such as kingpin. This kingpin 906 mounting configuration allow the track system 910 to oscillate around the kingpin 906 axis thus allowing the vehicle to adapt to various terrain conditions. The track system 910, in this embodiment, is preferably mounted by securing the kingpin 906 inserted within the track system opening 914 using a combination of mounting elements 904 and corresponding fasteners 912. Furthermore, this embodiment comprises a simpler attachment mechanism which allows unhindered access to the steering knuckle 900 and shaft. As such, the steering knuckle 900 of the present embodiment provides an alternative to existing knuckle mounting assemblies. As the mounting of a track system 910 to this steering knuckle requires fewer attachment parts, this embodiment of the steering knuckle may be produced at lower costs and improve the track system 910 mounting process.

Still referring to FIGS. 31A-32H, according to this embodiment, the steering knuckle comprises a main portion 930 and a lower attachment portion 940 comprising the mounting member 902 generally located underneath the main portion 930 and preferably integrated thereto. According to one embodiment, the lower attachment portion and main portion may be unitary. The main portion 930 has an inner side 932 configured to be coupled to a steering assembly to communicate a steering constraint around a vertical axis to the track system attached thereto. The main portion 930 also has an opening configured to receive a power driving mechanism 928. The attachment portion 940 has at least one attachment area 944, 944', 944", 944''' which is configured to mate with an attachment element or mounting element 904, the attachment element 904 is configured to secure the track system 910 to attachment areas 944, 944', 944", 944''', via an attachment members 906, preferably of elongated cylindrical shape, to allow for the preferred longitudinally oscillating movement of the track system 910 during use. The attachment portion 940 preferably has a horizontally oriented portion 946 with an inwardly protruding portion 933 and an outwardly protruding portion 934. The inwardly and outwardly protruding portions 933, 934 also preferably have downwardly extending protrusions 936, 938 to define a channel 948 there between. The channel (see FIG. 32D) 948 is typically of rectangular shape. The channel 948 may be of any other shapes as to mate with the track system 910 and designed to receive the track system 910 therein.

Now referring to FIGS. 32A-D, according to this embodiment, the attachment areas 944, 944', 944", 944''' are configured to receive fasteners along vertical axes Z-Z, X-X each of which are generally offset from the central vertical axis Y-Y of the knuckle or kingpin axis. According to the present embodiment, the attachment areas 944, 944', 944", 944''' have at least one opening or slut 942, 942', 942", 942''' for receiving fastener therein. Now referring to FIG. 31B, the fasteners 912 are shown being inserted upwardly in the attachment areas 944, 944', 944", 944''' thus reversibly mounting attachment elements 906 to the knuckle 900 and resulting in securing an elongated member 906 pivotally mounting the track system 910 to the knuckle 900. Therefore, the knuckle 900 according to this embodiment, comprise an attachment portion 940 channel 948 that also may act as a guide to limit the degree of pivot allowed from the track system 910. As such, the aft portion 922 and rear portion 924 of channel 948 will come in contact with the track system support member 918 thus limiting the rotation or oscillation about the pivoting member 906.

According to yet another embodiment, now referring to FIG. 33-34, a steering knuckle 950 is shown having reinforced attachment areas 952, 954 located on the interior face 956 of the knuckle 950. Such attachment areas 952, 954 may be configured for receiving complementary mating elements 960, 962. According to this embodiment, the attachment areas 952, 954 may be located on the interior surface areas 956 of the knuckle 950. This configuration may be desirable due to its ability for mounting the track system 300 in a more secure configuration as the knuckle 950 is attached in the same axis as the driving shaft. This attachment system may provide stronger support for the track system 300 and preferably be suitable for vehicle with increased horsepower. Likewise, the rear attachments 952, 954 could be at an angle to optimize the configuration of the steering knuckle 950 in accordance with the design of the vehicle 500.

According to other embodiments, now referring to FIGS. 35-38 the steering knuckle 1000, 1200, 1300 comprises attachments areas 1008, 1208, 1308 located on its outer side or lateral face 1002, 1202, 1302. Such attachment areas 1008, 1208, 1308 are generally configured to mate with a preferably complementary track system mounting element 1004, 1204, 1304. The track system mounting elements 1004, 1204, 1304 are generally secured to the steering knuckle 1000, 1200, 1300 using fasteners such as threaded bolts 1012, 1212, 1312 received in complementary, preferably threaded, openings 1014, 1214, 1314 of the attachment areas 1008, 1208, 1308 of the steering knuckle 1000, 1200, 1300. The track system mounting elements 1004, 1204, 1304 may have various configurations. According to this embodiment, the track system mounting elements 1004, 1204, 1304 comprise a knuckle mounting portion 1018, 1218, 1318 which is secured to the knuckle 1000, 1200, 1300 and a track support mounting portion 1010, 1210, 1310, operatively mounted to both the knuckle mounting portion 1018, 1218, 1318 and the track system (not shown in FIGS. 35-38). The knuckle mounting portion 1018, 1218, 1318 preferably comprises transverse openings 1016, 1216, 1316 aligned with the attachment areas 1008, 1208, 1308, for inserting the fasteners 1012, 1212, 1312. The track support mounting portion 1010, 1210, 1310 preferably comprises a track mounting system such as a transverse opening 1026, 1220, 1326, for operatively mounting the track system to the steering knuckle 1000, 1200, 1300. The opening 1026, 1226, 1326 is configure to receive the complementary track system mounting element (not shown). As such, the opening 1026, 1226, 1326 may also serve as the pivot axis of the track system. According to one embodiment, now referring to FIG. 35A-D, the pivot axle or opening 1026 is preferably substantially vertically aligned with the front axle of the vehicle. Yet according to other embodiments, now referring to FIGS. 37-38, the track system mounting elements 1004, 1204, 1304 may be rotated about the front axle of the vehicle 510 as to position the pivot axle or opening 1226, 1326 at a skewed angle 1240, 1340 from the vertical plane of the vehicle front axle 512. According to other embodiments, the knuckle mounting portion 1018, 1218, 1318 and track support mounting portion 1010, 1210, 1310 could be unitary.

As can be seen in FIGS. 35-38, the steering knuckle 1000, 1200, 1300 also comprises a stub 1170, 1270, 1370 outwardly extending from the outer side 1002, 1202, 1302. The stub 1170, 1270, 1370 is configured to support the planetary gear assembly which drives the wheel hub 1020, 1220, 1320 best shown in FIGS. 35C, 37B and 38B. The stub 1170, 1270, 1370 preferably comprises a spacing portion 1022 and an engaging portion 1024. To provide proper support between the planetary gear assembly and the stub 1170, the circumference of the stub 1170, 1270, 1370 engaging portion 1024 is provided with axially extending splines 1172 (see FIG. 36B). According to this embodiment, the attachment areas 1008, 1208, 1308 and complementary mating track system mounting element 1004, 1204, 1304 are configured to allow the unimpeded rotation of the stub 1170, 1270, 1370 through the opening 1030, 1230, 1330. Accordingly, the spacing portion 1022 of the stub 1170, 1270, 1370 is preferably sized in accordance with the thickness of the track system mounting element 1004, 1204, 1304, more particularly the thickness of the knuckle mounting portion 1018, 1218, 1318. Understandably, the configuration of the stub 1170, 1270, 1370 must match the configuration of the stub on the original knuckle replaced by the knuckle 1000, 1200, 1300. In that sense, other embodiments of steering knuckles in accordance with the principles of the present invention could be provided without stub 1170, 1270, 1370 if the original knuckle does not have a stub or if the driving system of the vehicle 510 does not require a stub.

According to another embodiment, now referring to FIGS. 39-40 the steering knuckle 1400 comprises attachments areas 1408 located on its outer side or lateral face

1402. Such attachment areas 1408 are generally configured to mate with a preferably complementary track system mounting element 1404. The track system mounting elements 1404 are generally secured to the steering knuckle 1400 using fasteners such as threaded bolts 1412 received in complementary, preferably threaded, openings 1414 of the attachment areas 1408 of the steering knuckle 1400. The track system mounting elements 1404 may have various configurations. According to this embodiment, the track system mounting elements 1404 comprise a knuckle mounting portion 1418 which is secured to the knuckle 1400 and a track support mounting portion 1410, operatively mounted to both the knuckle mounting portion 1418 and the track system (not shown in FIGS. 39-41). The track system mounting element 1404 also comprises an opening 1430 for the stub 1470. The knuckle mounting portion 1418 preferably comprises transverse openings 1416 aligned with the attachment areas 1408, for inserting the fasteners 1412. The track support mounting portion 1410 preferably comprises a track mounting system such as a transverse opening 1426, for operatively mounting the track system to the steering knuckle 1400. The opening 1426 is configure to receive the complementary track system mounting element (not shown). As such, the opening 1426 may also serve as the pivot axis of the track system. According to one embodiment, now referring to FIG. 39-40, the pivot axle or opening 1426 is preferably substantially vertically aligned with the front axle of the vehicle. Yet according to other embodiments (not shown), the track system mounting elements 1404 may be rotated about the front axle of the vehicle 510 as to position the pivot axle or opening at a skewed angle from the vertical plane of the vehicle front axle 512. According to this embodiment, the knuckle mounting portion 1418 and track support mounting portion 1410 are unitary. According to other embodiments, the knuckle mounting portion 1418 and track support mounting portion 1410 may be made from separate members.

According to another embodiment similar to the embodiment shown in FIG. 39-40, now referring to FIGS. 41-42 the steering knuckle 1500 comprises attachments areas 1508 located on its inner side or interior face 1528. As such, by attaching on the inner side 1528 of the knuckle 1500 the track system mounting element 1504 allows unimpeded rotation of the stub 1570 preventing any interaction between the mounting element 1504 and the wheel hub 1520. Yet, the inner side 1528 attachment is configured to prevent hindering the steering arm 514 of the vehicle 510.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A steering knuckle for use with a steering assembly of a vehicle equipped with a track system, the knuckle comprising:
    a) a main portion having an inner side configured to be coupled to a steering assembly to communicate a steering constraint to a track system attached thereto and an opening configured to receive a power driving mechanism;
    b) an attachment portion, located underneath the main portion, the attachment portion having at least one attachment area configured to mate with an attachment element, the attachment element is configured to pivotally secure the track system to the attachment areas with fasteners, wherein pivot axis of the attachment element is transverse to the vehicle.

2. A steering knuckle as claimed in claim 1, wherein the track system is pivotally mounted to the attachment portion using an elongated member for allowing the track system to pivot longitudinally about the elongated member.

3. A steering knuckle as claimed in claim 2 wherein the attachment portion comprises a groove for at least partially receiving the elongated member.

4. A steering knuckle as claimed in claim 1, wherein the attachment portion comprises an inwardly protruding portion having at least one attachment area located thereto.

5. A steering knuckle as claimed in claim 1, wherein the attachment portion comprises an outwardly protruding portion having at least one attachment area located thereto.

6. A steering knuckle as claimed in claim 1, wherein the attachment portion comprises an inwardly and an outwardly protruding portion and wherein at least one of the inwardly and outwardly protruding portions have a downwardly protruding portion defining a longitudinal channel for receiving the track system.

7. A steering knuckle as claimed in claim 1, wherein at least one of the attachment areas has at least one opening defining a vertical axis being laterally offset from an axis along a kingpin securing the steering knuckle to the vehicle.

8. A steering knuckle as claimed in claim 1, wherein the attachment portion further comprises an inwardly and an outwardly protruding portion and wherein at least one of the inwardly and outwardly protruding portion projects laterally outside of the main portion.

9. A steering knuckle as claimed in claim 3, wherein at least one attachment area is located on either side of the groove on both a laterally inwardly protruding portion and a laterally outwardly protruding portion.

10. A steering knuckle as claimed in claim 1, wherein the attachment area is configured so that the attachment element can be upwardly fastened thereto.

11. A steering knuckle as claimed in claim 1, wherein the main portion and the attachment portion are unitary.

12. A vehicle comprising left and right steering assemblies, the vehicle comprising a pair of steering knuckles, the pair of steering knuckles are respectively mounted to the left and right steering assemblies, each steering knuckle comprising:
    a) a main portion having an inner side configured to be coupled to a steering assembly to communicate a steering constraint to a track system attached thereto and an opening configured to receive a power driving mechanism;
    b) an attachment portion, located underneath and integrated to the main portion, the attachment portion having at least one attachment area configured to mate with an attachment element, the attachment element is configured to pivotally secure the track system to the attachment areas with fasteners.

13. A steering knuckle for use with a steering assembly of a vehicle equipped with a track system, the knuckle comprising:
    a) an inner side configured to be coupled to a steering assembly to communicate a steering constraint around a vertical axis to a track system attached thereto;
    b) an opening configured to receive a power driving mechanism; and
    c) a periphery comprising an inner region inwardly facing the vehicle and an outer region facing outwardly from the vehicle;

d) at least one attachment area located on said periphery being configured to mate with at least one attachment element, the at least one attachment element being configured to secure the track system to the attachment area;

wherein at least one of the inner and outer regions comprises at least one attachment area.

14. A steering knuckle as claimed in claim 13, wherein the attachment areas of the inner region are located about the periphery.

15. A steering knuckle as claimed in claim 13, the steering knuckle further having a stub, wherein the attachment areas of the outer region are located about the stub and parallel thereto.

16. A steering knuckle as claimed in claim 13, the steering knuckle further having a stub, wherein the attachment areas of the outer region surround the stub.

17. A steering knuckle as claimed in claim 14, wherein the stub is outwardly spaced to prevent hindrance between the attachment element and a wheel hub mounted to the stub.

18. A steering knuckle as claimed in claim 13, the steering knuckle further having a stub, wherein the outer region has an outwardly protruding portion surrounding the stub.

19. A steering knuckle as claimed in claim 13, wherein the attachment area has fastener receiving slot, and wherein the fasteners receiving slots have a lengths equal to the thickness of the knuckle.

20. A steering knuckle as claimed in claim 13, wherein the inner regions comprises attachment areas surrounding the opening for receiving fasteners inserted from the inside out.

21. A vehicle comprising left and right steering assemblies, the vehicle comprising a pair of steering knuckles as claimed in claim 13 respectively mounted to the left and right steering assemblies.

22. A steering knuckle as claimed in claim 1, wherein the attachment portion is integrated to the main portion.

* * * * *